US005170625A

United States Patent [19]

Watanabe et al.

[11] Patent Number: 5,170,625

[45] Date of Patent: Dec. 15, 1992

[54] CONTROL SYSTEM FOR HYDRAULIC PUMP

[75] Inventors: Hiroshi Watanabe, Ushiku; Eiki Izumi, Ibaraki; Yasuo Tanaka, Tsukuba; Hiroshi Onoue, Ibaraki; Shigetaka Nakamura, Tsuchiura, all of Japan

[73] Assignee: Hitachi Construction Machinery Co., Ltd., Tokyo, Japan

[21] Appl. No.: 601,798

[22] PCT Filed: Jul. 27, 1990

[86] PCT No.: PCT/JP90/00962

§ 371 Date: Oct. 31, 1990

§ 102(e) Date: Oct. 31, 1990

[87] PCT Pub. No.: WO91/02167

PCT Pub. Date: Feb. 21, 1991

[30] Foreign Application Priority Data

| | | | |
|---|---|---|---|
| Jul. 27, 1989 | [JP] | Japan | 1-194655 |
| Nov. 30, 1989 | [JP] | Japan | 1-311827 |
| Jun. 11, 1990 | [JP] | Japan | 2-152196 |

[51] Int. Cl.[5] .............. F16D 31/02

[52] U.S. Cl. .............. 60/452; 91/511; 91/446

[58] Field of Search .............. 60/420, 423, 434, 449, 60/445, 451, 452; 91/511, 446; 417/43

[56] References Cited

U.S. PATENT DOCUMENTS

| | | | |
|---|---|---|---|
| 3,579,987 | 5/1971 | Busse | 60/445 |
| 4,617,854 | 10/1986 | Kropp | 91/517 |
| 4,809,504 | 3/1989 | Izumi et al. | 60/449 |
| 4,856,278 | 8/1989 | Widmann et al. | 60/452 |
| 4,967,557 | 11/1990 | Izumi et al. | 60/452 |

FOREIGN PATENT DOCUMENTS

| | | | |
|---|---|---|---|
| 0160458 | 12/1981 | Japan | 60/451 |
| 0160459 | 12/1981 | Japan | 60/451 |
| 60-11706 | 1/1985 | Japan . | |
| 61-88002 | 5/1986 | Japan . | |
| 1-141203 | 6/1989 | Japan . | |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A control system for a hydraulic pump in a hydraulic drive circuit includes at least one hydraulic pump whose displacement volume is variable, at least one hydraulic actuator driven by a hydraulic fluid delivered from the hydraulic pump, and a flow control valve connected between the hydraulic pump and the actuator for controlling a flow rate of the hydraulic fluid supplied to the actuator. In the control system, the target value of the differential pressure between the delivery pressure of the hydraulic pump and the load pressure of the actuator is preset, and the displacement volume is varied dependent on the deviation between the differential pressure and its target value for controlling a pump delivery rate so that the differential pressure is held at the target value. The control system further influences the change rate of the delivery pressure of the hydraulic pump with respect to the change in the displacement volume of the hydraulic pump, and determines a control gain (Ki) for the change rate of the displacement volume from the received value; and controls the displacement volume of the hydraulic pump in accordance with the control gain and the differential pressure deviation.

43 Claims, 39 Drawing Sheets

CONTROL SYSTEM FOR HYDRAULIC PUMP

TECHNICAL FIELD

The present invention relates to a control system for a hydraulic pump in a hydraulic drive circuit for use in hydraulic machines such as hydraulic excavators and cranes, and more particularly to a control system for a hydraulic pump in a hydraulic drive circuit of load sensing control type which controls a pump delivery rate in such a manner as to hold the delivery pressure of the hydraulic pump higher than the load pressure of a hydraulic actuator, by a fixed value.

BACKGROUND ART

Hydraulic drive circuits for use in hydraulic machines such as hydraulic excavators and cranes each include at least one hydraulic pump, at least one hydraulic actuator driven by a hydraulic fluid delivered from the hydraulic pump, and a flow control valve connected between the hydraulic pump and the actuator for controlling a flow rate of the hydraulic fluid supplied to the actuator. It is known that some of those hydraulic drive circuits employs a technique called load sensing control (LS control) for controlling the delivery rate of the hydraulic pump. The load sensing control is to control the delivery rate of the hydraulic pump such that a delivery pressure of the hydraulic pump is held at a fixed value higher than a load pressure of the hydraulic actuator. This causes the delivery rate of the hydraulic pump to be controlled dependent on the load pressure of the hydraulic actuator, and hence permits economic operation.

Meanwhile, the load sensing control is carried out by detecting a differential pressure (LS pressure) between the delivery pressure and the load pressure, and controlling the displacement volume of the hydraulic pump, or the position (tilting amount) of a swash plate in the case of a swash plate pump, in response to a deviation between the LS differential pressure and a differential pressure target value. Conventionally, the detection of the differential pressure and the control of tilting amount of the swash plate have usually been carried out in a hydraulic manner as disclosed in JP, A, 60-11706, for example. This conventional arrangement will briefly be described below.

A pump control system disclosed in JP, A, 60-11706 comprises a control valve having one end subjected to the delivery pressure of a hydraulic pump and the other end subjected to both the maximum load pressure among a plurality of actuators and the urging force of a spring, and a cylinder unit operation of which is controlled by a hydraulic fluid passing through the control valve for regulating the swash plate position of the hydraulic pump. The spring at one end of the control valve is to set a target value of the LS differential pressure. Depending on the deviation occurred between the LS differential pressure and the target value, the control valve is driven and the cylinder unit is operated to regulate the swash plate position, whereby the pump delivery rate is controlled so that the LS differential pressure is held at the target value. The cylinder unit has a spring built therein to apply an urging force in opposite relation to the direction in which the cylinder unit is driven upon inflow of the hydraulic fluid.

However, the above conventional control system for the hydraulic pump has had problems below.

In the conventional pump control system, the tilting speed of a swash plate of the hydraulic pump is determined dependent on the flow rate of the hydraulic fluid flowing into the cylinder unit, while the flow rate of the hydraulic fluid is determined dependent on both an opening, i.e., a position, of the control valve and setting of the spring in the cylinder unit and, in turn, the position of the control valve is determined by the relationship between the urging force of the LS differential pressure and the spring force for setting the target value. Here, the spring of the control valve and the spring of the cylinder unit each have a fixed spring constant. Accordingly, a control gain for the tilting speed of the swash plate dependent on the deviation between the LS differential pressure and the target value thereof is always constant. The control gain, i.e., the spring constants of the two springs, are set in such a range that change in the pump delivery pressure will not cause hunting and the pump is kept from coming into disablement of control on account of change in the delivery rate upon change in the swash plate position.

In the LS control, the delivery pressure of the hydraulic pump is determined dependent on a difference between the flow rate of the hydraulic fluid flowing into a line, extending from the hydraulic pump to the flow control valve, and the flow rate of the hydraulic fluid flowing out of the line, as well as a volume into which the delivered hydraulic fluid is allowed to flow. Therefore, when the operation (input) amount of the flow control valve (i.e., the demanded flow rate) is small, the opening of the flow control valve is so reduced that the small line volume between the hydraulic pump and the flow control valve plays a predominant factor. As a result, the delivery pressure is largely varied even with slight change in the flow rate upon change in the swash plate position. On the other hand, when the operation amount of the flow control valve is increased to enlarge the opening thereof, the large line volume between the pump and an actuator now takes part in pressure change, whereby change in the delivery pressure upon change in the delivery rate is reduced.

Accordingly, in order to prevent the occurrence of hunting over a range of the entire operation amount (opening) of the flow control valve, the above-mentioned control gain, i.e., the spring constants of the two springs, are set to provide such a tilting speed of the swash plate as to prevent the pressure change from hunting at the small opening of the flow control valve for the positive LS control.

With the control gain set as explained above, under a condition that the operation amount of the flow control valve is small and hence its opening is small, i.e., when the hydraulic pump is at the low delivery rate, change in the delivery rate produce proper change in pressure and will not cause hunting. But under a condition that the operation amount of the flow control valve is large and hence its opening is large, i.e., when the hydraulic pump is at the high delivery rate, the tilting speed of the swash plate dependent on change in the delivery rate is restricted by the above-mentioned control gain, and too small pressure change makes it difficult to control the delivery pressure with a good response. For instance, therefore, when an operating lever of the flow control valve is operated in a large stroke to increase the opening of the flow control valve, an operator is forced to feel that the actuator is too slow in action.

Further, when the operating lever is operated at small speeds and hence the deviation between the demanded flow rate of the flow control valve and the delivery rate of the hydraulic pump is small, the deviation between the LS differential pressure and the differential pressure target value is also small, and thus the change in pressure upon change in the tilting speed of the swash plate, i.e., the change in the delivery rate is sufficient to realize demanded speed change of the actuator. On the contrary, when the operating lever of the flow control valve is operated at large speeds to abruptly increase the opening of the flow control valve, there occurs a large difference between the demanded flow rate of the flow control valve and the delivery rate of the hydraulic pump, which also increases the deviation between the LS differential pressure and the differential pressure target value. Under this condition, the tilting speed of the swash plate is restricted by the above-mentioned control gain, and hence it takes a time for the once reduced differential pressure to return to its target value. As a consequence, the demanded speed change of the actuator cannot be realized, causing the operator to feel that the actuator is too slow in action.

The above description has been made without taking into account a revolution speed of the hydraulic pump. The delivery rate of the hydraulic pump is also influenced by the pump revolution speed such that when the pump revolution speed is high, even slight change in the swash plate position produce large flow rate change and hence large pressure change. In construction machines such as hydraulic excavators, a hydraulic pump is driven by a prime mover via a speed reducer and, as a revolution speed of the prime mover changes, a pump revolution speed is also changed. It is hence required that change in the flow rate dependent on change in the swash plate position be kept within a proper range even at the maximum pump revolution speed, in order to prevent the occurrence of hunting over an entire range of the pump revolution speed, i.e., the revolution speed of the prime mover, and to ensure the positive LS control. For this purpose, the above-mentioned control gain, i.e., the spring constants of the two springs, are also so set as to prevent the pressure change from hunting at the maximum pump revolution speed (or the revolution speed of the prime mover).

With the control gain thus set, when the revolution speed of the hydraulic pump is at maximum, change in the swash plate position produces satisfactory change in the delivery rate to realize the demanded speed change of the actuator. However, when the pump revolution speed is low, the tilting speed of the swash plate is restricted by the above-mentioned control gain, and change in the swash plate position produces small change in the delivery rate. Consequently, the demanded speed change of the actuator cannot be realized and the operator is forced to feel that the actuator is too slow in action.

An object of the present invention is to provide a control system for a hydraulic pump which permits, in a hydraulic drive circuit of load sensing control type, to properly control a change rate of the delivery rate with respect to change in the displacement volume of the hydraulic pump to prevent the occurrence of hunting due to an abrupt change of the pump delivery pressure and achieve a prompt response.

SUMMARY

To achieve the above object, according to the present invention, there is provided a control system for a hydraulic pump in a hydraulic drive circuit comprising at least one hydraulic pump provided with displacement volume varying means, at least one hydraulic actuator driven by a hydraulic fluid delivered from said hydraulic pump, and a flow control valve connected between said hydraulic pump and said actuator for controlling a flow rate of the hydraulic fluid supplied to said actuator, wherein a target value of a differential pressure between a delivery pressure of said hydraulic pump and a load pressure of said actuator is preset, and said displacement volume varying means of said hydraulic pump is driven dependent on a deviation between said differential pressure and said target value thereof for controlling a pump delivery rate so that said differential pressure is held at said target value, said control system for a hydraulic pump further comprising first means for receiving at least one value which influences a change rate of the delivery pressure of said hydraulic pump with respect to change in the displacement volume of said hydraulic pump, and determining a control gain for a change rate of the displacement volume based on the received value; and second means for controlling said displacement volume varying means of said hydraulic pump in accordance with the control gain determined by said first means and said differential pressure deviation.

Thus, a value of at least one parameter is entered which influences a change rate of the delivery pressure of the hydraulic pump with respect to change in the displacement volume of the hydraulic pump, and the control gain for the change rate of the displacement volume is determined based on the entered value to control the varying speed of the displacement volume. The change rate of the delivery rate with respect to change in the displacement volume of the hydraulic pump is thereby controlled properly to permit a prompt response without making the pump delivery pressure so abruptly changed as to cause hunting.

The first means preferably determines the control gain based on the aforesaid received value such that as the change rate of the delivery pressure of the hydraulic pump with respect to change in the displacement volume of the hydraulic pump becomes larger, the change rate of the displacement volume is decreased, and as the change rate of the delivery pressure of the hydraulic pump with respect to change in the displacement volume of the hydraulic pump becomes smaller, the change rate of the displacement volume is increased.

Preferably, the first means includes third means for determining at least one control coefficient for arithmetic operation based on the aforesaid received value, and the second means includes fourth means for determining a target displacement volume from the differential pressure deviation and the control coefficient, and controlling the displacement volume varying means of the hydraulic pump in accordance with the target displacement volume.

The received value of the third means is prefereably the displacement volume of the hydraulic pump, and the third means calculates the control coefficient based on the displacement volume.

Further, the received value(s) of the third means may be the differential pressure deviation; a deviation between a demanded flow rate of the flow control valve and the delivery rate of the hydraulic pump; a revolution speed of the hydraulic pump; the displacement volume of the hydraulic pump and the revolution speed of the hydraulic pump; the differential pressure deviation and the revolution speed of the hydraulic pump;

the flow rate deviation and the revolution speed of the hydraulic pump; the displacement volume of the hydraulic pump and the differential pressure deviation; or the displacement volume of the hydraulic pump and the flow rate deviation.

When the receiving the plurality of values, the third means calculates a plurality of primary control coefficients dependent on the received values, respectively, and then calculates the control coefficient from the plurality of primary control coefficients.

In the case where the aforesaid received value is the displacement volume of the hydraulic pump, the control coefficient is set in a relationship that it becomes larger as the displacement volume is increased, and becomes smaller as the displacement volume is decreased.

In the case where the aforesaid received value is the differential pressure deviation, the control coefficient is set in a relationship that it becomes larger as the differential pressure deviation is increased, and becomes smaller as the differential pressure deviation is decreased.

In the case where the aforesaid received value is the flow rate deviation, the control coefficient is set in a relationship that it becomes larger as the flow rate deviation is increased, and becomes smaller as the flow rate deviation is decreased.

In the case where the aforesaid received value is the revolution number of the hydraulic pump, the control conefficient is set in a relationship that it becomes smaller as the revolution speed is increased, and becomes larger as the revolution speed is decreased.

The displacement volume as the aforesaid received value may be a target displacement volume determined by the fourth means. Further, the control system of the present invention may further comprise means for detecting an actual displacement volume of the hydraulic pump, and the displacement volume as the aforesaid received value may be the detected displacement volume.

The control system of the present invention may further comprise means for detecting a differential pressure between the delivery pressure of the hydraulic pump and the load pressure of the actuator, and means for calculating a deviation between the detected differential pressure and a preset target value of the differential pressure, and the differential pressure deviation as the aforesaid received value may be this calculated differential pressure deviation.

The control system of the present invention may further comprise means for calculating a delivery rate of the hydraulic pump from the target displacement volume determined by the fourth means, and means for calculating a deviation between the demanded flow rate of the flow control valve and the detected delivery rate, and the flow rate deviation as the aforesaid received value may be this calculated flow rate deviation.

The control system of the present invention may further comprise means for detecting the actual displacement volume of the hydraulic pump, means for calculating the delivery rate of the hydraulic pump from the detected displacement volume, and means for calculating a deviation between the demand flow rate of the flow control valve and the detected delivery rate, and the flow rate deviation as the aforesaid received value may be this calculated flow rate deviation.

The control system of the present invention may further comprise means for detecting an operation amount of the flow control valve, means for calculating the demanded flow rate of the flow control valve from the detected operation amount, and means for calculating a deviation between the calculated demanded flow rate and the delivery rate of the hydraulic pump, and the flow rate deviation as the aforesaid received value may be this calcultated flow rate deviation.

In the case where the hydraulic actuator and the flow control valve are each provided in plural, the control system of the present invention may further comprise means for detecting operation amounts of the plural flow control valves, respectively, means for totaling those detected operation amounts to calculate a total demanded flow rate of the plural flow control valves, and means for calculating a deviation between the calculated demanded flow rate and the delivery rate of the hydraulic pump, and the flow rate deviation as the aforesaid received value may be this calculated flow rate deviation.

The control system of the present invention may further comprise means for detecting a target revolution speed of a prime mover for driving the hydraulic pump, and the revolution speed of the hydraulic pump as the aforesaid received value is this detected target revolution speed.

The control system of the present invention may further comprise means for detecting an actual revolution speed of the prime mover for driving the hydraulic pump, and the revolution speed of the hydraulic pump as the aforesaid received value is this detected revolution speed.

The control system of the present invention may further comprise means for detecting an actual revolution speed of the hydraulic pump, and the revolution speed of the hydraulic pump as the aforesaid received value is this detected revolution speed.

Preferably, the third means includes means for presettting a basic value of the control coefficient, means for calculating a modifying coefficient of the basic value dependent on the aforesaid received value, and means for multiplying the basic value by the modifying coefficient to calculate the control coefficient.

Preferably, the fourth means includes means for multiplying the differential pressure deviation by the control coefficient to calculate a target change rate of the displacement volume, and means for adding the target change rate to a target displacement volume determined by calculation in the last cycle to determine the target displacement volume.

The fourth means may includes means for multiplying the differential pressure deviation by the control coefficient to calculate the target displacement volume. Further, the third means may include means for calculating, as the control coefficient, a first control coefficient for integral control, and means for calculating a second control coefficient for proportional compensation, and the fourth means may include means for calculating a target displacement volume for the integral control from the differential pressure deviation and the first control coefficient, means for calculating a modification value for proportional compensation from the differential pressure deviation and the second control coefficient, and means for calculating the target displacement volume from the target displacement volume for the integral control and the modification value for the proportional compensation.

DETAILED DESCRIPTION

Hereinafter, several embodiments of the present invention will be described with reference to the accompanying drawings.

FIRST EMBODIMENT

To begin with, a first embodiment of the present invention will be explained by referring to FIGS. 1-10.

Figure 1:
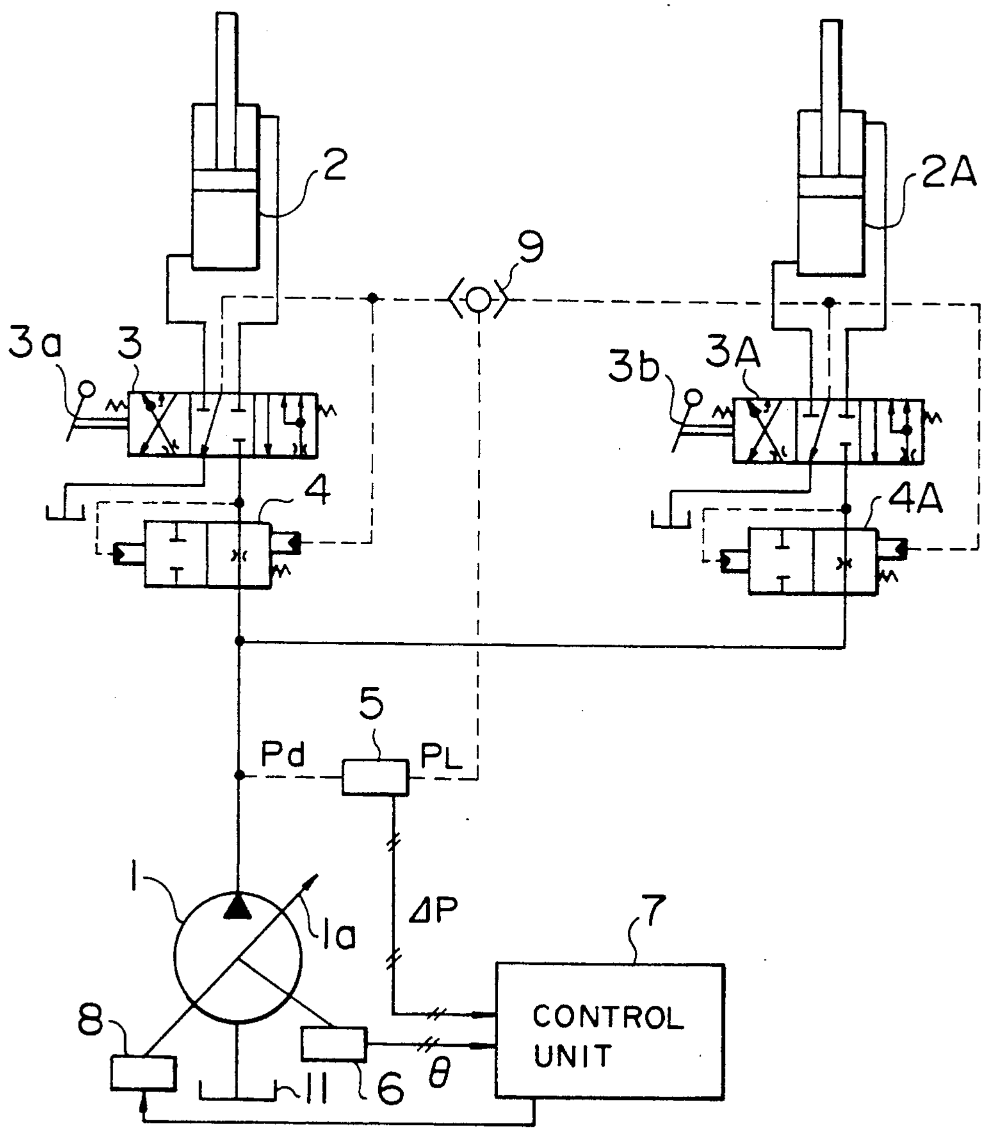
FIG. 1 is a schematic diagram of a hydraulic drive circuit of load sensing control type equipped with a control system for a hydraulic pump according to a first embodiment of the present invention.

In FIG. 1, a hydraulic drive circuit according to this embodiment comprises a hydraulic pump 1, a plurality of hydraulic actuators 2, 2A driven by a hydraulic fluid delivered from the hydraulic pump 1, flow control valves 3, 3A connected between the hydraulic pump 1 and the actuators 2, 2A for controlling flow rates of the hydraulic fluid supplied to the actuators 2, 2A dependent on operation of operating levers 3*a*, 3*b*, respectively, and pressure compensating valves 4, 4A for holding constant differential pressures between the upstream and downstream sides of the flow control valves 3, 3A, i.e., differential pressures across the valves, to control the flow rates of the hydraulic fluid passing through the flow control valves 3, 3A to values in proportion to openings of the flow control valves 3, 3A, respectively. A set of the flow control valve 3 and the pressure compensating valve 4 constitutes one pressure compensated flow control valve, while a set of the flow control valve 3A and the pressure compensating valve 4A constitutes another pressure compensated flow control valve. The hydraulic pump 1 has a swash plate 1*a* as a displacement volume varying mechanism.

The hydraulic pump 1 is controlled in its delivery rate by a control system of this embodiment which comprises a differential pressure sensor 5, a swash plate position sensor 6, a control unit 7 and a swash plate position controller 8. The differential pressure sensor 5 detects a differential pressure between a load pressure of the actuator 2 or 2A on the higher side selected by a shuttle valve 9, i.e., a maximum load pressure PL, and a delivery pressure Pd of the hydraulic pump 1 (i.e., an LS differential pressure), and converts it to an electric signal $\Delta P$ for outputting to the control unit 7. The swash plate position sensor 6 detects a position (tilting amount) of a swash plate 1*a* of the hydraulic pump 1 and converts it to an electric signal $\theta$ for outputting to the control unit 7. The control unit 7 calculates a drive signal for the swash plate 1*a* of the hydraulic pump 1 based on the electric signals $\Delta P$, $\theta$, and outputs the drive signal to swash plate position controller 8. In response to the drive signal from the control unit 7, the swash plate position controller 8 drives the swash plate 1*a* for controlling the pump delivery rate.

Figure 2:
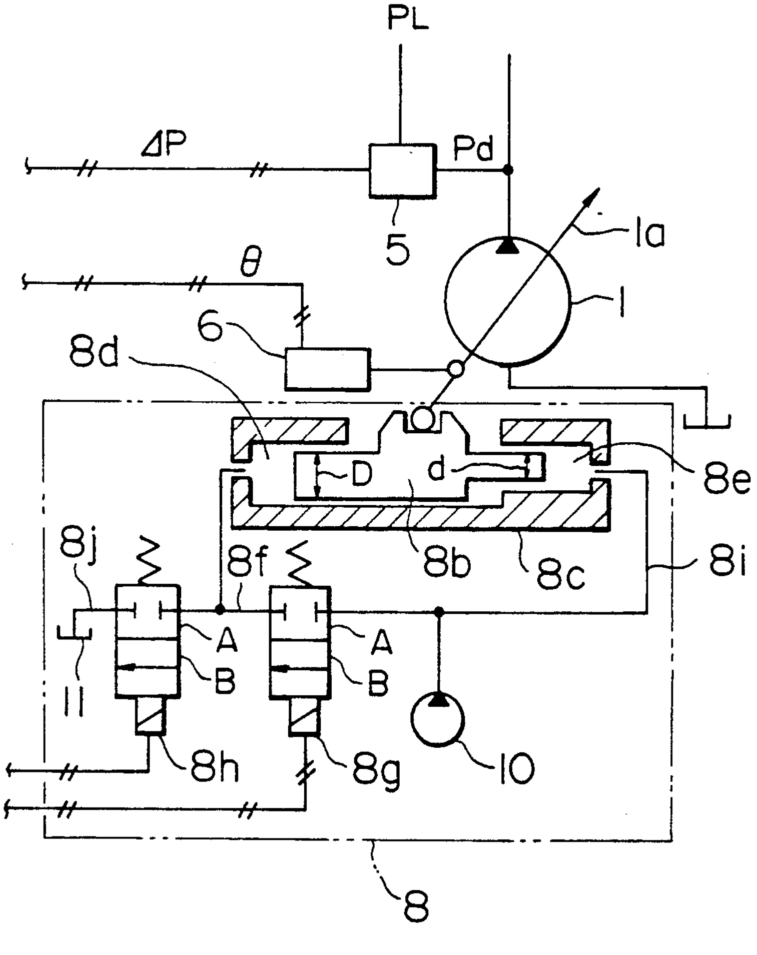
FIG. 2 is a schematic diagram showing arrangement of a swash plate position controller.

The swash plate position controller 8 is constituted as a hydraulic drive device of electro-hydraulic servo type, for example, as shown in FIG. 2.

More specifically, the swash plate position controller 8 has a servo piston 8*b* for driving the swash plate 1*a* of the hydraulic pump 1, the servo piston 8*b* being housed in a servo cylinder 8*c*. A cylinder chamber of the servo cylinder 8*c* is partitioned by the servo piston 8*b* into a left-hand chamber 8*d* and a right-hand chamber 8*e*. These chambers are formed such that the cross-sectional area D of the left-hand chamber 8*d* is larger than the cross-sectional area d of the right-hand chamber 8*e*.

The left-hand chamber 8*d* of the servo cylinder 8*c* is communicated with a hydraulic source 10 such as a pilot pump via a line 8*f*, and the right-hand chamber 8*e* of the servo cylinder 8*c* is communicated with the hydraulic source 10 via a line 8*i*, the line 8*f* being communicated with being communicated with a reservoir (tank) 11 via a return line 8*j*. A solenoid valve 8*g* is interposed in the line 8*f*, and a solenoid valve 8*h* is interposed in the return line 8*j*. These solenoid valves 8*g*, 8*h* are each a normally closed solenoid valve (with the function of returning to a closed state upon de-energization), and switched over by the drive signal from the control unit 7.

When the solenoid valve 8*g* is energized (turned on) for switching to its open position B, the left-hand chamber 8*d* of the servo cylinder 8*c* is communicated with the hydraulic source 10, whereupon the servo piston 8*b* is forced to move rightwardly on the drawing due to the difference in the cross-sectional area between the left-hand chamber 8*d* and the right-hand chamber 8*e*. This increases a tilting angle of the swash plate 1*a* of the hydraulic pump 1 and hence the delivery rate. When the solenoid valve 8*g* and the solenoid valve 8*h* are both de-energized (turned off) for returning to their closed positions A, the oil passage leading to the left-hand chamber 8*d* is cut off and the servo piston 8*b* remains rest at the then position. The tilting angle of the swash plate 1*a* of the hydraulic pump 1 is thereby kept constant, and so is the delivery rate. When the solenoid valve 8*h* is energized (turned on) for switching to its open position B, the left-hand chamber 8*d* of the servo cylinder 8*c* is communicated with the reservoir 11 to reduce the pressure in the left-hand chamber 8*d*, whereby the servo piston 8*b* is forced to move leftwardly on the drawing with the pressure in the right-hand chamber 8*e*. This decreases the tilting angle of the swash plate 1*a* of the hydraulic pump 1 and hence the delivery rate.

Figure 3:
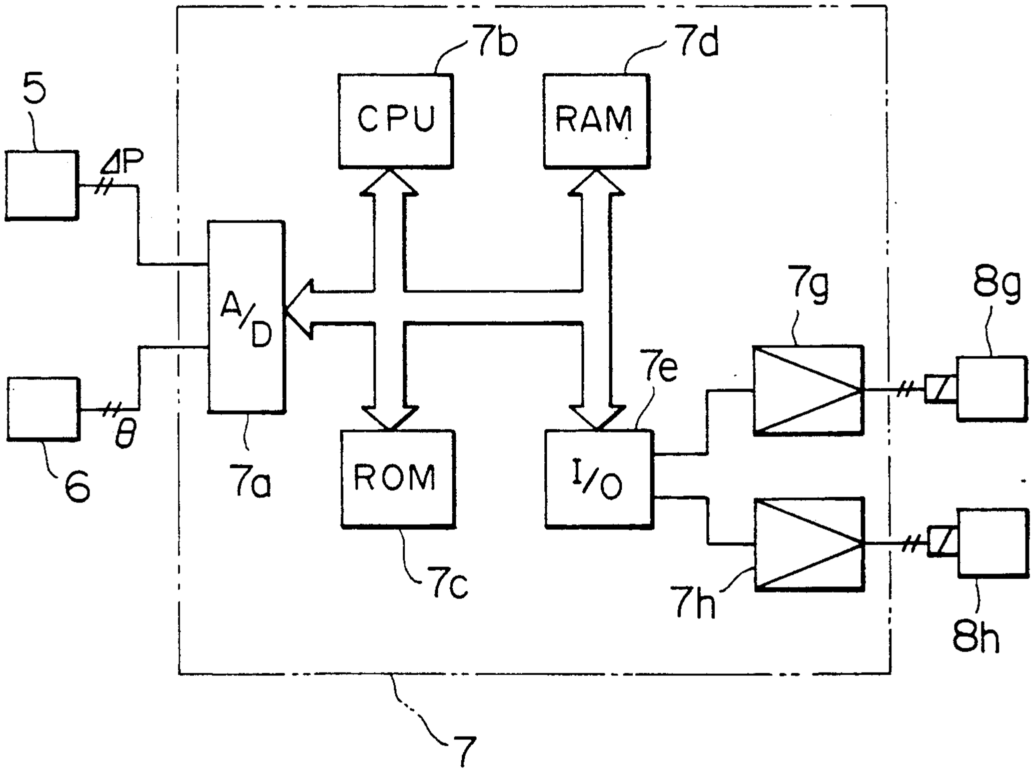
FIG. 3 is a schematic diagram showing arrangement of a control unit.

The control unit 7 is constituted by a microcomputer and, as shown in FIG. 3, comprises an A/D converter 7*a* for converting the differential pressure signal $\Delta P$ outputted from the differential pressure sensor 5 and the swash plate position signal $\theta$ outputted from the swash plate position sensor 6 to digital signals, a central processing unit (CPU) 7*b*, a read only memory (ROM) 7*c* for storing a program for the control sequence, a random access memory (RAM) 7*d* for temporarily storing numerical values under calculations, an I/O interface 7*e* for outputting the drive signals, and amplifiers 7*g*, 7*h* connected to the aforesaid solenoid valves 8*g*, 8*h*, respectively.

The control unit 7 calculates a swash plate target position $\theta o$ from the differential pressure signal $\Delta P$ outputted from the differential pressure sensor 5 based on the program for the control sequence stored in the ROM 7*c*, and creates the drive signals from the swash plate target position $\theta o$ and the swash plate position signal $\theta$ outputted from the swash plate position sensor 6 for making a deviation therebetween zero, followed by outputting the drive signals to the solenoid valves 8*g*, 8*h* of the swash plate position controller 8 from the amplifiers 7*g*, 7*h* via the I/O interface 7*e*. The swash plate 1*a* of the hydraulic pump 1 is thereby controlled so that the swash plate position signal $\theta$ coincides with the swash plate target position $\theta$.

Figure 4:
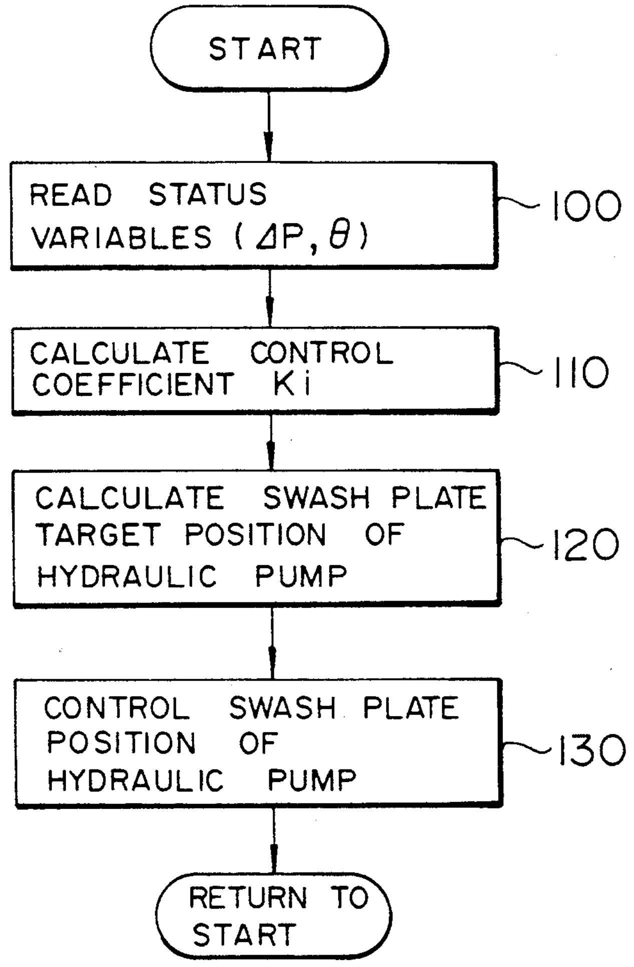
FIG. 4 is a flowchart showing the control sequence carried out in the control unit.

Function and operation of this embodiment will be described below in detail by referring to a flowchart, shown in FIG. 4, of a program for the control sequence stored in the ROM 7*c*.

First, in a step 100, respective outputs of the differential pressure sensor 5 and the swash plate position sensor 6 are entered to the control unit via the A/D converter 7*a* and stored in the RAM 7*d* as the differential pressure signal $\Delta P$ and the swash plate position signal $\theta$.

Figure 5:
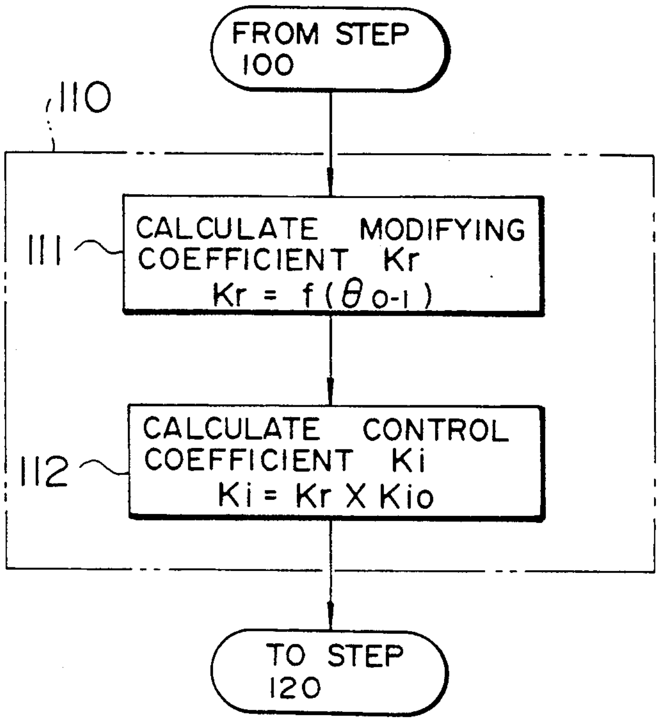
FIG. 5 is a flowchart showing details of a step of calculating a control coefficient Ki in the flowchart shown in FIG. 4.
Figure 6:
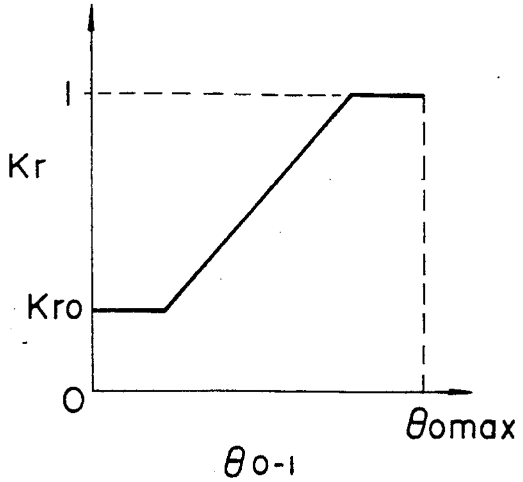
FIG. 6 is a characteristic graph showing the relationship between a swash plate position and a modifying coefficient Kr.

Then, in a step 110, the control unit calculates a control coefficient Ki used for controlling a tilting speed of the swash plate 1*a*. FIG. 5 shows details of the step 110. In a step 111 of FIG. 5, a modifying coefficient Kr is calculated from the swash plate target position $\theta o$-1 which has been calculated in the last cycle. The calculation is made by previously storing table data as shown in FIG. 6 in the ROM 7*c*, and reading the modifying coefficient Kr corresponding to the swash plate target position $\theta o$-1 from the table data. Here, the relationship of $\theta o$-1 versus Kr shown in FIG. 6 is set such that when the swash plate target position is small, the control coefficient Ki determined in a step 112 described later takes a small value which enables to perform stable control without making the delivery pressure of the hydraulic pump 1 so abruptly changed as to cause hunting, and when the swash plate target position is large, it takes a sufficient value to provide a prompt response by avoiding slow change in the delivery pressure. Notice that instead of storing the modifying coefficient Kr in the form of table data, the modifying coefficient Kr may be determined through arithmetic operations by programming the calculation formula in advance.

Then, in a step 112, the modifying coefficient Kr is multiplied by a preset basis value Kio of the control coefficient to obtain the control coefficient Ki. In this case, the basic value Kio of the control coefficient is given by a value which is optimum when the swash plate target position takes a maximum value ($\theta$omax). The modifying coefficient Kr is therefore set such that, as shown in FIG. 6, it becomes 1 when the swash plate target position is at maximum ($\theta$omax), and it takes a smaller value ($<1$) as the swash plate target position is decreased. Alternatively, the basic value Kio may be given by a value which is optimum when the swash plate target position takes a minimum value. In this case, the modifying coefficient Kr may be set such that it becomes 1 when the swash plate target position is at minimum, and it takes a larger value ($>1$) as the swash plate target position is increased. As a further alternative, the basic value Kio may be given by a value which is optimum when the swash plate target position is intermediate between maximum and minimum. In this case, the modifying coefficient Kr may be set such that it becomes larger ($>1$) as the swash plate target position is increased from the intermediate, and it becomes smaller ($>1$) as the swash plate target position is decreased. In either case, the control coefficient Ki is obtained as the same value.

Figure 7:
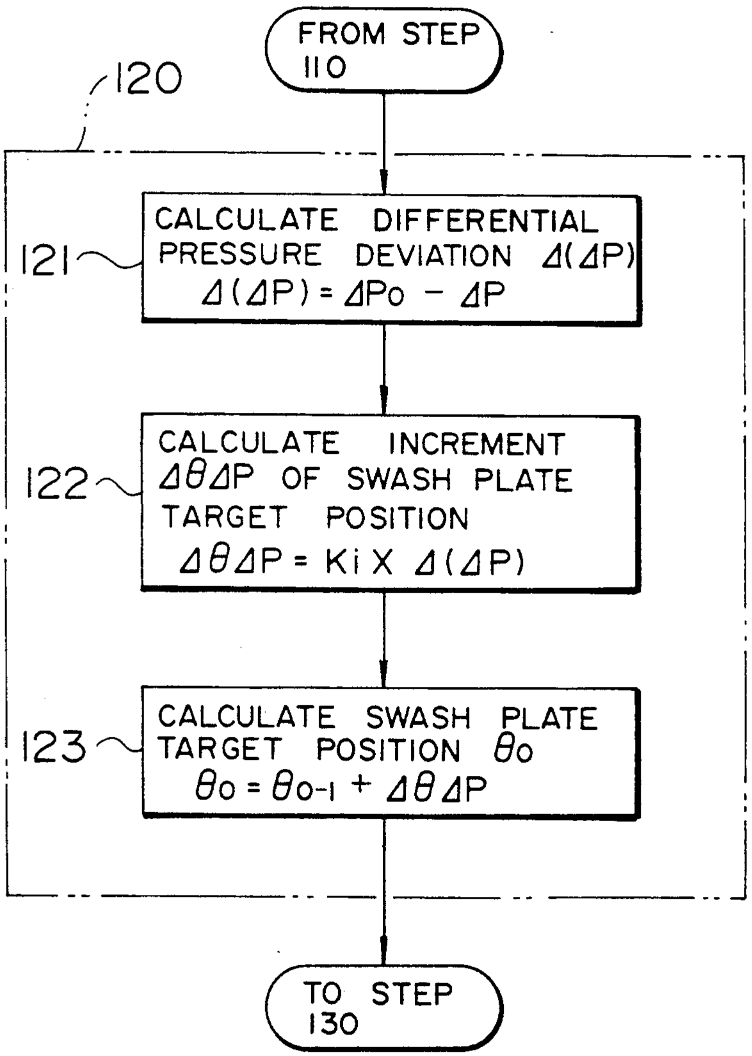
FIG. 7 is a flowchart showing details of a step of calculating a swash plate target position of a hydraulic pump in the flowchart of FIG. 4.

Next, returning to FIG. 4, a step 120 calculates a swash plate target position (i.e., a target tilting amount) of the hydraulic pump through integral control. FIG. 7 shows details of the step 120. In a step 121 of FIG. 7, a deviation $\Delta$ ($\Delta$P) between a present target value $\Delta$Po of the differential pressure and the differential pressure signal $\Delta$P entered in the step 100 is calculated.

Then, in a step 122, an increment $\Delta\theta_{\Delta P}$ of the swash plate target position is calculated. Specifically, the control coefficient Ki determined in the step 110 is multiplied by the above differential pressure deviation $\Delta$ ($\Delta$P) to obtain the increment $\Delta\theta_{\Delta P}$ of the swash plate target position.

Assuming that a period of time required for the program proceeding from the step 100 to 130 (i.e., cycle time) is tc, the increment $\Delta\theta_{\Delta P}$ of the swash plate target position represents an increment of the swash plate target position for the cycle time tc and hence $\Delta\theta_{\Delta P}$/tc gives a target tilting speed of the swash plate.

Then, in a step 123, the increment $\Delta\theta_{\Delta P}$ is added to the swash plate target position $\theta$o-1 which has been calculated in the last cycle, to obtain the current (new) swash plate target position $\theta$o.

Figure 8:
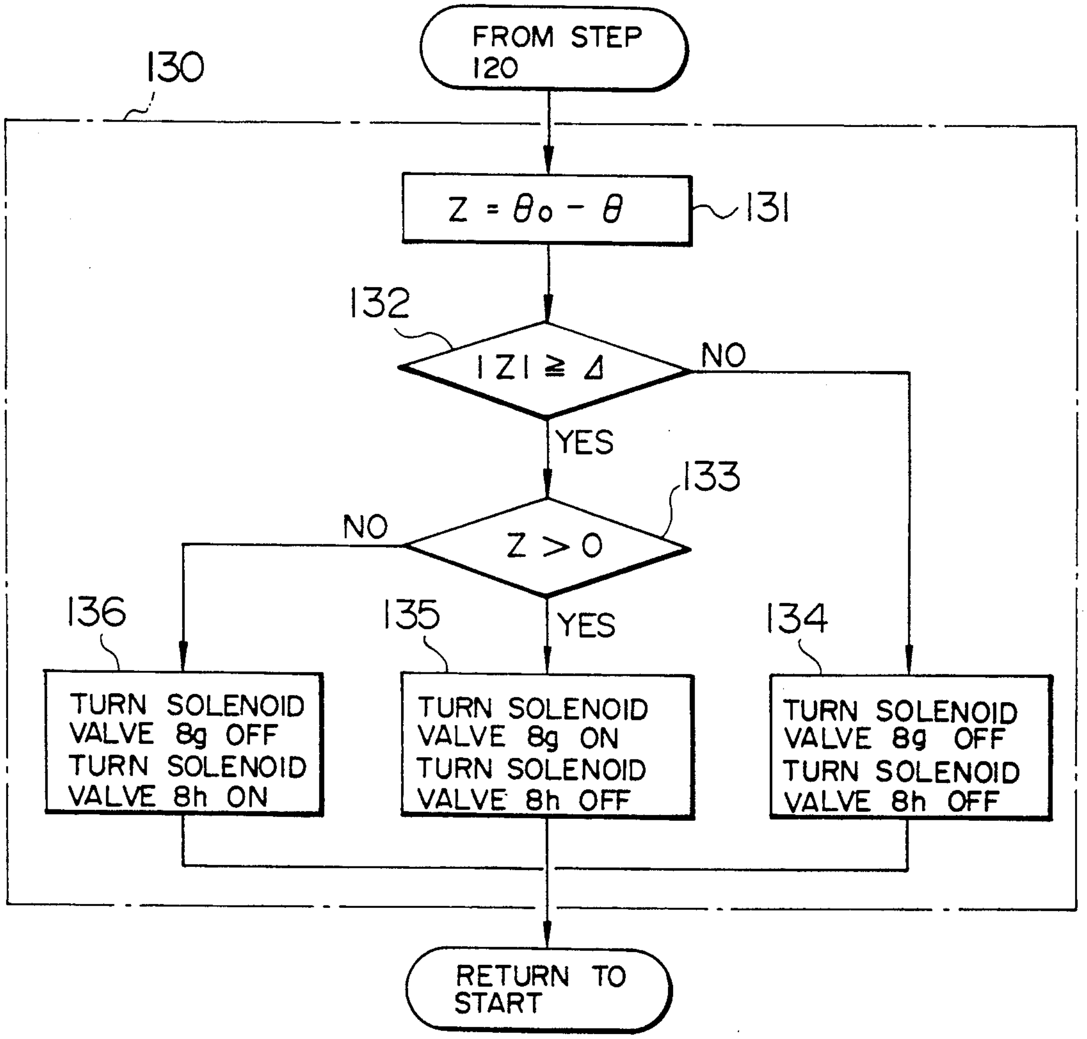
FIG. 8 is a flowchart showing details of a step of controlling the swash plate position of the hydraulic pump in the flowchart shown of FIG. 4.

Next, returning to FIG. 4, a step 130 controls the tilting position (tilting amount) of the hydraulic pump. FIG. 8 shows details of the control. In a step 131 of FIG. 8, a deviation Z between the swash plate target position $\theta$o calculated in the step 120 and the swash plate position signal $\theta$ entered in the step 100 is calculated.

Then, in a step 132, it is determined whether an absolute value of the deviation Z is within a dead zone $\Delta$ for the swash plate position control. If $|Z|$ is determined to be smaller than the dead zone $\Delta$ ($|Z|<\Delta$), the control flow proceeds to a step 134 where OFF signals are outputted to the solenoid valves 8*g*, 8*h* for rendering the swash plate position fixed. If $|Z|$ is determined to be not smaller than the dead zone $\Delta$ ($|Z|\geqq\Delta$) in the step 132, the control flow proceeds to a step 133. The step 133 determines whether Z is positive or negative. If Z is determined to be positive ($Z>0$), the control flow proceeds to step 135. In the step 135, an ON and OFF signal are outputted to the solenoid valves 8*g* and 8*h*, respectively, for moving the swash plate position in the direction to increase.

If Z is determined to be zero or negative ($Z\leqq0$) in the step 133, the control flow proceeds to step 136. In the step 136, an OFF and ON signal are outputted to the solenoid valves 8*g* and 8*h*, respectively, for moving the swash plate position in the direction to decrease.

Through the foregoing steps 131-136, the swash plate position is so controlled as to coincide with the target position. Also, the above steps 110-130 are carried out once for the cycle time tc mentioned above, resulting in that the tilting speed of the swash plate 1*a* is controlled to the aforesaid target speed $\Delta\theta_{\Delta P}$/tc.

Figure 9:
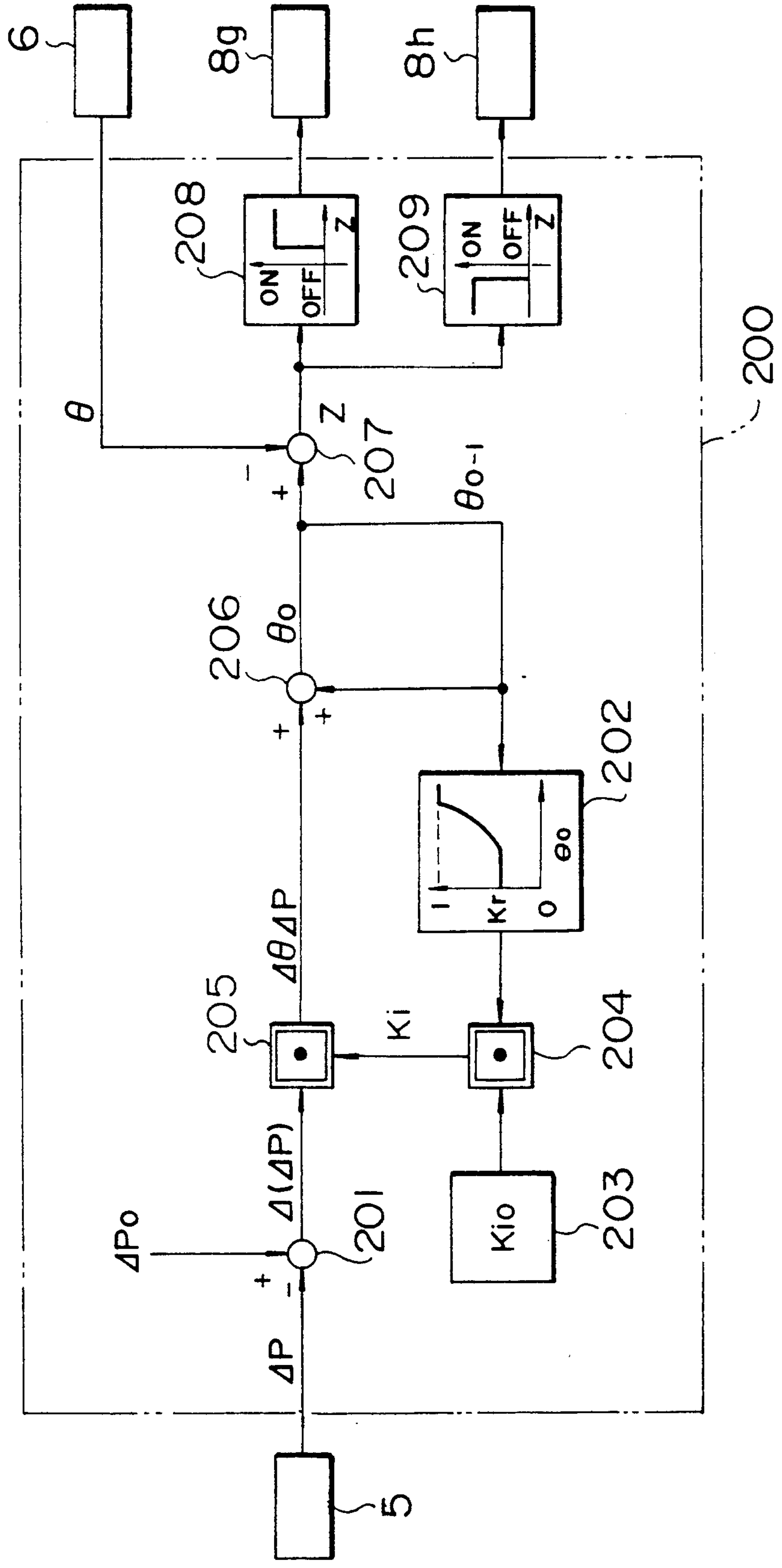
FIG. 9 is a block diagram showing control steps of the first embodiment together in the form of blocks.

The above-explained control steps are shown together in FIG. 9 at 200 in the form of blocks. In FIG. 9, blocks 202-204 correspond to the step 110, blocks 201, 205, 206 correspond to the step 120, and blocks 207-209 correspond to the step 130.

Operation of this embodiment thus arranged will be described below by mainly referring to FIGS. 1 and 9.

In FIG. 1, when the operating lever 3*a* of the actuator 2, for example, is operated to open the flow control valve 3 to an arbitrary degree of opening, the delivery pressure of the hydraulic pump 1 is lowered to reduce the differential pressure between the pump delivery pressure Pd and the load pressure PL of the actuator 2, i.e., the LS differential pressure $\Delta$P is detected by the differential pressure sensor 5. For controlling the LS differential pressure $\Delta$P to a predetermined value, the deviation $\Delta$ ($\Delta$P) between the detected differential pressure $\Delta$P and the differential pressure target value $\Delta$Po preset in the control unit 7 is first calculated. Then, this differential pressure deviation $\Delta$ ($\Delta$P) is multiplied by the control coefficient Ki to determine the increment of the swash plate target position (tilting amount), i.e., the target tilting speed $\Delta\theta_{\Delta P}$ of the swash plate. This increment is added to the swash plate target value $\theta$o-1 in the last cycle to calculate the new swash plate target position $\theta$o. The swash plate is driven at the tilting speed of $\Delta\theta_{\Delta P}$ so as to make the actual swash plate position coincident with the swash plate target position $\theta$o, thereby controlling the LS differential pressure $\Delta$P. As a result, the delivery rate of the hydraulic pump 1 is controlled so that the LS differential pressure $\Delta$P is held at the target value $\Delta$Po.

Now, when the tilting amount of the swash plate 1*a* is small and hence the swash plate target position $\theta$o is small, the modifying coefficient Kr calculated in the block 202 of FIG. 2 also takes a small value ($<1$), and so does the control coefficient Ki obtained by multiplying the modifying coefficient Kr by the basic value Kio. Consequently, the swash plate target tilting speed $\Delta\theta_{\Delta P}$ is calculated as a small value, and the swash plate 1*a* is driven at the resultant small tilting speed.

Further, when the tilting amount of the swash plate 1*a* is large and hence the swash plate target position $\theta$o is large, the modifying coefficient Kr calculated in the block 202 of FIG. 2 also takes a large value ($\approx 1$), and so does the control coefficient Ki. Consequently, the swash plate target tilting speed $\Delta\theta_{\Delta P}$ is calculated as a large value, and the swash plate 1*a* is driven at the resultant large tilting speed.

Meanwhile, in the foregoing LS control, the delivery pressure of the hydraulic pump 1 is determined dependent on a difference between the flow rate of the hydraulic fluid flowing into a line, extending from the hydraulic pump 1 to the flow control valve 3, and the flow rate of the hydraulic fluid flowing out of the line, as well as a volume into which the delivered hydraulic fluid is allowed to flow. Therefore, when the opening of the flow control valve 3 is small, the line is so restricted by the flow control valve 3 that the small line volume between the hydraulic pump 1 and the flow control valve 3 plays a predominant factor. As a result, the delivery pressure is largely varied even with slight change in the flow rate upon change in the swash plate position. On the other hand, when the opening of the flow control valve 3 is large, the line is less restricted by the flow control valve 3 and the large line volume between the pump 1 and the actuator 2 now takes part in pressure change, whereby change in the delivery pressure upon change in the delivery rate is reduced. Stated otherwise, when the opening of the flow control valve 3 is small, the control system is in a condition likely to cause hunting, and when the opening thereof is large, it is in a condition difficult to control the delivery pressure promptly in response to change in the delivery rate.

With this embodiment, as described above, when the opening of the flow control valve 3 is small, the swash plate target tilting speed $\Delta\theta_{\Delta P}$ is calculated as a small value, and the tilting speed of the swash plate 1*a* becomes small. It is therefore possible to perform stable control without making the delivery pressure so abruptly changed as to cause hunting.

Also, when the opening of the flow control valve 3 is large, the swash plate target tilting speed $\Delta\theta_{\Delta P}$ is calculated as a large value, and the tilting speed of the swash plate 1*a* becomes large. It is therefore possible to perform stable control with a good response, while avoiding too slow change in the delivery pressure.

For instance, when the operating lever 3*a* is operated in a large stroke to increase the opening of the flow control valve 3, the swash plate target position θo is also increased and the modifying coefficient Kr calculated in the block 202 of FIG. 9 takes a larger value ($\simeq 1$), as the tilting amount of the swash plate 1*a* becomes larger. Accordingly, the control coefficient Ki takes a large value, and the swash plate target tilting speed $\Delta\theta_{\Delta P}$ is calculated as a large value, which allows the swash plate 1*a* to be driven at the large tilting speed. As a result, the flow rate is varied to a larger extent dependent on change in the swash plate position, and a period of time required for the LS differential pressure returning to the target value ΔPo is shortened, making it possible to provide a prompt response without rendering change in the delivery pressure of the hydraulic pump 1 too slow.

Figure 10:
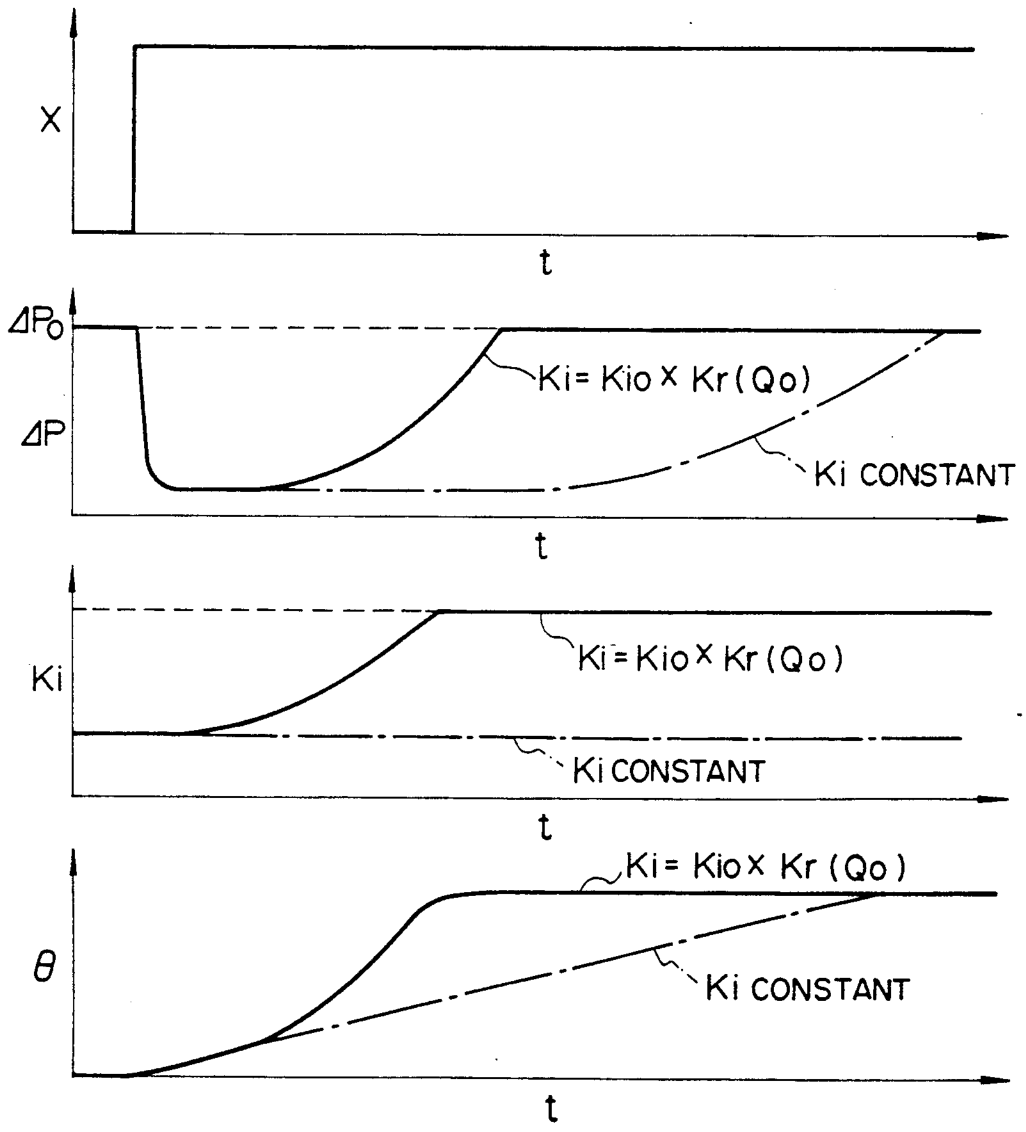
FIG. 10 is a chart showing change in the opening of a flow control valve, the LS differential pressure, the control coefficient and the swash plate position over time, for explaining operation of the first embodiment.

FIG. 10 shows change in the operation amount (opening) X of the flow control valve 3, the LS differential pressure ΔP, the control coefficient Ki and the tilting amount θ of the swash plate 1*a* over time, when the operating lever 3*a* is operated in a large stroke to increase the opening of the flow control valve 3. In the drawing, one-dot chain lines represent change in the LS differential pressure ΔP, the control coefficient Ki and the tilting amount θ of the swash plate over time, as found when the control coefficient Ki is set at a small constant value to perform stable control in a region where the opening X of the flow control valve is small, as with conventional setting of the control gain. As will be seen from FIG. 10, in the case the control coefficient (control gain) Ki is set at a small constant value, even when the opening X of the flow control valve is increased in an attempt of operating a boom of a hydraulic excavator at large speeds, for example, the tilting speed of the swash plate (i.e. change in the swash plate tilting amount θ) is so small that the differential pressure ΔP, after once lowered, cannot quickly return to the target value ΔPo. Consequently, an acceleration of the boom is reduced, causing the operator to feel that the excavator (or the boom) is too slow in action.

On the contrary, in this embodiment, since the control coefficient Ki becomes larger as the swash plate target position θo is increased, the swash plate tilting speed is also increased with an increase in the swash plate tilting angle θ, as shown in solid lines in FIG. 10. Therefore, a period of time required to reach the demanded flow rate is shortened, and so does a period of time required for the differential pressure ΔP to the target value ΔPo. As a result, the actuator 2 (boom) is prevented from lowering in its acceleration and from being too slow in action, whereby a prompt response can be provided.

With this embodiment, therefore, when the operation amount (opening) of the flow control valve is small, the control coefficient Ki takes a small value, which can ensure stable control without making the delivery pressure so abruptly changed as to cause hunting. When the operation amount (opening) of the flow control valve is large, the control coefficient Ki is increased to provide a prompt response by avoiding slow change in the delivery pressure of the hydraulic pump 1. As a result, it is possible to perform optimum pump control over an entire range of the valve opening independently of any operated state of the flow control valve.

MODIFICATION OF FIRST EMBODIMENT

Figure 11:
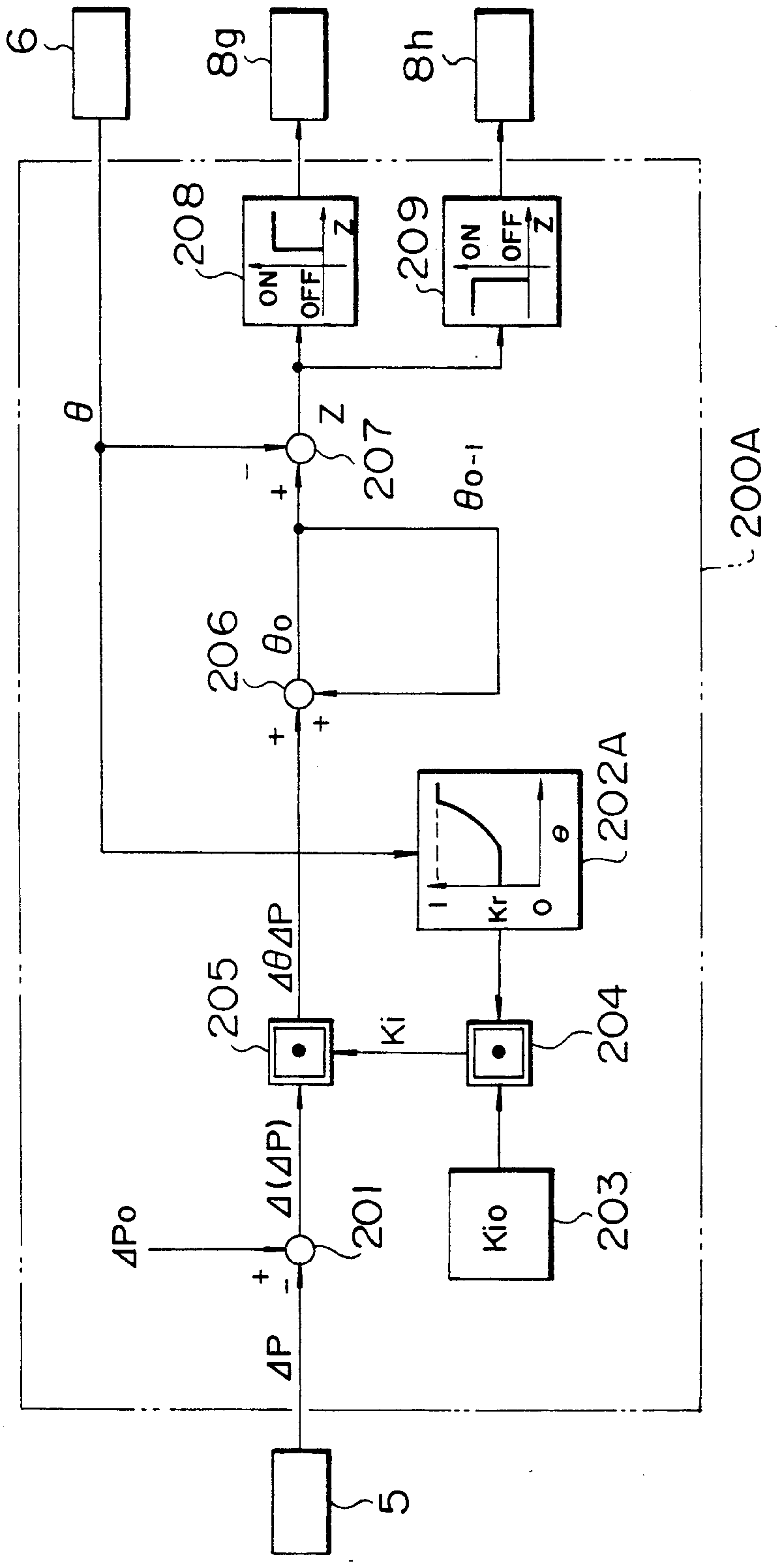
FIG. 11 is a block diagram similar to FIG. 9, showing a modification of the first embodiment.

While the modifying coefficient Kr used for determining the control coefficient Ki is calculated from the swash plate target position θo in the above embodiment, the equivalent control can also be made using the actual tilting amount of the swash plate 1*a*, i.e., the detected value θ of the swash plate position sensor 6, because the tilting amount of the swash plate 1*a* is so controlled as to coincide with the target position θo. FIG. 11 shows a modification to implement this case. In the drawing, an entire control block is denoted by 200A in which those blocks having the same functions as those in FIG. 9 are denoted by the same reference numerals. Further, 202A is a block for determining the modifying coefficient Kr from the actual swash plate position θ detected by the swash plate position sensor 6. This modification can also provide a similar advantageous effect to that in the foregoing embodiment.

SECOND EMBODIMENT

Figure 12:
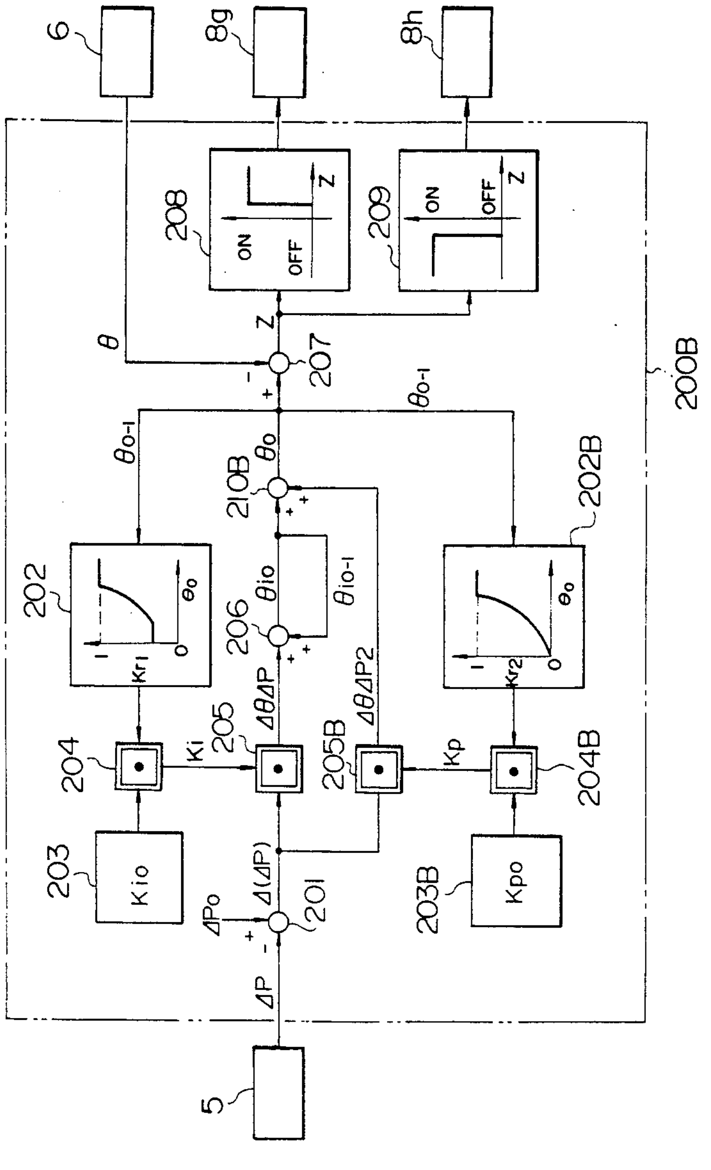
FIG. 12 is a block diagram similar to FIG. 9, showing a control system for a hydraulic pump according to a second embodiment of the present invention.

A second embodiment of the present invention will be described with reference to FIG. 12. In FIG. 12, too, those blocks having the same functions as those in FIG. 9 are denoted by the same reference numerals.

A block 200B of this embodiment further includes blocks 202B-205B and 210B in addition to the arrangement of the first embodiment shown in FIG. 9. These blocks are intended to carry out proportional compensation for improving a momentary response in control and providing still stabler control. In this proportional compensation, control of the control gain (i.e., adjustment of the control coefficient) is also effected using the swash plate position of the hydraulic pump 1.

More specifically, in an arithmetic operating section with the integral control technique which is arranged like the first embodiment, a modifying coefficient Kr1 is calculated in the block 202 from the swash plate target position θo-1 which has been calculated in the last cycle, and the modifying coefficient Kr1 is multiplied in the block 204 by a basic value Kio of the control coefficient preset in the block 203 for calculating the control coefficient Ki. Then, the control coefficient Ki is multiplied in the block 205 by the deviation Δ(ΔP) of the differential pressure signal ΔP to determine an increment $\Delta\theta_{\Delta P1}$ of the swash plate target position, and the increment $\Delta\theta_{\Delta P1}$ is added in the block 206 to a swash plate target position θio-1 which has been calculated in the last cycle of the integral control, thereby calculating a current (new) swash plate target position θio through the integral control.

Furthermore, in this embodiment, a second modifying coefficient Kr2 is calculated in the block 202B from the swash plate target position θo-1 which has been calculated in the last cycle, and the second modifying coefficient Kr2 is multiplied in the block 203B by a basic value Kpo of a control coefficient for the proportional compensation preset in the block 203B, thereby determining the control coefficient Kp for the proportional compensation. Then, the control coefficient Kp is multiplied in the block 205B by the differential pressure deviation Δ(ΔP) to calculate a modification value $\Delta\theta_{\Delta P2}$ of the swash plate target position for the proportional compensation, and the modification value $\Delta\theta_{\Delta P2}$ is added in the block 210B to the swash plate target position θio to calculate a final swash plate target position θo.

In determining the control coefficient Kp for the proportional compensation, the basic value Kpo is set similarly to the basic value Kio of the control coefficient for the integral control. Specifically, the basic value Kpo is given by a value which is optimum when the swash plate target position is at maximum (θomax), for example, in this embodiment as well. Therefore, the modifying coefficient Kr2 is set such that it becomes 1 when the swash plate target position is at maximum (θomax), and becomes smaller (<1) as the swash plate target position is reduced.

With this embodiment, since the modification value $\Delta\theta_{\Delta P2}$ for the proportional compensation is added to the swash plate target position θo, it is possible not only to perform stable control free from hunting when the delivery rate of the hydraulic pump 1 is small, and provide a prompt response when the delivery rate of the hydraulic pump 1 is large, as with the first embodiment, but also to improve a momentary response in the control with the proportional compensation for providing still stabler control.

THIRD EMBODIMENT

A third embodiment of the present invention will be described with reference to FIG. 13. In the drawing, an entire control block is denoted by 200C in which the same elements as those in FIG. 9 are denoted by the same reference numerals. Further, 202C–204C are blocks to determine a modifying coefficient Kr3 for proportional control from the swash plate target position θo-1, and determine a control coefficient Kp for proportional calculation from the modifying coefficient Kr3 and the basic value Kpo. 205C is a block to multiply the control coefficient Kp by the differential pressure deviation Δ(ΔP) for calculating a swash plate target position θo through the proportional control.

Specifically, while the swash plate target value θo is calculated in the embodiment of FIG. 9 through the integral control is calculated, the blocks 202C–205C in this embodiment determines the swash plate target position θo through the proportional control using θo=Kp{Δ(ΔP)}, with which the swash plate 1*a* of the hydraulic pump 1 is controlled in its position.

The foregoing embodiments, especially the first embodiment shown in FIGS. 1–10, determine the swash plate target position θo of the hydraulic pump 1 through the integral control, and are hence suitable for driving an actuator which drives the relatively large load. In contrast, this embodiment calculates the swash plate target position θo through the proportional control, and is hence suitable for driving an actuator which drives the relatively small load. With this embodiment, since the control coefficient Kp is adjusted dependent on the swash plate target position θo as with the above embodiments, there can be obtained the advantageous effect similar to that in the first embodiment.

FOURTH EMBODIMENT

A fourth embodiment of the present invention will be described with reference to FIGS. 14–19. This embodiment uses the differential pressure deviation Δ(ΔP), instead of the swash plate position, for determining the control coefficient Ki. The hardware arrangement of this embodiment is exactly the same as those in the foregoing embodiments. Therefore, the following explanation will be made by referring to the hardware arrangement of FIG. 1.

Figure 14:
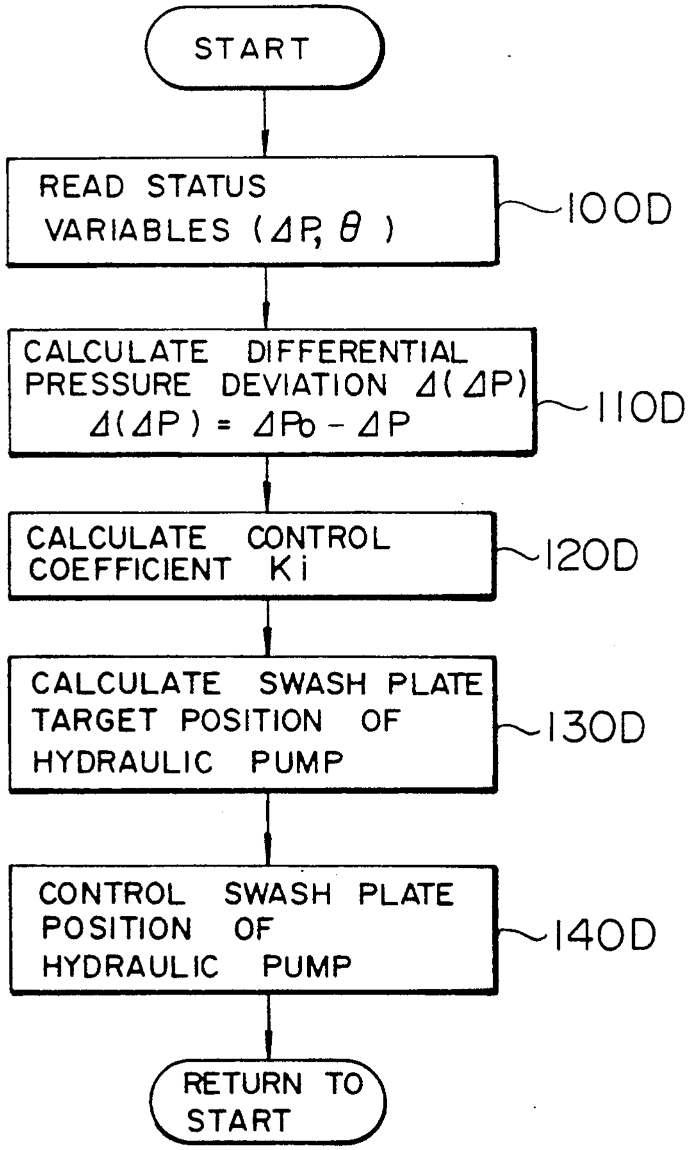
FIG. 14 is a flowchart showing the control sequence for a control system for a hydraulic pump according to a fourth embodiment of the present invention.

In this embodiment, the ROM 7*c* of the control unit 7 stores a program expressed by a flowchart in FIG. 14, and the delivery rate of the hydraulic pump 1 is controlled in accordance with the program. This control process will be explained below in detail with reference to the flowchart of FIG. 14.

First, in a step 100D, respective outputs of the differential pressure sensor 5 and the swash plate position sensor 6 are entered to the control unit 7 via the A/D converter 7*a* and stored in the RAM 7*d* as a differential pressure signal ΔP and a swash plate position signal θ.

Then, in a step 110D, a differential pressure deviation Δ(ΔP) between a preset target value ΔPo of the differential pressure and the differential pressure signal ΔP entered in the step 100D is calculated.

Figure 15:
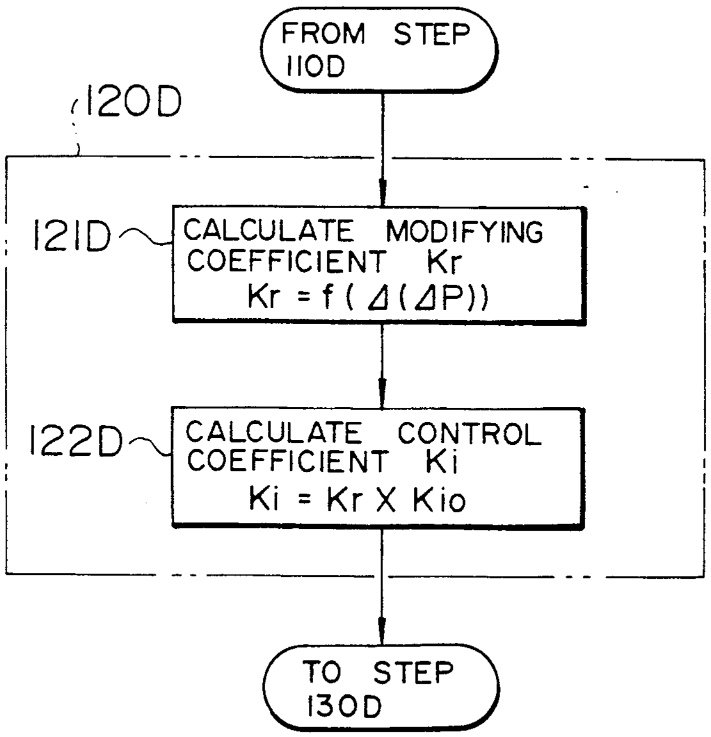
FIG. 15 is a flowchart showing details of a step of calculating a control coefficient Ki in the flowchart shown in FIG. 14.
Figure 16:
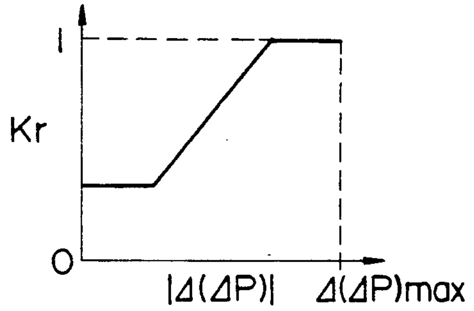
FIGS. 16(*a*)-16(*d*) are characteristic views each showing the relationship between a differential pressure deviation Δ (ΔP) and a modifying coefficient Kr.
Figure 16:
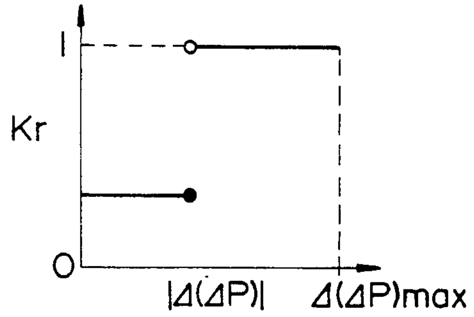
Figure 16:
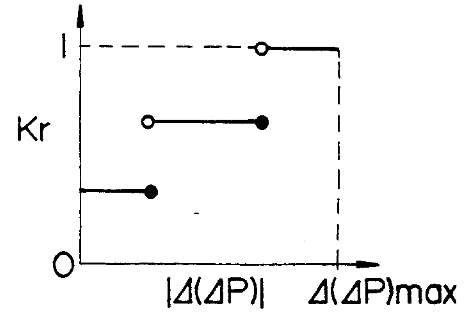
Figure 16:
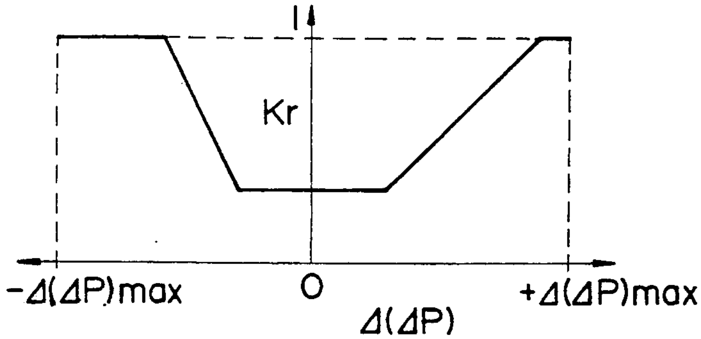

Then, a control coefficient Ki is calculated in a step 120D. FIG. 15 shows details of the step 120D. In a step 121D of FIG. 15, a modifying coefficient Kr is calculated from the differential pressure deviation Δ(ΔP) which has been calculated in the step 110D. The calculation is made by previously storing table data as shown in FIG. 16(*a*) in the ROM 7*c*, and reading the modifying coefficient Kr corresponding to an absolute value of the differential pressure deviation Δ(ΔP) from the table data. Here, the relationship of Δ(ΔP) versus Kr shown in FIG. 16(*a*) is set such that when the differential pressure deviation is small, the control coefficient Ki determined in a step 122D described later takes a small value which enables to perform stable control without making the delivery pressure of the hydraulic pump 1 so abruptly changed as to cause hunting, and when the differential pressure deviation is large, it takes a sufficient value to provide a prompt response by avoiding slow change in the delivery pressure. Also, in order to prevent the occurrence of hunting over an entire range of the operation amount of the flow control valve and to permit positive LS control, the modifying coefficient Kr at the small differential pressure deviation is set so that the control coefficient Ki takes such a value as not to cause hunting when the opening of the flow control valve is small. In other words, the modifying coefficient Kr at the small differential pressure deviation is made coincident with the value in the relationship of $\theta$o-1 versus Kr shown in FIG. 6 for the first embodiment, as given when the swash plate target position $\theta$o-1 is small.

Then, in a step 122D, the modifying coefficient Kr is multiplied by a preset basic value Kio of the control coefficient to obtain the control coefficient Ki. In this case, the basic value Kio of the control coefficient is given by a value which is optimum when the absolute value of the differential pressure deviation $\Delta(\Delta P)$ has a maximum value ($\Delta(\Delta P)$max). The modifying coefficient Kr is therefore set such that, as shown in FIG. 16(*a*), it becomes 1 when the absolute value of the differential pressure deviation is at maximum ($\Delta(\Delta P)$max), and it takes a smaller value ($<1$) as the absolute value of the differential pressure deviation is decreased.

Notice that although the table data stored in the ROM 7*c* is represented by FIG. 16(*a*) in this embodiment, step-like data shown in FIGS. 16(*b*) and 16(*c*), for example, may be employed dependent on control characteristics. Alternatively, the control characteristics may be different as shown in FIG. 16(*d*) dependent on whether $\Delta(\Delta P)$ is positive or negative.

Figure 17:
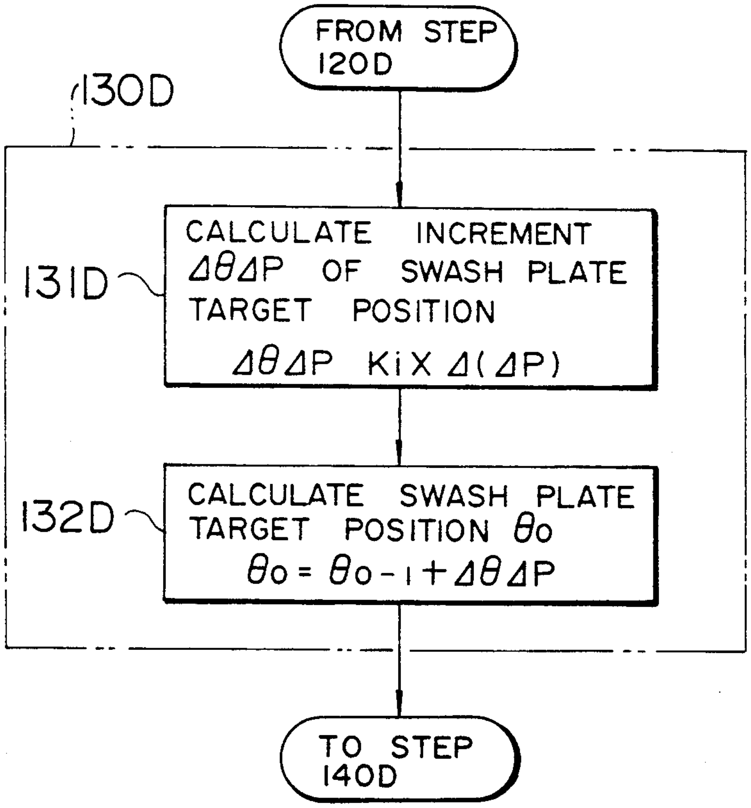
FIG. 17 is a flowchart showing details of a step of calculating a swash plate target position of the hydraulic pump in the flowchart of FIG. 14.

Next, returning to FIG. 14, a step 130D calculates a swash plate target position of the hydraulic pump through integral control. FIG. 17 shows details of the step 130D.

In a step 131D, an increment $\Delta\theta_{\Delta P}$ of the swash plate target position is calculated. Specifically, the control coefficient Ki determined in the step 120D is multiplied by the above differential pressure deviation $\Delta(\Delta P)$ to obtain the increment $\Delta\theta_{\Delta P}$ of the swash plate target position. Like the first embodiment, assuming that a cycle time is tc, $\Delta\theta_{\Delta P}$/tc gives a target tilting speed of the swash plate.

Then, in a step 131D, the increment $\Delta\theta_{\Delta P}$ is added to the swash plate target position $\theta$o-1 which has been calculated in the last cycle, to obtain a current (new) swash plate target position $\theta$o.

Next, returning to FIG. 14, a step 140D controls the tilting position of the hydraulic pump. Details of this control are similar to those of the step 130 in the first embodiment shown in FIG. 8 and their explanation is hence omitted. As a conclusion, in the step 140D, the swash plate position $\theta$ is so controlled as to coincide with the swash plate target position $\theta$o while driving the swash plate 1*a* of the hydraulic pump at the target speed $\Delta\theta_{\Delta P}$/tc.

Figure 18:
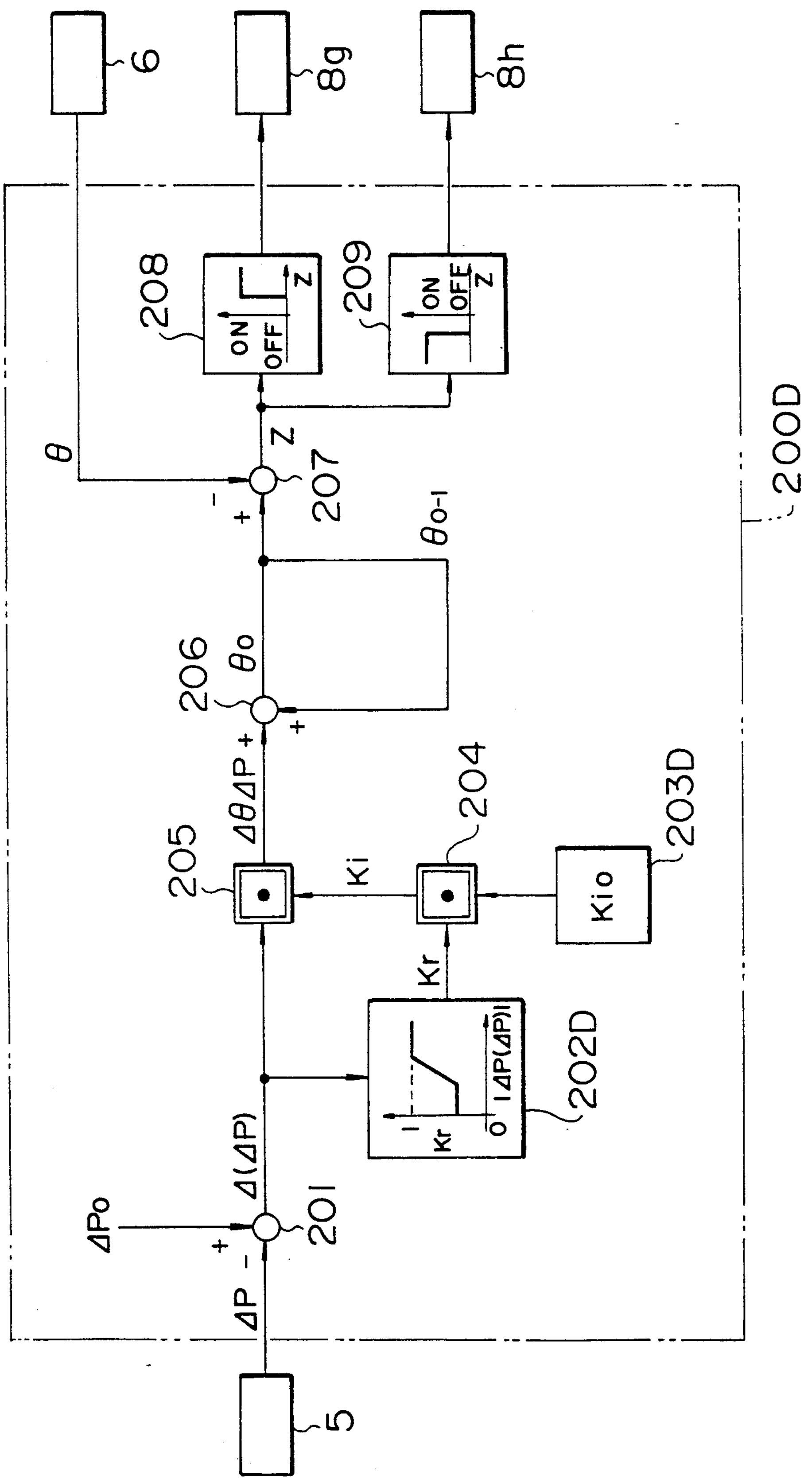
FIG. 18 is a block diagram showing control steps of the fourth embodiment together in the form of blocks.

The above-explained control steps are shown together in FIG. 18 at 200D in the form of blocks. In FIG. 18, a block 201 corresponds to the step 110D, blocks 202D, 203D, 204 correspond to the step 120D, blocks 205 and 26 correspond to the step 130D, and blocks 207-209 correspond to the step 140D.

In this embodiment thus arranged, when the operating lever 3*a* of the actuator 2, for example, is operated to open the flow control valve 3 to an arbitrary degree of opening, the swash plate target position $\theta$o is determined from both the differential pressure deviation $\Delta(\Delta P)$ and the control coefficient Ki for reducing the differential pressure deviation, and the delivery rate of the hydraulic pump 1 is controlled so that the LS differential pressure $\Delta P$ is held at the target value $\Delta$Po. In this point, this embodiment operates like the first embodiment.

Moreover, in this embodiment, when the operation speed of the operating lever 3*a* is low and hence the deviation between the demanded flow rate of the flow control valve 3 and the pump delivery rate is small, the pump delivery pressure is lowered slightly and the differential pressure deviation $\Delta(\Delta P)$ is also small. The modifying coefficient Kr calculated in the block 202D of FIG. 18, in turn, takes a small value ($<1$), and so does the control coefficient Ki obtained by multiplying the modifying coefficient Kr by the basic value Kio. Therefore, the swash plate target tilting speed $\Delta\theta_{\Delta P}$ is calculated as a small value, and the swash plate 1*a* is driven at the resultant small tilting speed. Consequently, even under a condition that the operating lever is operated in a small stroke and the opening of the flow control valve 3 is small in this case, stable control can be performed without making the delivery pressure so abruptly changed as to cause hunting.

Further, when the operating lever 3*a* is operated at large speeds to quickly increase the opening of the flow control valve 3, the deviation between the demanded flow rate and the pump delivery rate is increased to largely lower the pump delivery pressure, and hence the differential pressure deviation $\Delta(\Delta P)$ becomes large. Therefore, the modifying coefficient Kr also takes a large value ($\simeq 1$), and so does the control coefficient Ki. Consequently, the swash plate target tilting speed $\Delta\theta_{\Delta P}$ is calculated as a large value, and the tilting amount of the swash plate 1*a* is increased at the resultant large tilting speed.

Figure 19:
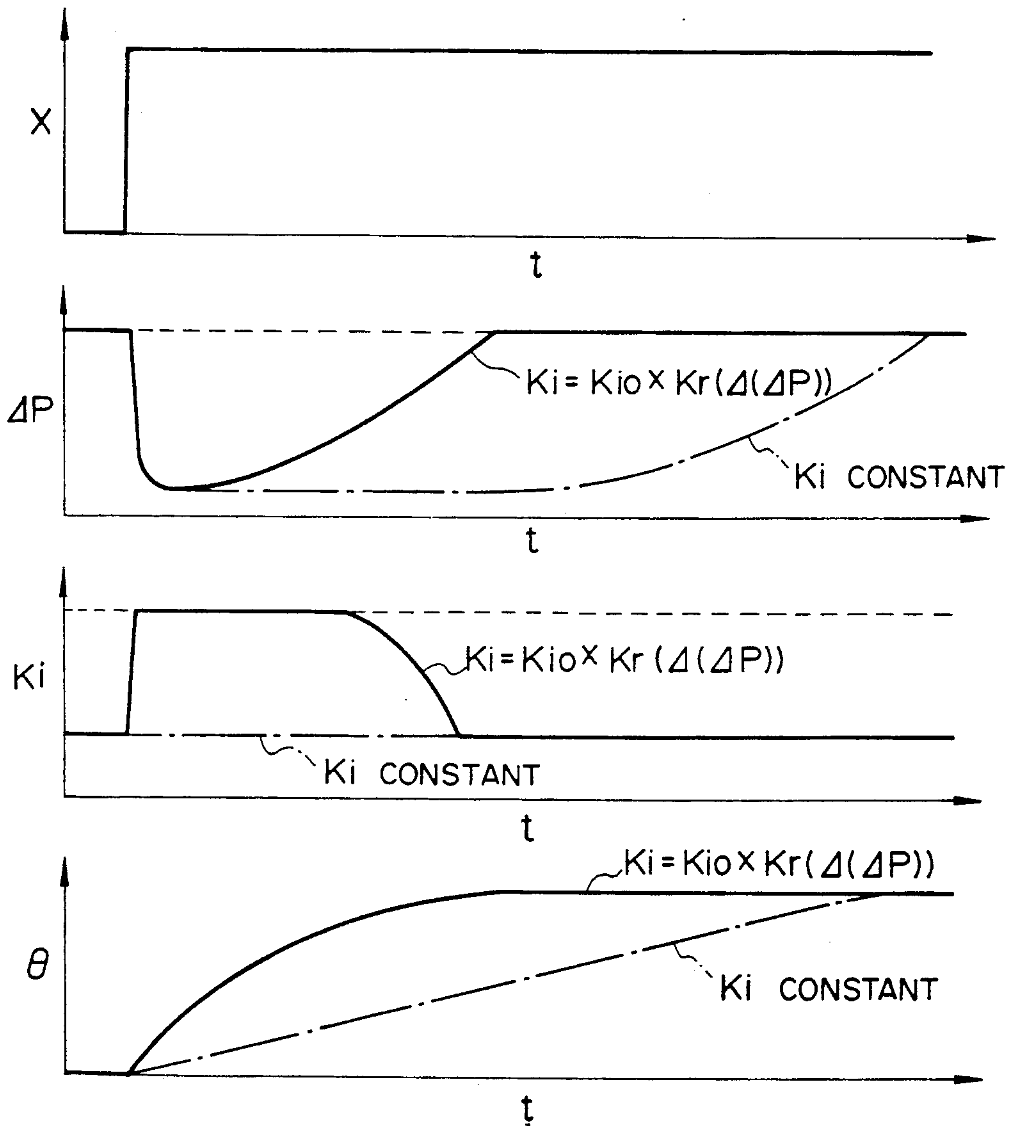
FIG. 19 is a chart showing change in the opening of a flow control valve, the LS differential pressure, the control coefficient and the swash plate position over time, for explaining operation of the fourth embodiment.

FIG. 19 shows details of change in the operation amount (opening) X of the flow control valve 3, the LS differential pressure $\Delta P$, the control coefficient Ki and the tilting amount $\theta$ of the swash plate 1*a* over time in this case. As with the plots in FIG. 10, one-dot chain lines in FIG. 19 represent change in the LS differential pressure $\Delta P$, the control coefficient Ki and the tilting amount $\theta$ of the swash plate over time, as found when the control coefficient Ki is set at a small constant value to perform stable control in a region where the opening X of the flow control valve is small. In this conventional case, as explained above, when the opening X of the flow control valve is quickly increased in an attempt of operating the boom fast, for example, the control coefficient Ki remains at a small constant value and hence the tilting speed of the swash plate is so small that the differential pressure $\Delta P$ takes a long time to return to the target value $\Delta$Po. As a result, the operator is forced to feel that the excavator (or the boom) is too slow in action.

On the contrary, in this embodiment, when the opening X of the flow control valve 3 is quickly increased, the pump delivery rate cannot follow the demanded flow rate of the flow control valve 3, whereby the pump delivery pressure is lowered to a large extent and the differential pressure deviation $\Delta$ ($\Delta P$) is increased, as shown in solid lines in FIG. 19. Therefore, the control coefficient Ki takes a large value, and the tilting amount of the swash plate 1*a* is increased at the large tilting speed. As the pump delivery rate approaches the demanded flow rate of the flow control valve 3, the differential pressure $\Delta P$ is gradually restored to reduce the differential pressure deviation $\Delta$ ($\Delta P$). Accordingly, the control coefficient Ki is also gradually reduced and, at the time the differential pressure deviation $\Delta$ ($\Delta P$)

reaches about zero (0), the control coefficient Ki is decreased down to a small value so that the differential pressure ΔP may be converged to the target value ΔPo in a stable manner. As a result, a period of time required to reach the demanded flow rate is shortened in comparison with the conventional case of setting the control coefficient Ki constant, and prompt and stable control can be performed without impeding the operator from feeling a positive acceleration of the actuator 2 (boom).

With this embodiment, too, therefore, when the operation speed of the flow control valve is small and its opening is small, it is possible to perform stable control without making the delivery pressure so abruptly changed as to cause hunting. When the operating lever is operated at large speeds to quickly increase the opening of the flow control valve, it is possible to provide a prompt response by avoiding slow change in the delivery pressure of the hydraulic pump 1.

Particularly, this embodiment employs change in the LS differential pressure (i.e., the differential pressure deviation), instead of the swash plate position, for determining the control coefficient corresponding to an operated state of the flow control valve 3. As will be seen from FIG. 19, the change in the LS differential pressure is increased immediately following the operation of the flow control valve, and is decreased gradually as the pump delivery rate increases. Therefore, the control coefficient Ki is also increased immediately upon the operation of the flow control valve, so that in a rising period just after the operation of the flow control valve, the tilting speed of the swash plate 1*a* becomes higher than is available in the first embodiment, and so dose an increase rate of the tilting amount of the swash plate. Consequently, this embodiment provides an advantageous effect of improving a response in a rising period just after the operation of the flow control valve.

MODIFICATIONS OF FOURTH EMBODIMENT

Figure 13:
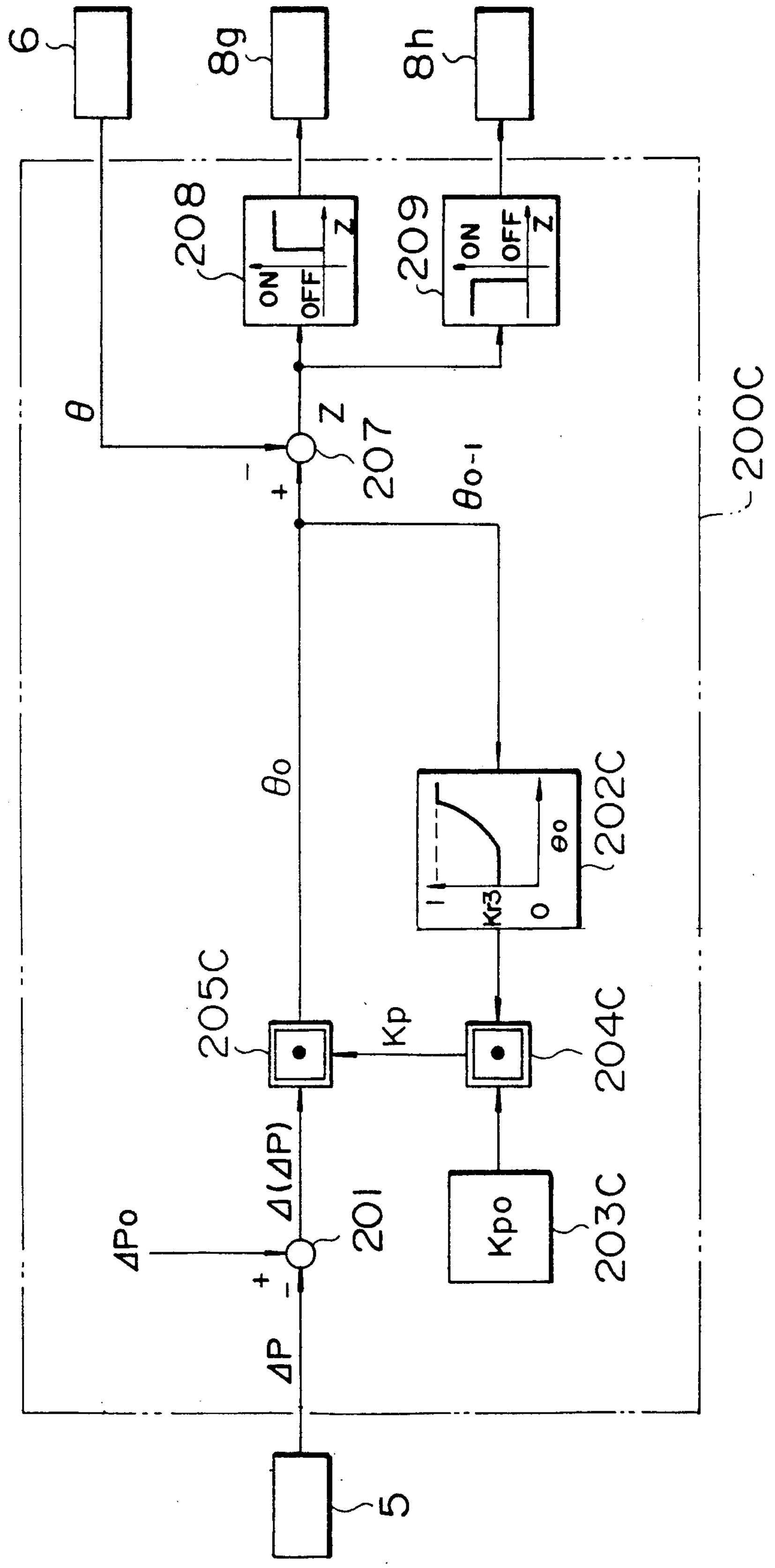
FIG. 13 is a block diagram similar to FIG. 9, showing a control system for a hydraulic pump according to a third embodiment of the present invention.

While the swash plate target position θo is determined from the differential pressure deviation Δ (ΔP) using the integral control technique in the above fourth embodiment, the combined technique of integral control calculation and proportional compensation or the proportional control technique may instead be used like the second and third embodiments shown in FIGS. 12 and 13. Corresponding modifications of the fourth embodiment are shown in FIGS. 20 and 21.

Figure 20:
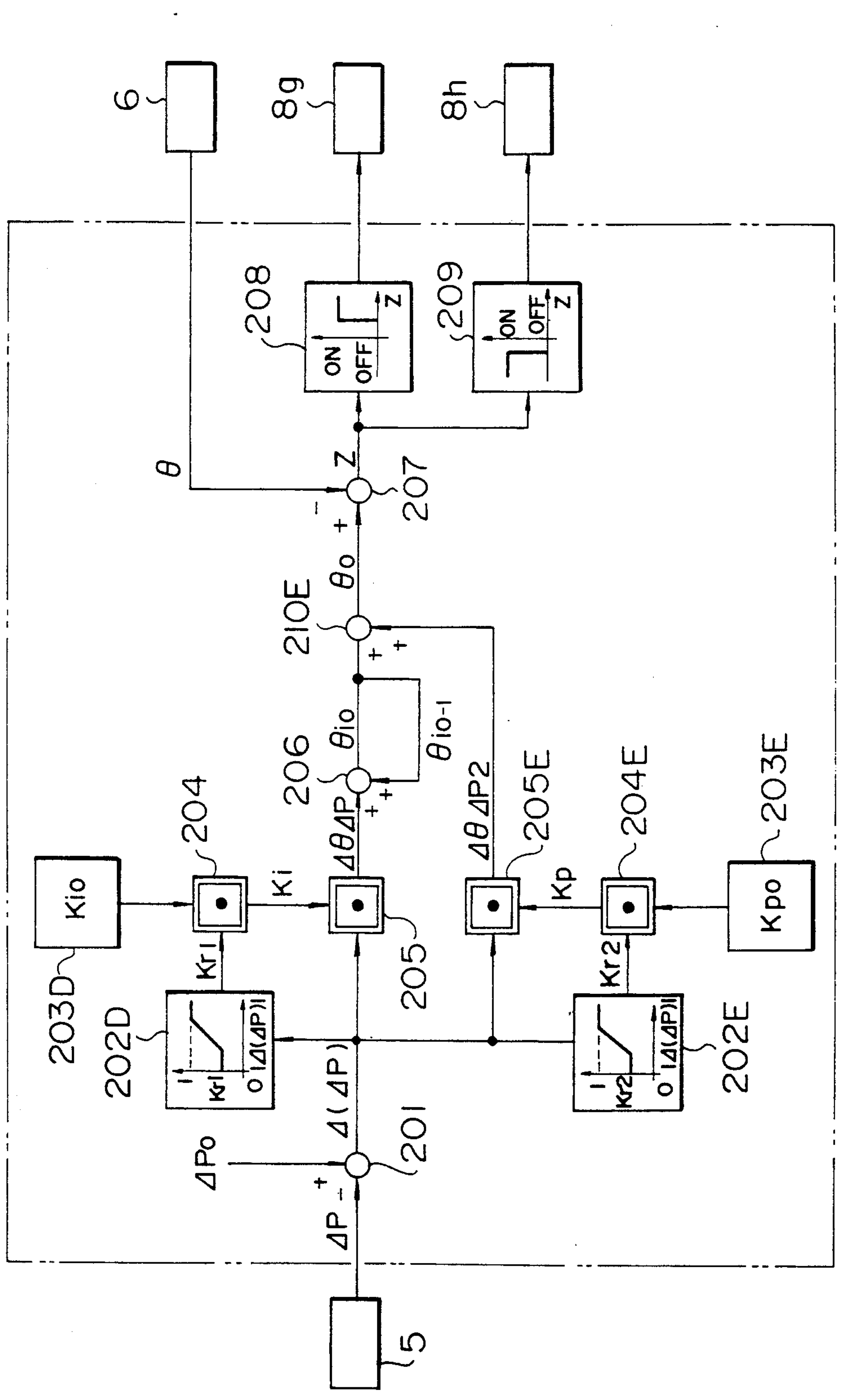
FIGS. 20 and 21 are block diagrams similar to FIG. 18, each showing a modification of the fourth embodiment.

In FIG. 20, an entire control block is denoted by 200E in which those blocks having the same functions as those in FIG. 18 are denoted by the same reference numerals. Blocks 202E–205E and 210E are to add the modification value $\Delta\theta_{\Delta P}$ for the proportional compensation to the swash plate target position θo, like the blocks 202B–205B and 210B in FIG. 12.

Figure 21:
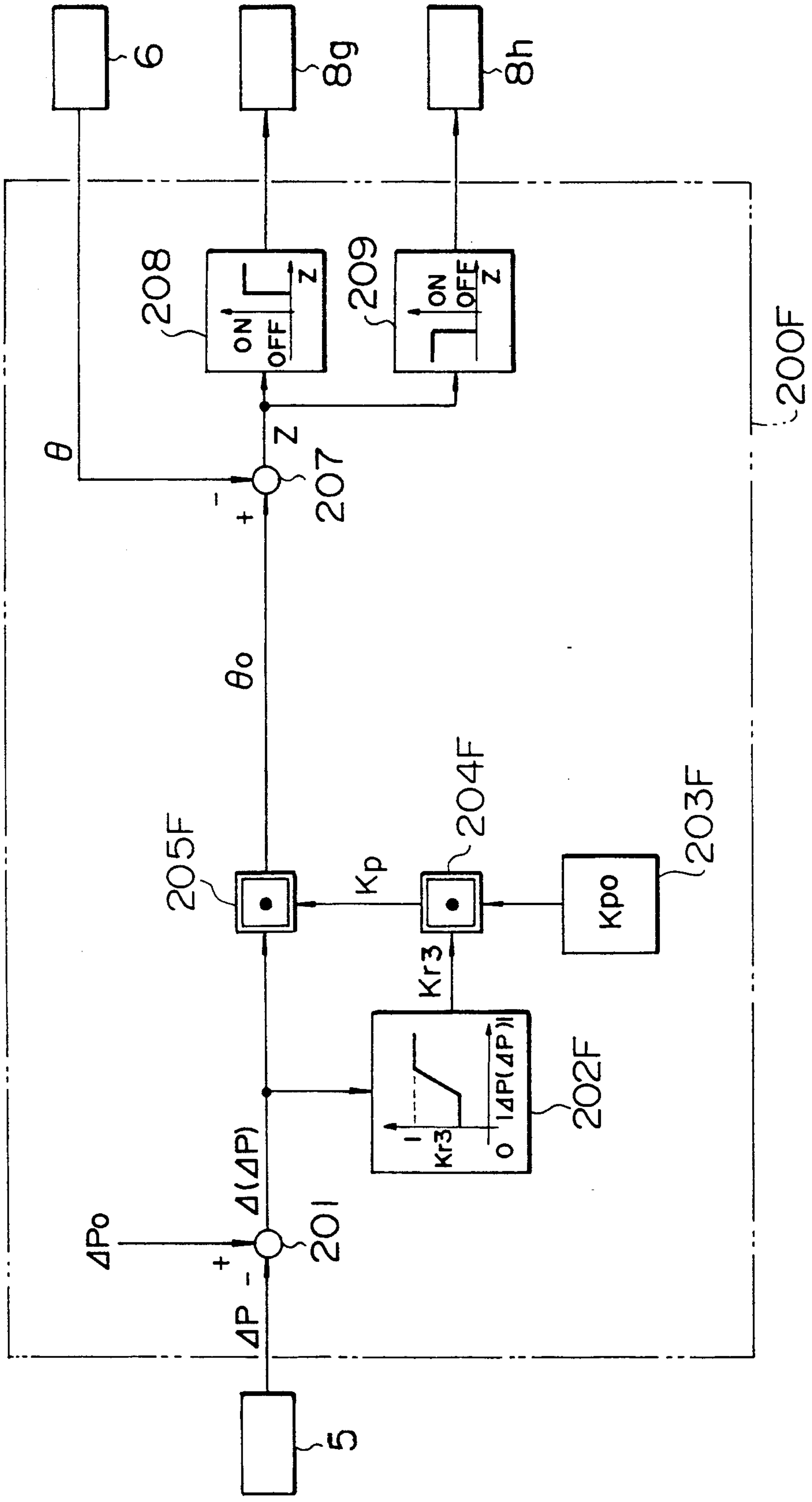

In FIG. 21, an entire control block is denoted by 200F in which those blocks having the same functions as those in FIG. 18 are denoted by the same reference numerals. Blocks 202F–205F are to calculate the swash plate target position θo through the proportional control, like the blocks 202C–205C in FIG. 13.

According to the modifications shown in FIGS. 20 and 21, the similar advantageous effects to those in the embodiments of FIGS. 12 and 13 can also be obtained in the embodiment of determining the control coefficient Ki from the differential pressure deviation Δ (ΔP). Specifically, with the modification of FIG. 20, it is possible to improve a momentary response in control through the proportional compensation, thereby permitting still stabler control. With the modification of FIG. 21, it is possible to perform speed control of the actuator with a good response for driving the relatively small load.

FIFTH EMBODIMENT

A fifth embodiment of the present invention will be described with reference to FIGS. 22–27. This embodiment employs a flow rate deviation ΔX to determine the control coefficient Ki.

Figure 22:
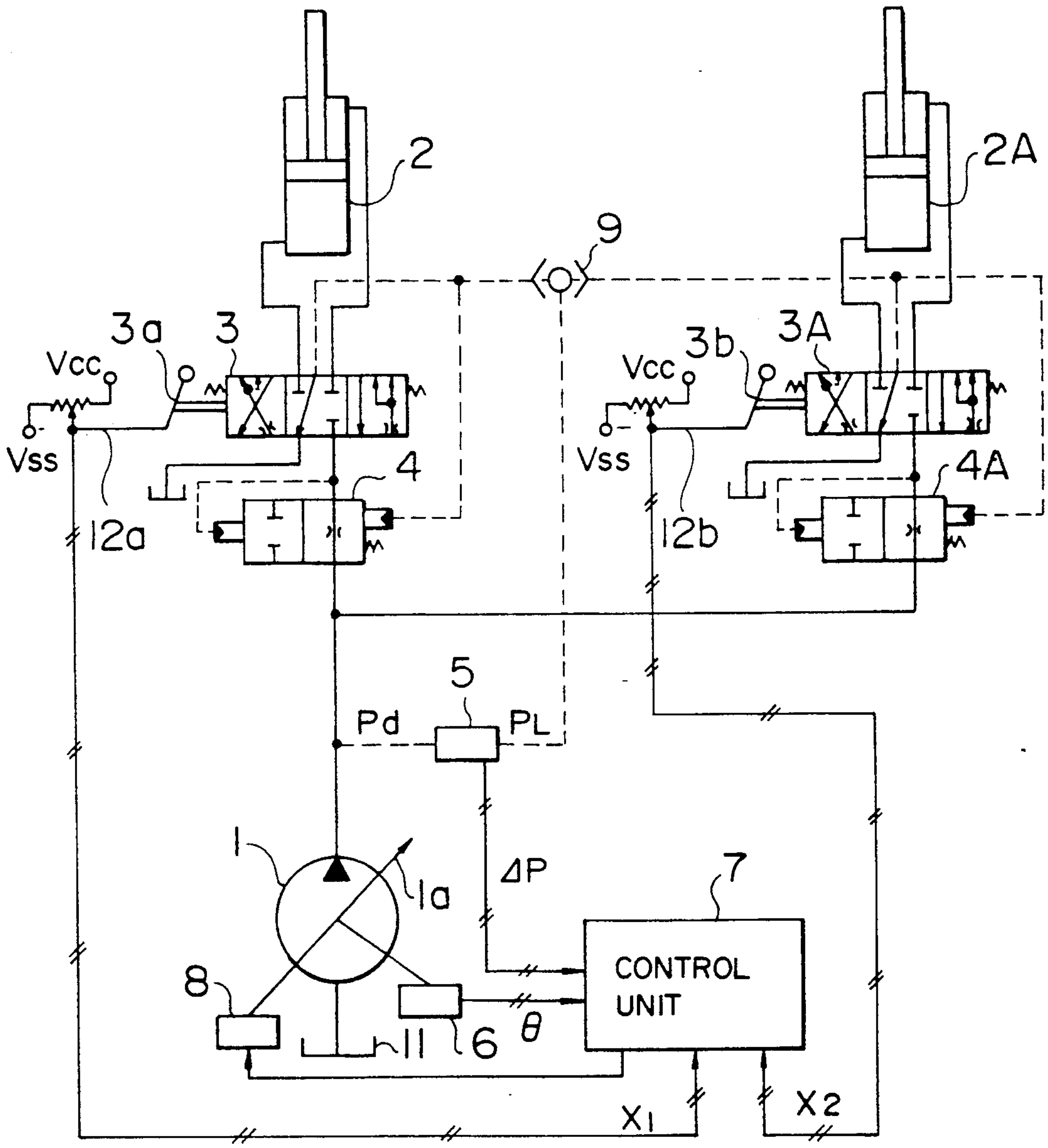
FIG. 22 is a schematic diagram of a hydraulic drive circuit of load sensing control type equipped with a control system for a hydraulic pump according to a fifth embodiment of the present invention.

In FIG. 22, a pump control system of this embodiment includes operation amount sensors 12*a*, 12*b* which are associated with the operating levers 3*a*, 3*b* and detect the operation amounts of the flow control valves 3, 3A, i.e., the demanded flow rates, followed by converting the detected values to electric signals X1, X2 to output them to the control unit 7, respectively. The rest of hardware arrangement of this embodiment is the same as that in the embodiment of FIG. 1, and identical members to those shown in FIG. 1 are denoted by the same reference numerals. Also, the internal arrangement of the control unit 7 is the same as that shown in FIG. 3, and the following explanation will be made by referring to FIG. 3.

Figure 23:
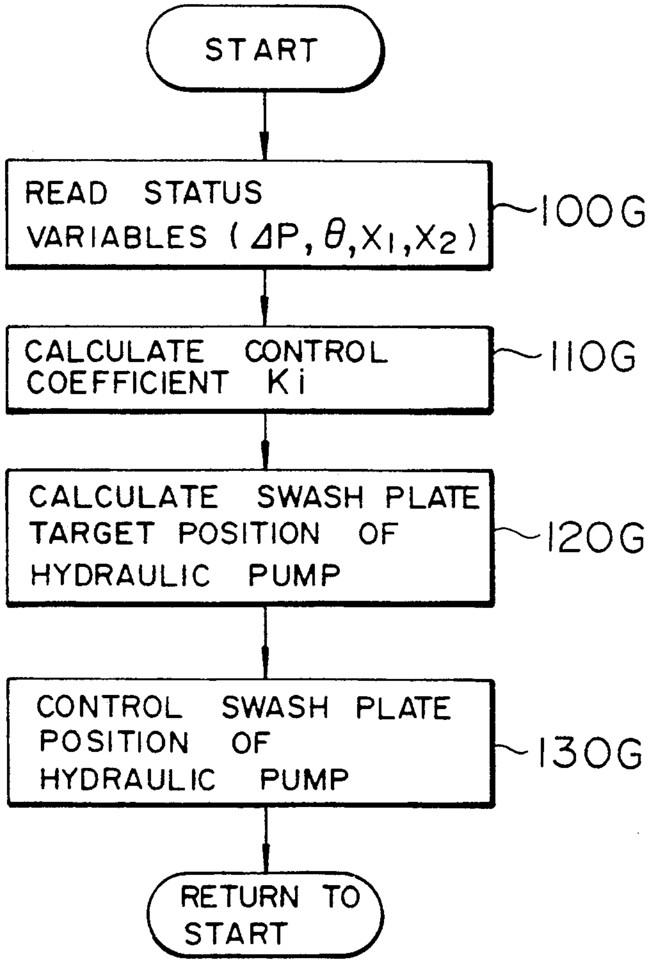
FIG. 23 is a flowchart showing the control sequence in the fifth embodiment.

In this embodiment, the ROM 7*c* of the control unit 7 stores a program represented by a flowchart in FIG. 23, and the delivery rate of the hydraulic pump 1 is controlled in accordance with the program. This control process will be explained below in detail with reference to the flowchart of FIG. 23.

First, in a step 100G, respective outputs of the differential pressure sensor 5, the swash plate position sensor 6 and the operation amount sensors 12*a*, 12*b* are entered to the control unit 7 via the A/D converter 7*a* and stored in the RAM 7*d* as a differential pressure signal ΔP, a swash plate position signal θ and demanded flow rate signals X1, X2.

Figure 24:
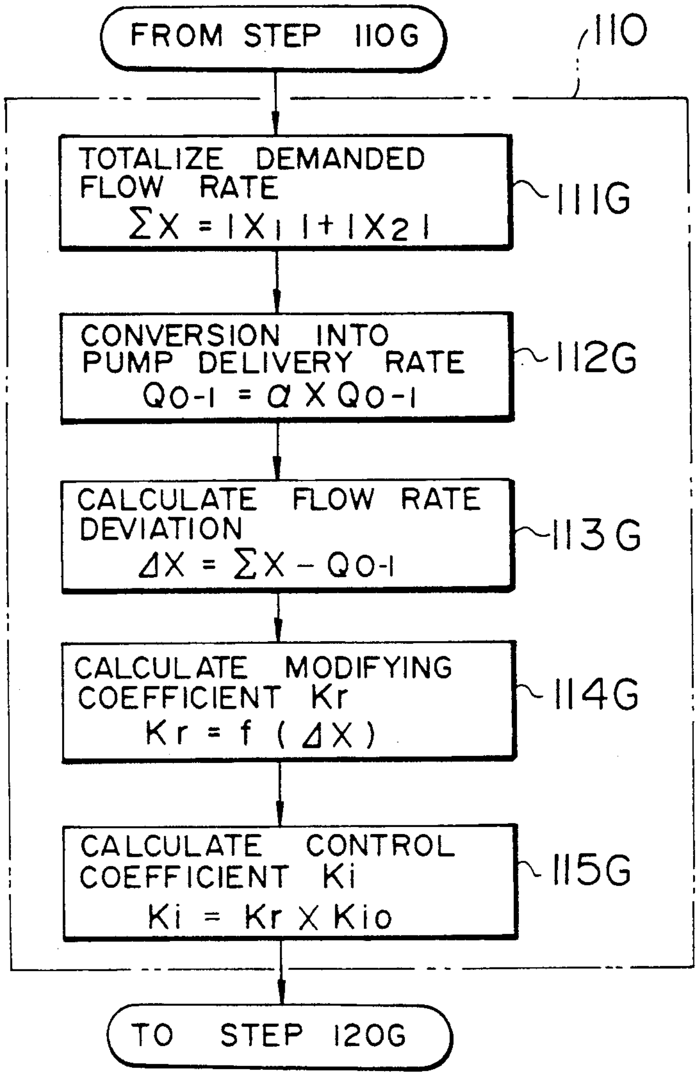
FIG. 24 is a flowchart showing details of a step of calculating a control coefficient Ki in the flowchart shown in FIG. 23.

Then, a control coefficient Ki is calculated in a step 110G. FIG. 24 shows details of the step 110G.

To begin with, in a step 111G of FIG. 24, absolute values of the demanded flow rates X1, X2 are added to each other to calculate a total value ΣX of the flow rates demanded by the flow control valves 3, 3A. Then, in a step 112G, the swash plate target position θo-1 which has been determined in a step 120G described later in the last cycle is converted into a pump delivery rate Q. This conversion is made by multiplying the swash plate target θo-1 by an appropriate proportional constant α. Then, in a step 113G, a flow rate deviation ΔX between the total value ΣX of the demanded flow rates calculated in the step 111G and the pump delivery rate Q calculated in the step 112G is calculated.

Figure 25:
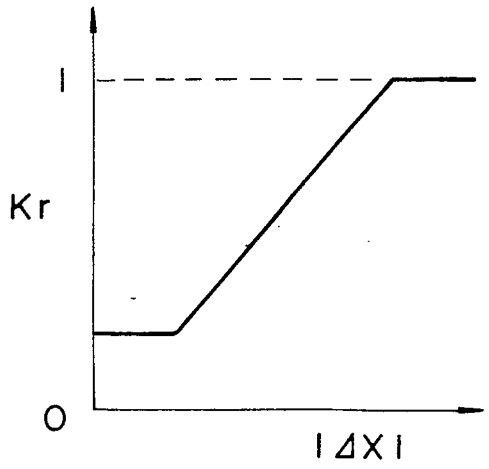
FIG. 25 is a characteristic graph showing the relationship between a flow rate deviation ΔX and a modifying coefficient Kr.

Afterward, the control flow proceeds to a step 114G for calculating a modifying coefficient Kr from the flow rate deviation ΔX. The calculation is made by previously storing table data as shown in FIG. 25 in the ROM 7*c*, and reading the modifying coefficient Kr corresponding to an absolute value of the flow rate deviation ΔX from the table data. Here, the relationship of the absolute value of ΔX versus Kr shown in FIG. 25 is set such that when the swash plate target position is small, the control coefficient Ki determined in a step 115G described later takes a small value which enables to perform stable control without making the delivery pressure of the hydraulic pump 1 so abruptly changed as to cause hunting, and when the swash plate target position is large, it takes a sufficient value to provide a prompt response by avoiding slow change in the delivery pressure. Also, in order to prevent the occurrence of hunting over an entire range of the operation amount of the flow control valve and to permit positive LS control, the modifying coefficient Kr at the small absolute value of the flow rate deviation is set so that the control coefficient Ki takes such a value as not to cause hunting when the opening of the flow control valve is small. In other words, the modifying coefficient Kr at the small absolute value of the flow rate deviation is made coincident with the value in the relationship of $\theta$o-1 versus Kr shown in FIG. 6 for the first embodiment, as given when the swash plate target position $\theta$o-1 is small.

Then, in a step 115G, the modifying coefficient Kr is multiplied by a preset basic value Kio of the control coefficient to obtain the control coefficient Ki. In this case, the basic value Kio of the control coefficient is given by a value which is optimum when the absolute value of the flow rate deviation $\Delta X$ has a maximum value. The modifying coefficient Kr is therefore set such that, as shown in FIG. 25, it becomes 1 when the absolute value of the flow rate deviation $\Delta X$ is at maximum, and it takes a smaller value ($<1$) as the absolute value of the differential pressure deviation $\Delta$ is decreased.

Next, returning to FIG. 23, a step 120G calculates an increment $\Delta\theta_{\Delta P}$ of the swash target position from both the differential pressure deviation $\Delta$ ($\Delta P$) and the control coefficient Ki, and calculates a swash plate target position $\theta$o of the hydraulic pump through integral control. In a step 130G, the swash plate position of the hydraulic pump 1 is controlled so that it coincides with the swash plate target position. Since details of these steps 120G and 130G are the same as those of the steps 120 and 130 shown in FIGS. 7 and 8 for the first embodiment, their explanation is omitted here. Note that, letting the cycle time be tc, the target tilting speed of the swash plate is expressed by $\Delta\theta_{\Delta P}$/tc.

Figure 26:
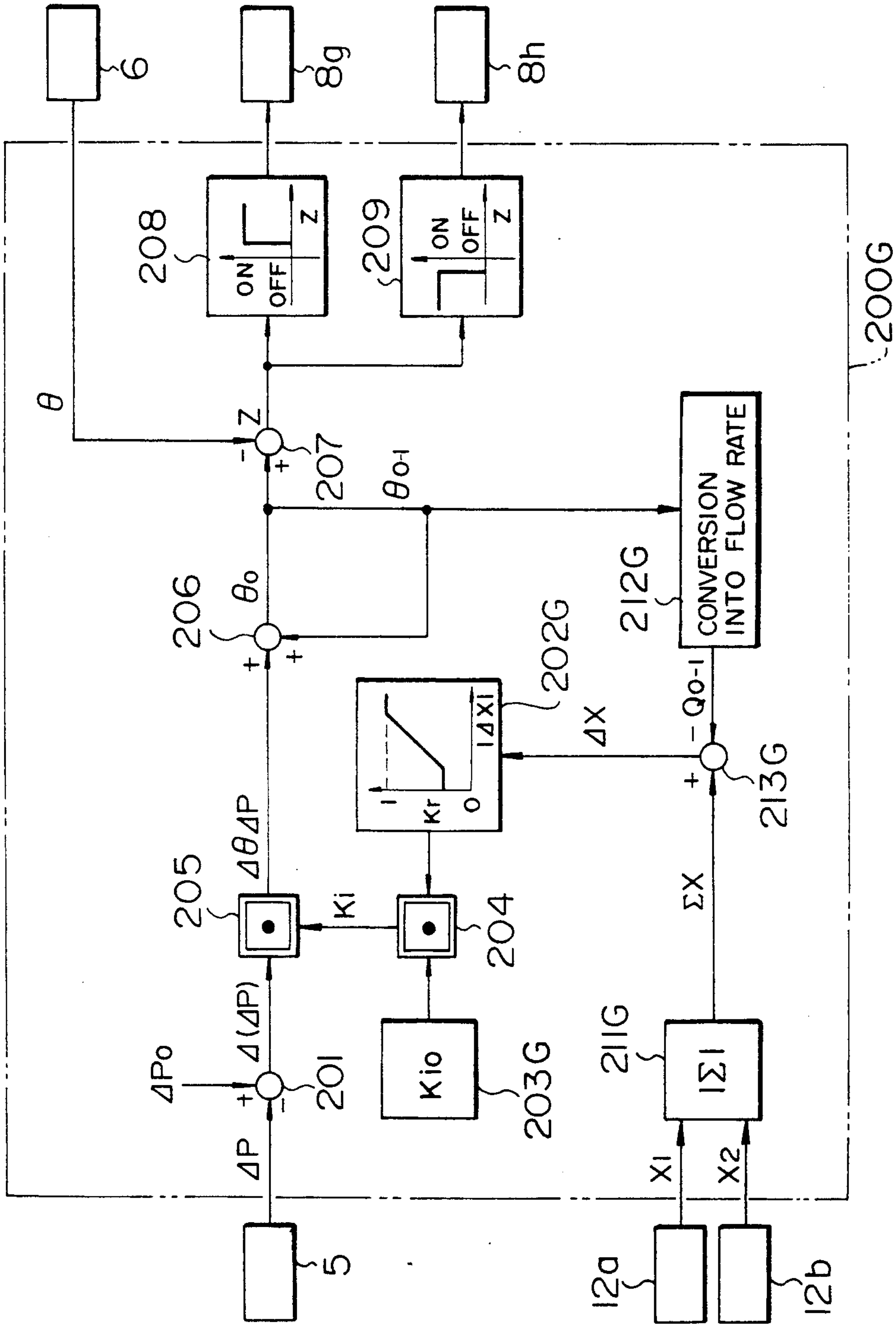
FIG. 26 is a block diagram showing control steps of the fifth embodiment together in the form of blocks.

The above-explained control steps are shown together in FIG. 26 at 200G in the form of blocks. In FIG. 26, blocks 202G, 203G, 204 and 211G–213G correspond to the step 110G, blocks 201, 205, 206 correspond to the step 120G, and blocks 207–209 correspond to the step 130G.

In this embodiment thus arranged, when the operating lever 3*a* of the actuator 2, for example, is operated to open the flow control valve 3 to an arbitrary degree of opening, the swash plate target position $\theta$o is determined from both the differential pressure deviation $\Delta$ ($\Delta P$) and the control coefficient Ki for reducing the differential pressure deviation, and the delivery rate of the hydraulic pump 1 is controlled so that the LS differential pressure $\Delta P$ is held at the target value $\Delta$Po. In this point, this embodiment operates like the first embodiment.

Moreover, in this embodiment, when the operation speed of the operating lever 3*a* is low, the deviation $\Delta X$ between the total value of the demanded flow rates X1, X2 and the pump delivery rate Q is small. The modifying coefficient Kr calculated in the block 202G of FIG. 26 also takes a small value ($<1$), and so does the control coefficient Ki obtained by multiplying the modifying coefficient Kr by the basic value Kio. Therefore, the swash plate target tilting speed $\Delta\theta_{\Delta P}$ is calculated as a small value, and the swash plate 1*a* is driven at the resultant small tilting speed. Consequently, even under a condition that the operating lever is operated in a small stroke and the opening of the flow control valve 3 is small in this case, stable control can be performed without making the delivery pressure so abruptly changed as to cause hunting.

Further, when the operating lever 3*a* is operated at large speeds to quickly increase the opening of the flow control valve 3, the demanded flow rate X1 of the flow control valve 3 is increased and the flow rate deviation $\Delta X$ is also increased. Therefore, the modifying coefficient Kr also takes a large value ($\approx 1$), and so does the control coefficient Ki. Consequently, the swash plate target tilting speed $\Delta\theta_{\Delta P}$ is calculated as a large value, and the tilting amount of the swash plate 1*a* is increased at the resultant large tilting speed.

Figure 27:
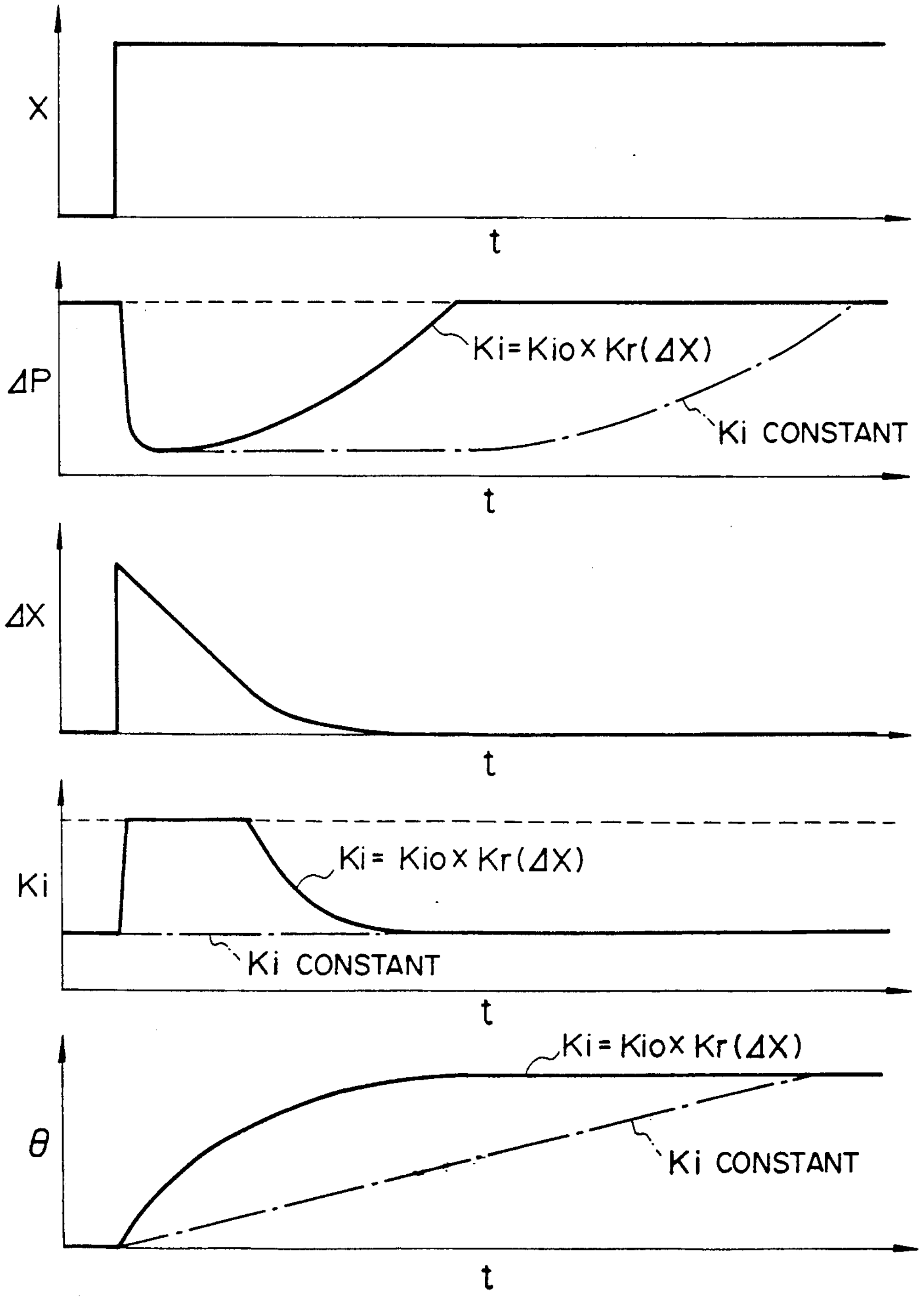
FIG. 27 is a chart showing change in the opening of a flow control valve, the LS differential pressure, the control coefficient and the swash plate position over time, for explaining operation of the fifth embodiment.

FIG. 27 shows details of change in the operation amount (opening) X of the flow control valve 3, the LS differential pressure $\Delta P$, the control coefficient Ki and the tilting amount $\theta$ of the swash plate 1*a* over time in this case. As with the plots in FIG. 10, one-dot chain lines in FIG. 27 represent change in the LS differential pressure $\Delta P$, the control coefficient Ki and the tilting amount $\theta$ of the swash plate over time, as found when the control coefficient Ki is set at a small constant value to perform stable control in a region where the opening X of the flow control valve is small. In this conventional case, as explained above, when the opening X of the flow control valve is quickly increased in an attempt of operating the boom fast, for example, the control coefficient Ki remains at a small constant value and hence the tilting speed of the swash plate is so small that the differential pressure $\Delta P$ takes a long time to return to the target value $\Delta$Po. As a result, the operator is forced to feel that the excavator (or the bootm) is too slow in action.

On the contrary, in this embodiment, when the opening X of the flow control valve 3 is quickly increased, the pump delivery rate cannot follow the demanded flow rate X1 of the flow control valve 3, and the flow rate deviation $\Delta X$ is increased, as shown in solid lines in FIG. 27. Therefore, the control coefficient Ki takes a large value, and the tilting amount of the swash plate 1*a* is increased at the large tilting speed. As the pump delivery rate approaches the demanded flow rate X1 of the flow control valve 3, the flow rate deviation $\Delta X$ is gradually reduced. Accordingly, the control coefficient Ki is also gradually reduced and, at the time the flow rate deviation $\Delta X$ reaches about zero (0), the control coefficient Ki is decreased down to a small value so that the differential pressure $\Delta P$ may be converged to the target value $\Delta$Po in a stable manner. As a result, a period of time required to reach the demanded flow rate X1 is shortened in comparison with the conventional case of setting the control coefficient Ki constant, and prompt and stable control can be performed without impeding the operator from feeling a positive acceleration of the actuator 2 (boom).

With this embodiment, too, therefore, when the operation speed of the flow control valve is small and its opening is small, it is possible to perform stable control without making the delivery pressure so abruptly changed as to cause hunting. When the operating lever is operated at large speeds to quickly increase the opening of the flow control valve, it is possible to provide a prompt response by avoiding slow change in the delivery pressure of the hydraulic pump 1.

Furthermore, this embodiment employs the flow rate deviation $\Delta X$, instead of the swash plate position, for determining the control coefficient corresponding to an operated state of the flow control valve 3. As will be seen from the comparison between FIG. 27 and FIG.

19, the change in the flow rate deviation $\Delta X$ has a tendency analogous to that of the differential pressure deviation $\Delta$ ($\Delta P$) in the fourth embodiment. In other words, the flow rate deviation $\Delta X$ is increased at a large change rate immediately following the operation of the flow control valve, and is decreased gradually as the pump delivery rate increases. Therefore, the control coefficient Ki is also increased immediately upon the operation of the flow control valve. Consequently, as with the fourth embodiment, this embodiment can improve a response in a rising period just after the operation of the flow control valve.

MODIFICATIONS OF FIFTH EMBODIMENT

Figure 28:
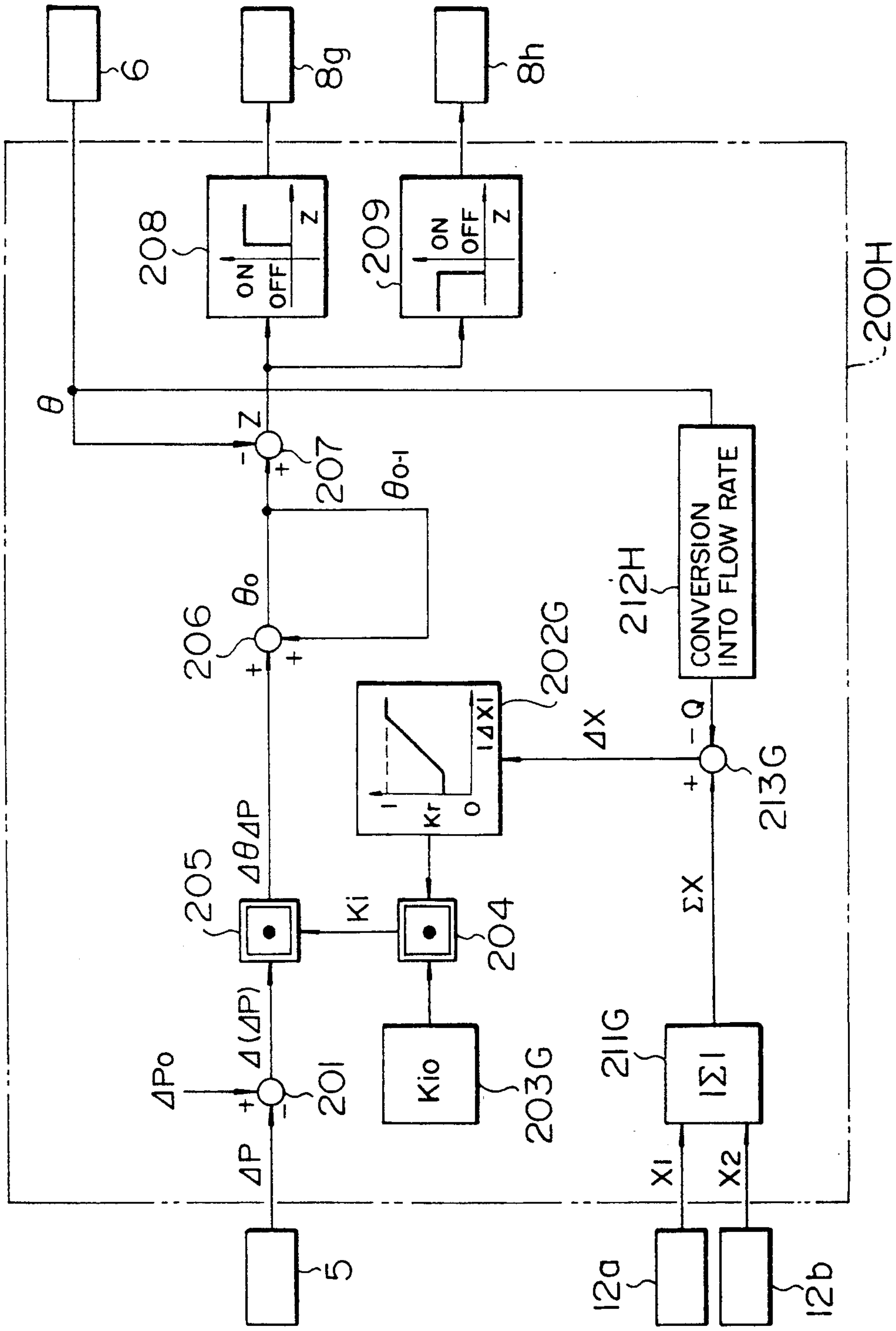
FIGS. 28-30 are block diagrams similar to FIG. 26, each showing a modification of the fifth embodiment.

While the delivery rate Q of the hydraulic pump 1 is determined from the swash plate target position $\theta$o-1 in the above fifth embodiment, the delivery rate Q may be calculated using the actual tilting amount of the swash plate 1*a*, i.e., the detected valve $\theta$ of the swash plate position sensor 6, because the tilting amount of the swash plate 1*a* is so controlled as to coincide with the target position $\theta$o. FIG. 28 shows a modification to implement this case. In the drawing, an entire control block is denoted by 200H in which those blocks having the same functions as those in FIG. 9 are denoted by the same reference numerals. Further, 212H is a block for determining the delivery rate Q from the actual swash plate position $\theta$ detected by the swash plate position sensor 6. This modification can also provide a similar advantageous effect to that in the foregoing embodiment.

Moreover, while the swash plate target position $\theta$o is determined from the differential pressure deviation $\Delta$ ($\Delta P$) using the integral control technique in the fifth embodiment, the combined technique of integral control calculation and proportional compensation or the proportional control technique may instead by used like the second and third embodiments shown in FIGS. 12 and 13. Corresponding modifications of the fifth embodiment are shown in FIGS. 29 and 30.

Figure 29:
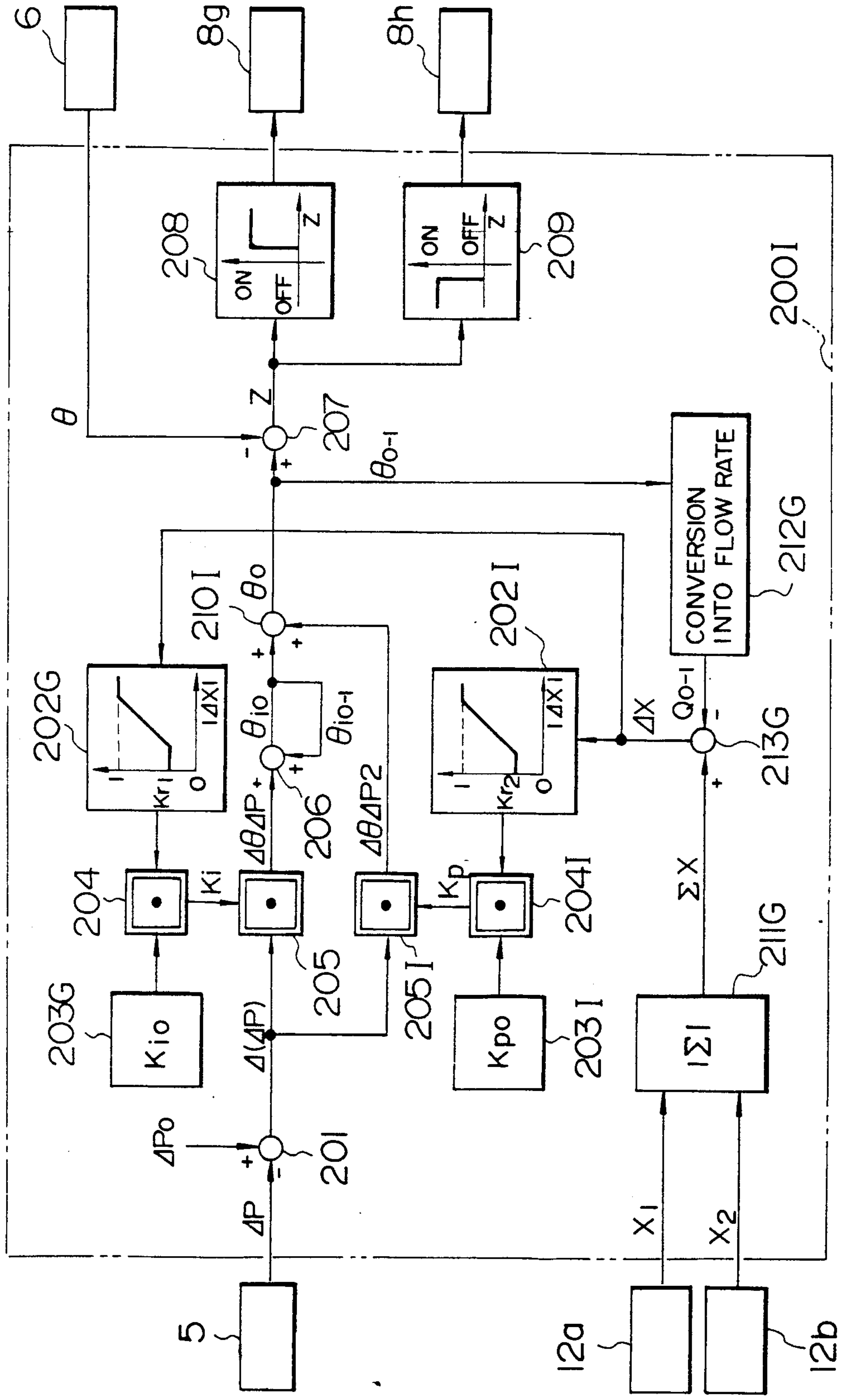

In FIG. 29, an entire control block is denoted by 200I in which those blocks having the same functions as those in FIG. 26 are denoted by the same reference numerals. Blocks 202I–205I and 210I are to add the modification value $\Delta\theta_{\Delta P2}$ for the proportional compensation to the swash plate target position $\theta$o, like the blocks 202B–205B and 210B in FIG. 12.

Figure 30:
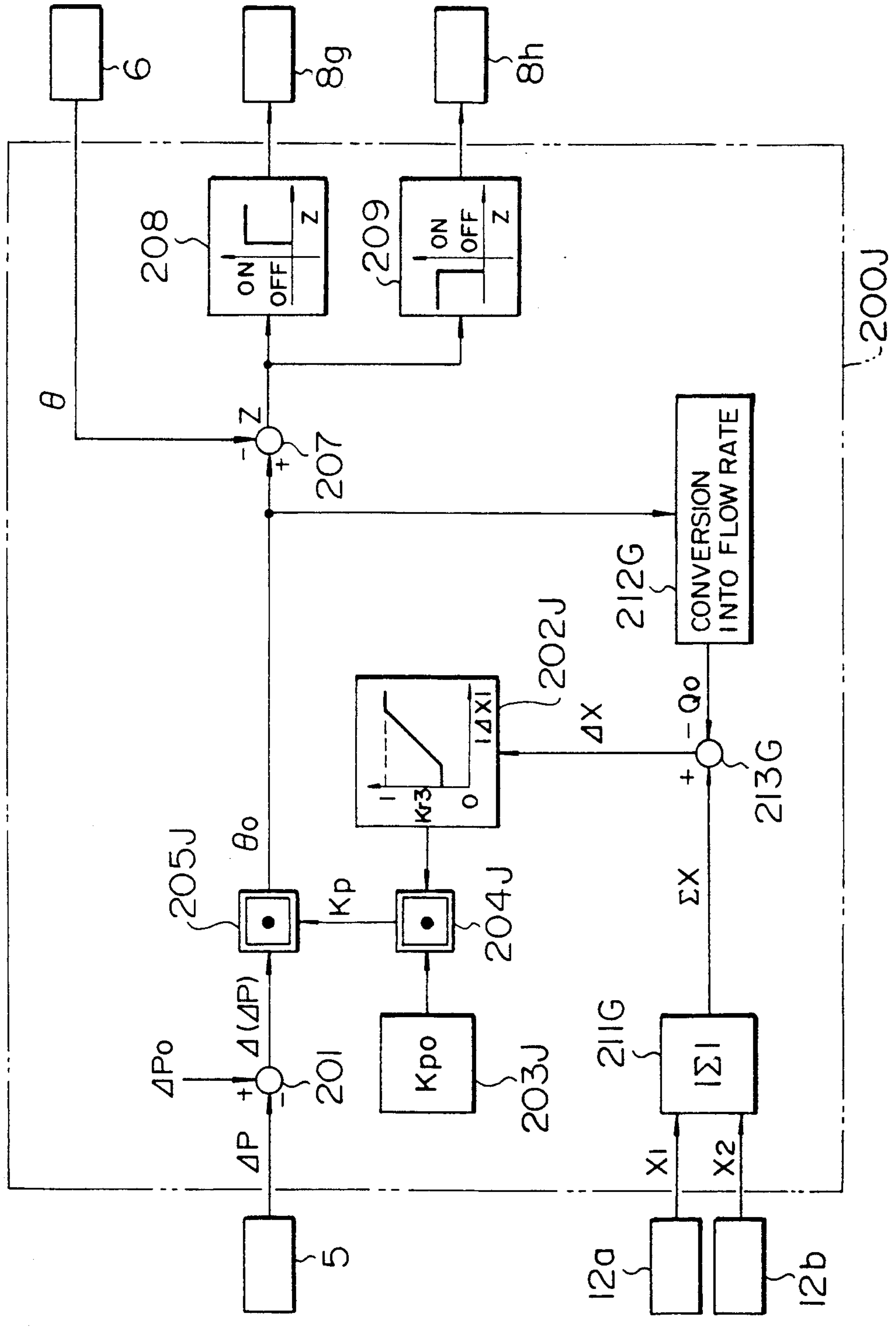

In FIG. 30, an entire control block is denoted by 200J in which those blocks having the same functions as those in FIG. 26 are denoted by the same reference numberals. Blocks 202J–205J are to calculate the swash plate target position $\theta$o through the proportional control, like the blocks 202C–205C in FIG. 13.

According to the modifications shown in FIGS. 29 and 30, the similar advantageous effects to those in the embodiments of FIGS. 12 and 13 can also be obtained in the embodiment of determining the control coefficient Ki from the flow rate deviation $\Delta X$.

SIXTH EMBODIMENT

A sixth embodiment of the present invention will be described with reference to FIGS. 31–37. This embodiment is to vary the control coefficient Ki dependent on a revolution speed Np of the hydraulic pump.

Figure 31:
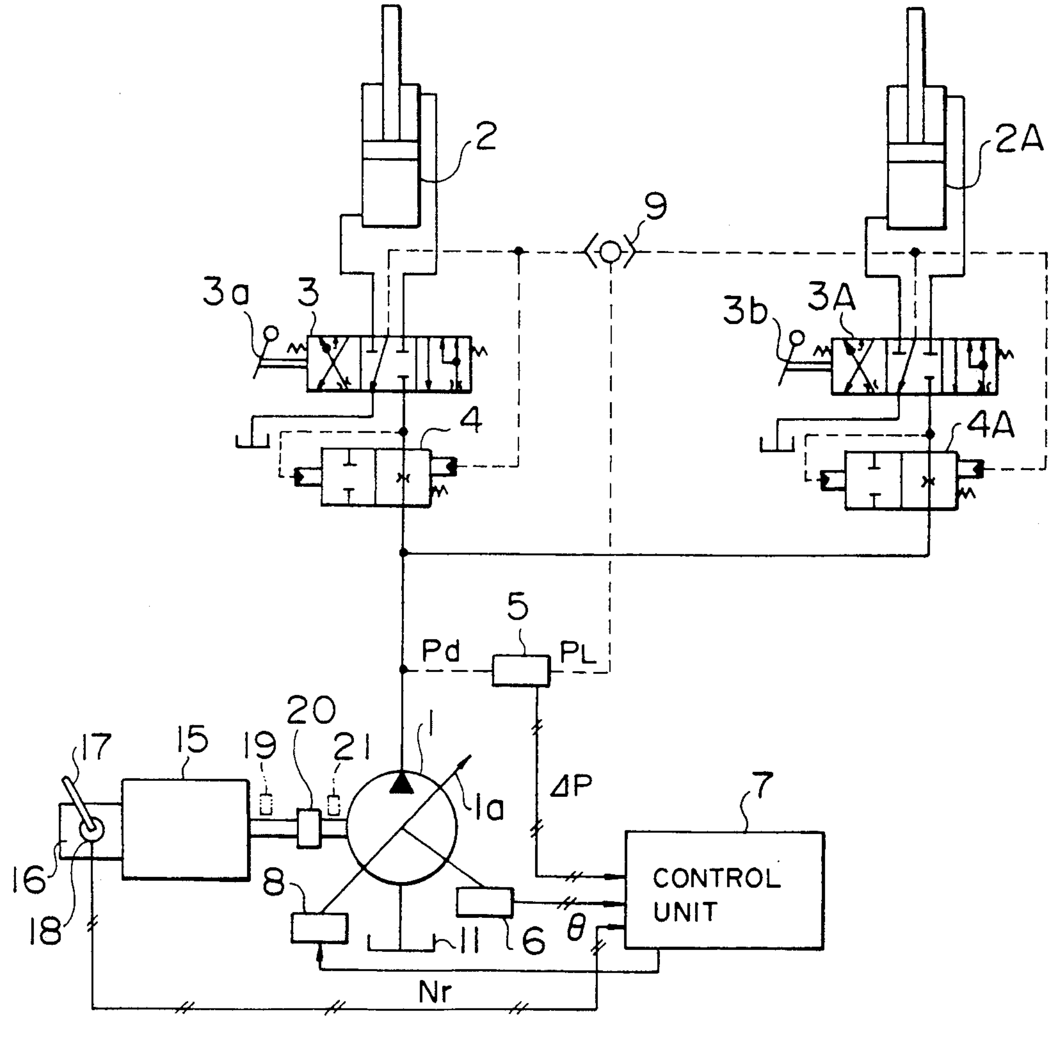
FIG. 31 is a schematic diagram of a hydraulic drive circuit of load sensing control type equipped with a control system for a hydraulic pump according to a sixth embodiment of the present invention.

In FIG. 31, the hydraulic pump 1 driven by a prime mover 15. The prime mover 15 is usually a diesel engine of which revolution speed is controlled by a fuel injection device 16. The fuel injection device 16 comprises an all-speed governer having a manually-operated governer lever 17. By operating the governer lever 17, a target revolution speed is set dependent on an operation amount of the governer lever 17 and used to control fuel injection. The governer lever 17 is provided with a governer angle sensor 18 for detecting the operation amount. The governer angle sensor 18 converts the detected operation amount to an electric signal Nr and outputs it to the control unit 7.

The rest of hardware arrangement of this embodiment is the same as that in the embodiment of FIG. 1, and identical members to those shown in FIG. 1 are denoted by the same reference numerals. Also, the internal arrangement of the control unit 7 is the same as that shown in FIG. 3, and the following explanation will be made by referring to FIG. 3.

Figure 32:
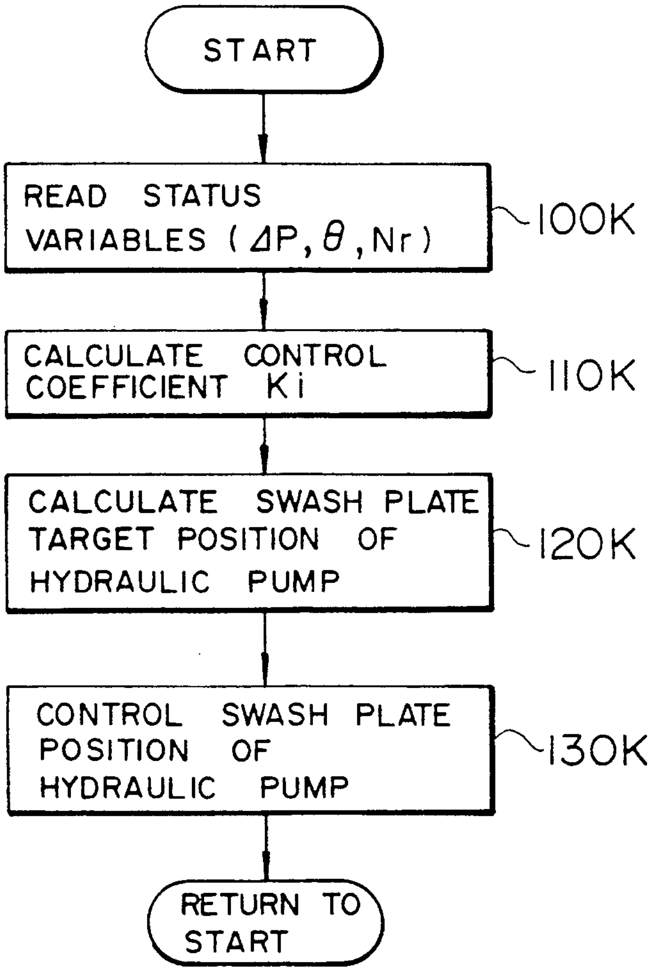
FIG. 32 is a flowchart showing the control sequence in the sixth embodiment.

In this embodiment, the ROM 7*c* of the control unit 7 stores a program represented by a flowchart in FIG. 32, and the delivery rate of the hydraulic pump 1 is controlled in accordance with the program. This control process will be explained below in detail with reference to the flowchart of FIG. 32.

First, in a step 100K, respective outputs of the differential pressure sensor 5, the swash plate position sensor 6 and the governer angle sensor 18 are entered to the control unit 7 via the A/D converter 7*a* and stored in the RAM 7*d* as a differential pressure signal $\Delta P$, a swash plate position signal $\theta$ and a target revolution speed signal Nr. The target revolution speed Nr is used instead of a revolution speed Np of the hydraulic pump 1.

Figure 33:
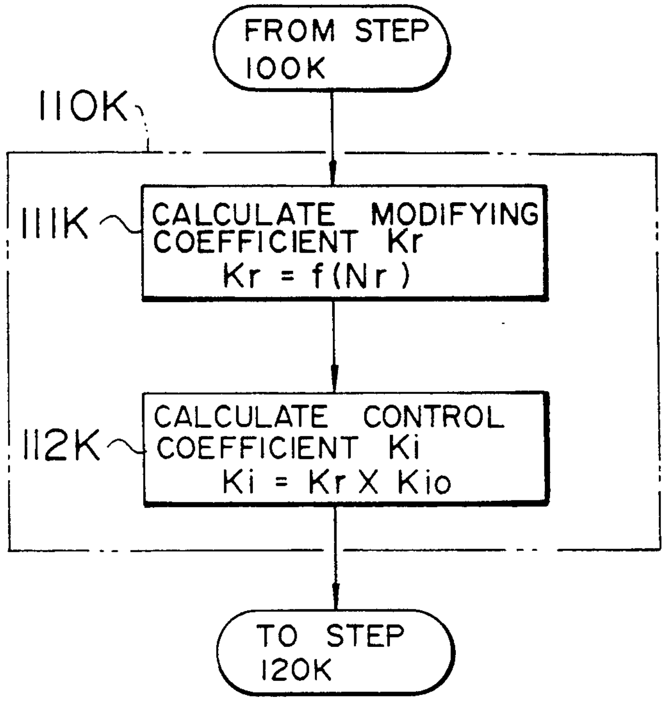
FIG. 33 is a flowchart showing details of a step of calculating a control coefficient Ki in the flowchart shown in FIG. 32.

Then, a control coefficient Ki is calculated in a step 110K. FIG. 33 shows details of the step 110K.

To begin with, in a step 111K of FIG. 33, a modifying coefficient Kr is calculated from the target revolution speed Nr. The calculation is made by previously storing table data as shown in FIG. 33 in the ROM 7*c*, and reading the modifying coefficient Kr corresponding to the target revolution speed signal Nr from the table data. Here, the relationship of Nr versus Kr shown in FIG. 33 is set such that when the target revolution speed Nr is large, the control coefficient Ki determined in a step 112K described later takes a small value which enables to perform stable control without making the delivery pressure of the hydraulic pump 1 so abruptly changed as to cause hunting, and when the target revolution speed Nr is small, it takes a sufficient value to provide a prompt response by avoiding slow change in the delivery pressure. Also, in order to prevent the occurrence of hunting over an entire range of the operation amount of the flow control valve and to permit positive LS control, the modifying coefficient Kr at the large value of the target revolution speed Nr is set so that the control coefficient Ki takes such a value as not to cause hunting when the opening of the flow control valve is small. In other words, the modifying coefficient Kr at the large value of the target revolution speed Nr is made coincident with the value in the relationship of $\theta$o-1 versus Kr shown in FIG. 6 for the first embodiment, as given when the swash plate target position $\theta$o-1 is small.

Figure 34:
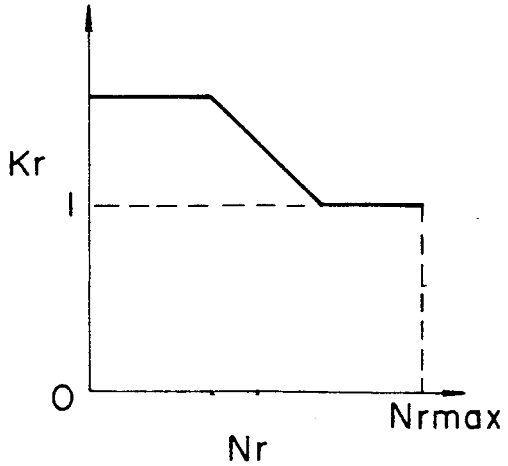
FIG. 34 is a characteristic graph showing the relationship between a target revolution speed Nr and a modifying coefficient Kr.

Then, in a step 112K, the modifying coefficient Kr is multiplied by a preset basic value Kio of the control coefficient to obtain the control coefficient Ki. In this case, the basic value Kio of the control coefficient is given by a value which is optimum when the target revolution speed Nr has a maximum value Nrmax. The modifying coefficient Kr is therefore set such that, as shown in FIG. 34, it becomes 1 when the target revolution speed Nr is at the maximum value Nrmax, and it takes a larger value (>1) as the target revolution speed is decreased.

Next, returning to FIG. 32, a step 120K calculates an increment $\Delta\theta_{\Delta P}$ of the swash plate target position from both the differential pressure deviation Δ (ΔP) and the control coefficient Ki, and calculates a swash plate target position θo of the hydraulic pump through integral control. In a step 130K, the swash plate position of the hydraulic pump 1 is controlled so that it coincides with the swash plate target position. Since details of these steps 120K and 130K are the same as those of the steps 120 and 130 shown in FIGS. 7 and 8 relating to the first embodiment, their explanation is omitted here. Note that, letting the cycle time be tc, the target tilting speed of the swash plate is expressed by $\Delta\theta_{\Delta P}/tc$.

Figure 35:
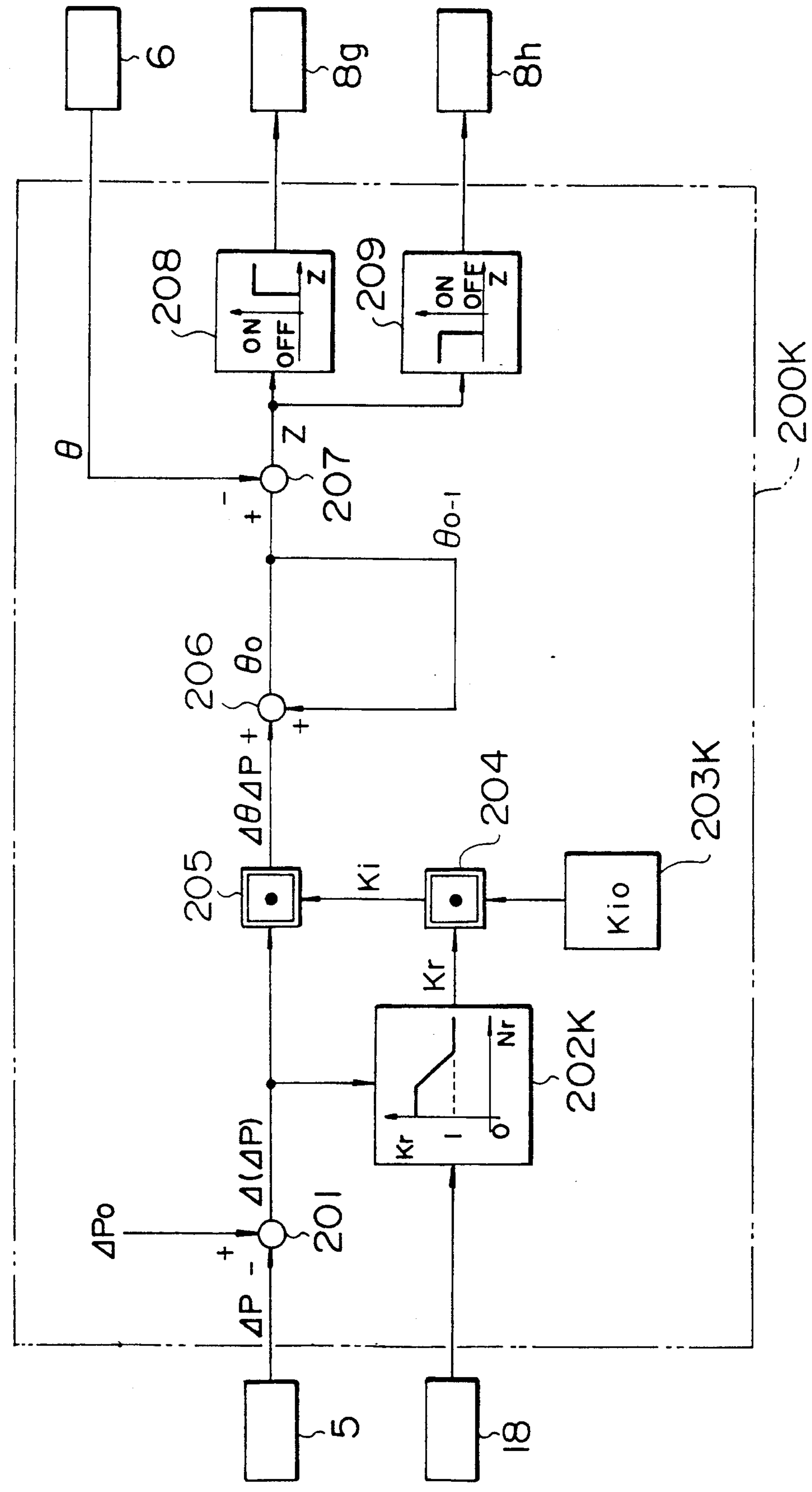
FIG. 35 is a block diagram showing control steps of the sixth embodiment together in the form of blocks.

The above-explained control steps are shown together in FIG. 35 at 200K in the form of blocks. In FIG. 35, blocks 202K, 203K, 204 correspond to the step 110K, blocks 201, 205, 206 correspond to the step 120K, and blocks 207-209 correspond to the step 130K.

In this embodiment thus arranged, when the operating lever 3a of the actuator 2, for example, is operated to open the flow control valve 3 to an arbitrary degree of opening, the swash plate target position θo is determined from both the differential pressure deviation Δ (ΔP) and the control coefficient Ki for reducing the differential pressure deviation, and the delivery rate of the hydraulic pump 1 is controlled so that the LS differential pressure ΔP is held at the target value ΔPo. In this point, this embodiment operates like the first embodiment.

Meanwhile, the delivery rate of the hydraulic pump 1 is also influenced by the pump revolution speed such that when the pump revolution speed is high, even slight change in the swash plate position produces large flow rate change and hence large pressure change. The hydraulic pump is driven by an engine 15 via a speed reducer 20, and the pump revolution speed is varied upon change in the revolution speed of the engine 15. For this reason, in order to prevent the occurrence of hunting over an entire range of the pump revolution speed, i.e., the engine revolution speed, and to permit positive LS control, it is required to make setting such that change in the flow rate upon change in the swash plate position be within a proper range when the revolution speed is at maximum.

Taking into account the above, in this embodiment, when the operation amount of the governer lever 17 is maximized, for example, to set the target revolution speed Nr of the engine 15 to the maximum value Nrmax, i.e., when the revolution speed of the hydraulic pump 1 is at maximum, the modifying coefficient Kr calculated in the block 202K of FIG. 35 takes a small value (=1), and so does the control coefficient Ki obtained by multiplying the modifying coefficient Kr by the basic value Kio. Therefore, the swash plate target tilting speed $\Delta\theta_{\Delta P}$ is calculated as a small value, and the swash plate 1a is driven at the resultant small tilting speed.

Further, when the operation amount of the governer lever 17 is decreased to reduce the target revolution speed Nr of the engine 15, i.e., the revolution speed of the hydraulic pump 1, the modifying coefficient Kr takes a large value (>1), and so does the control coefficient Ki. Consequently, the swash plate target tilting speed $\Delta\theta_{\Delta P}$ is calculated as a large value, and the tilting amount of the swash plate 1a is increased at the resultant large tilting speed.

Figure 36:
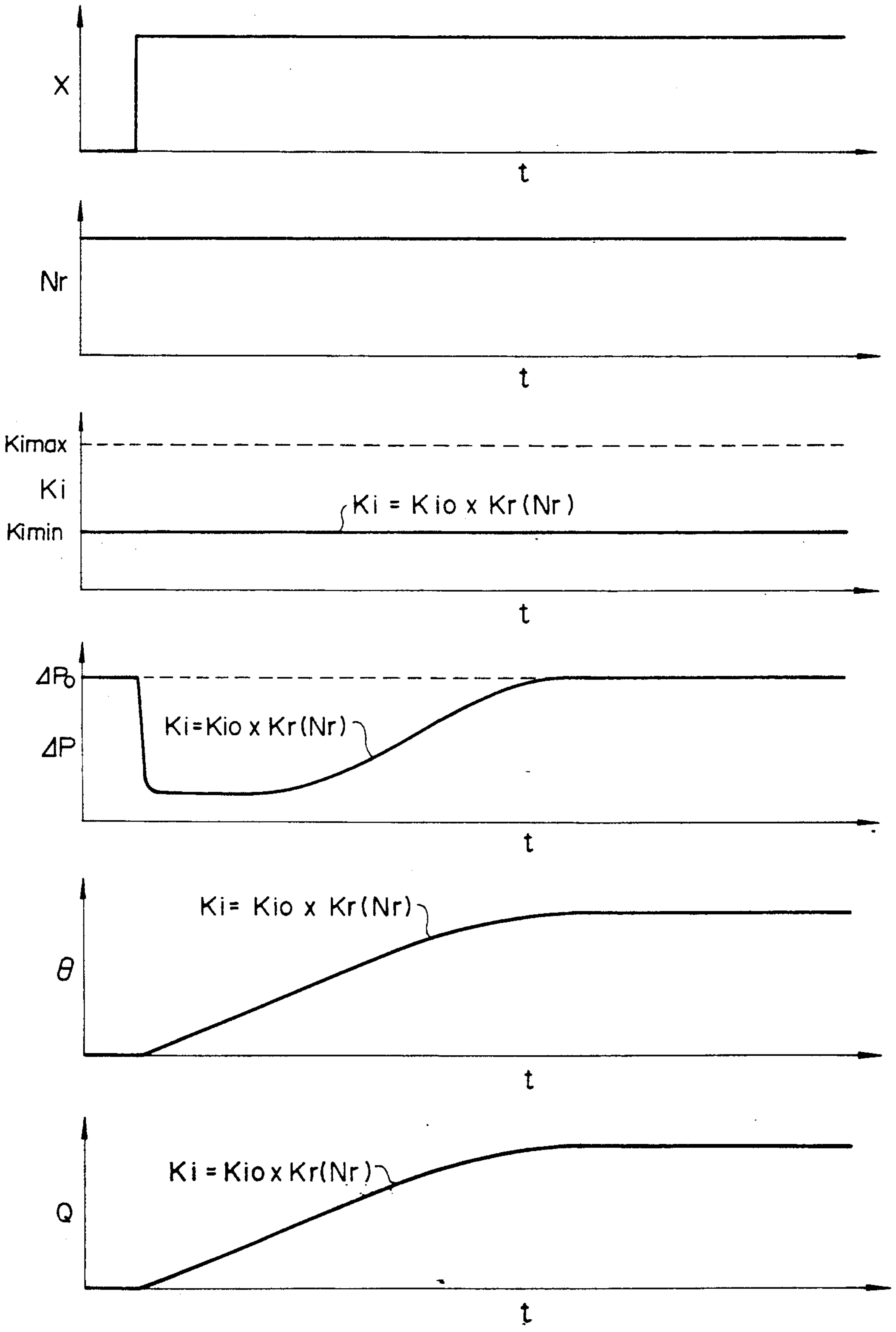
FIGS. 36 and 37 are each a chart showing change in the opening of a flow control valve, the target revolution speed, the control coefficient, the LS differential pressure, the swash plate position and the pump delivery rate over time, for explaining operation of the sixth embodiment.
Figure 37:
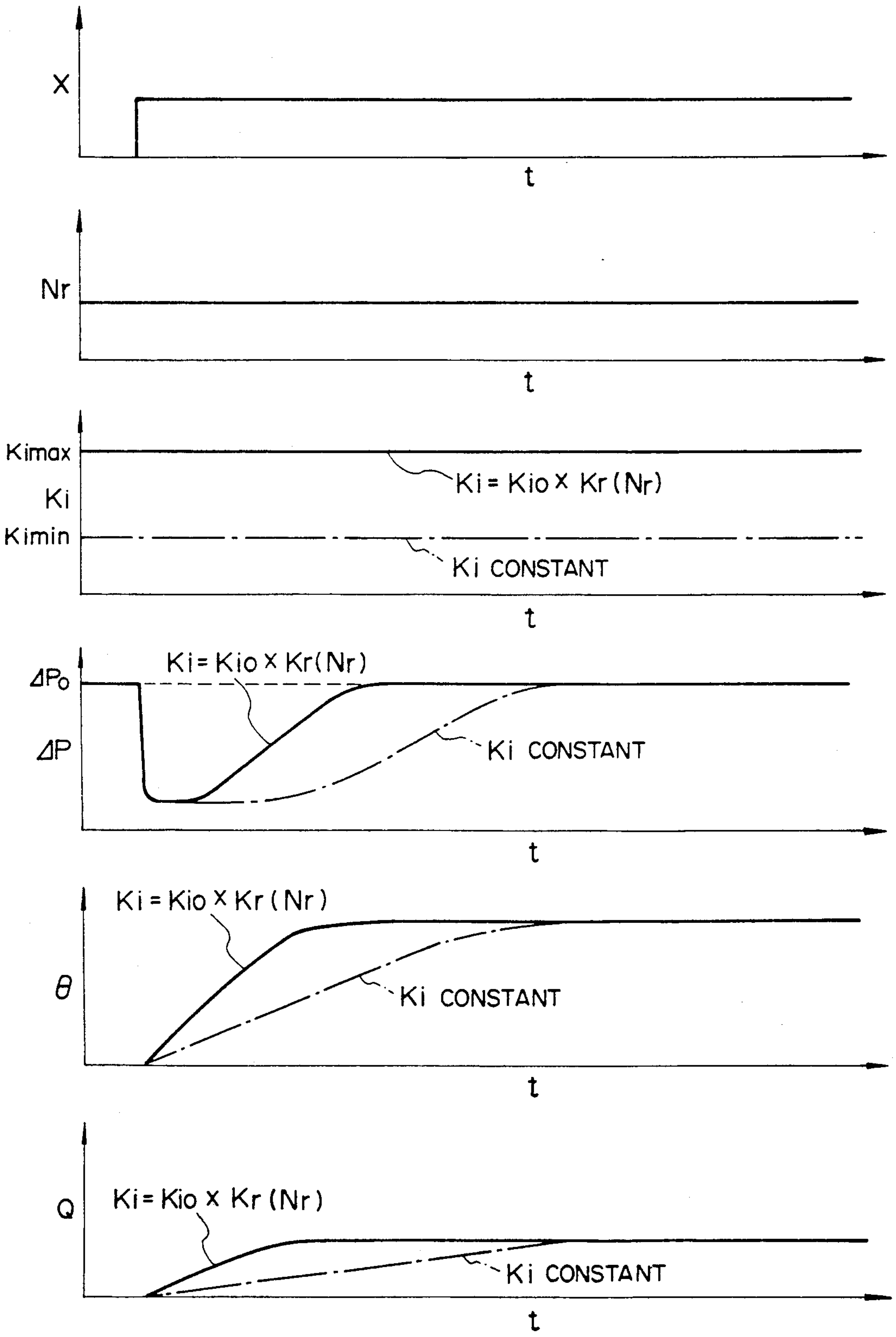

FIGS. 36 and 37 show details of change in the operation amount (opening) X of the flow control valve 3, the target revolution speed Nr of the engine 15, the control coefficient Ki, the LS differential pressure ΔP, the tilting amount θ of the swash plate 1a and the delivery rate Q of the hydraulic pump 1 over time. FIG. 36 represents the case where the target revolution speed Nr is at maximum, and the control coefficient Ki has a value Kimin at which the pump delivery rate Q takes an optimum increase rate under this condition. FIG. 37 represents the case where the target revolution speed Nr is low. One-dot chain lines in FIG. 37 represent changes in the control coefficient Ki, the LS differential pressure ΔP, the tilting amount θ of the swash plate and the pump delivery rate over time, as found when the control coefficient Ki is set at a small constant value to perform stable control when the target revolution speed Nr is at maximum. In this conventional case, although the swash plate tilting speed is increased similarly to the case of FIG. 36, an increase rate of the pump delivery rate is reduced. Therefore, the LS differential pressure ΔP takes a long time to converge to the target value ΔPo. As a result, the operator is forced to feel that the actuator is too slow in action. Here, the reason why the operation amount X of the flow control valve is smaller in FIG. 37 than in FIG. 36 is that since the maximum delivery rate of the hydraulic pump is reduced at a small value of Nr, the operation amount X, i.e., the demanded flow rate of the flow control valve, is set correspondingly in FIG. 37.

On the contrary, in this embodiment, when Nr is small, the control coefficient Ki takes the maximum value Kimax and the tilting speed of the swash plate 1a is increased, as shown in solid lines in FIG. 37. As a result, the pump delivery Q is increased at the same rate as that in the case of FIG. 36, allowing the operator to feel that the actuator is not slow in action.

With this embodiment, therefore, when the revolution speed of the hydraulic speed is high, the control coefficient Ki takes a small value so that stable control can be performed without making the delivery pressure so abruptly changed as to cause hunting. When the revolution speed of the hydraulic pump is lowered, the control coefficient Ki takes a large value so that a prompt response can be provided by avoiding slow change in the delivery pressure of the hydraulic pump 1. It is hence possible to realize the stable control free from hunting and the prompt control with a good response over an entire range of the pump revolution speed.

MODIFICATION OF SIXTH EMBODIMENT

In the sixth embodiment, the target revolution speed Nr of the engine 15 is used for modifying the control coefficient Ki dependent on the revolution speed of the hydraulic pump. Alternatively, as shown by imaginary lines in FIG. 31, a revolution speed sensor 19 for detecting a revolution speed Ne of an output shaft of the engine 15 may be installed to determine the modifying coefficient Kr using the actual revolution speed of the engine 15 detected by the sensor 19, for modifying the control coefficient Ki. In this case, the similar control can also be performed. Here, the revolution of the engine 15 is transmitted to the hydraulic pump 1 after being reduced in its speed by the speed reducer 20. In view of this, a revolution speed sensor 21 for directly detecting the revolution speed Np of the hydraulic pump 1 after the speed reduction may instead be installed to determine the modifying coefficient Kr using the detected revolution speed of the sensor 21.

SEVENTH EMBODIMENT

Figure 38:
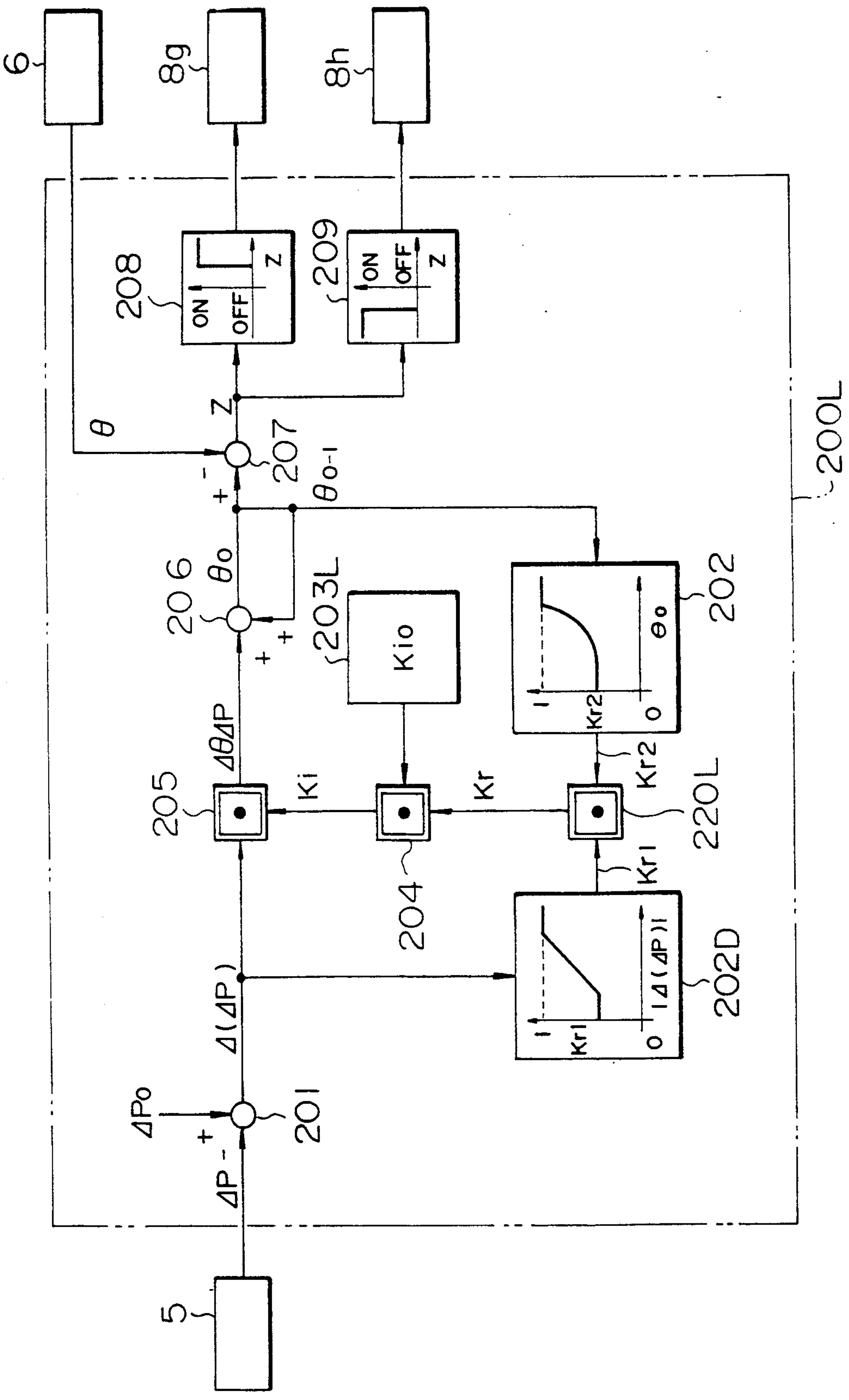
FIG. 38 is a block diagram of a control system for a hydraulic pump according to a seventh embodiment of the present invention.

A seventh embodiment of the present invention will be described with reference to FIG. 38. This embodiment combines the first embodiment with the fourth embodiment to determine the control coefficient Ki from both the swash plate position and the differential pressure deviation. In FIG. 38, those blocks having the same functions as those in FIG. 9 relating to the first embodiment and FIG. 18 relating to the fourth embodiment are denoted by the same reference numerals. Also, since hardware arrangement is the same as that of the first or fourth embodiment, FIG. 1 is incorporated here for reference.

In FIG. 38, an entire control block is denoted by 200L in which a block 202D determines a first modifying coefficient Kr1 from the absolute value of the differential pressure deviation Δ (ΔP), and a block 202 determines a second modifying coefficient Kr2 from the swash plate target position θo-1. These two modifying coefficients Kr1, Kr2 are multiplied by each other in block 220L to determine a third modifying coefficient Kr. The third modifying coefficient Kr is multiplied in a block 204 by a basic value Kio of the control coefficient preset in a block 203L, for determining the control coefficient Ki. Data tables for the modifying coefficients Kr1, Kr2 are set to provide the modifying coefficient Kr which, in turn, gives the control coefficient Ki for enabling stable control when the swash plate position θo is small and the absolute value of the differential pressure deviation Δ (ΔP) is small. The basic value Kio is set to a value which is optimum when the swash plate position θo is large and the absolute value of the differential pressure deviation Δ (ΔP) is large. The remaining arrangement is the same as that of the first or fourth embodiment.

With this embodiment, since the control coefficient Ki is determined using the modifying coefficient Kr resulted by multiplying the first modifying coefficient Kr1 determined from the differential pressure deviation and the second modifying coefficient Kr2 determined from the swash plate position, there can be obtained both the advantageous effect of the fourth embodiment of determining the control coefficient from the differential pressure deviation and the advantageous effect of the first embodiment of determining the control coefficient from the swash plate position.

More specifically, in the fourth embodiment of determining the control coefficient Ki from the differential pressure deviation, as explained above, when the flow control valve 3 is operated to increase its opening, the control coefficient Ki takes a large value immediately following the valve operation (see FIG. 19). In a rising period after the operation of the flow control valve, therefore, the sufficient tilting speed is obtained and a response is improved. However, in the case of determining the control coefficient from the differential pressure deviation for the pump control, as the tilting amount of the swash plate 1a increases and the delivery rate of the hydraulic pump 1 approaches the demanded flow rate of the flow control valve 3, the differential pressure deviation Δ (ΔP) is decreased, and so are the control coefficient Ki and hence the tilting speed of the swash plate. In other words, irrespective of the operation amount (opening) of the flow control valve 3, the tilting speed of the swash plate is always decreased as the pump delivery rate approaches the demanded flow rate. Meanwhile, as mentioned above, hunting is likely to occur when the opening X of the flow control valve 3 is small, and hunting is hard to occur when the opening X of the flow control valve 3 is large. Accordingly, in the above control based on the differential pressure deviation, when the operating lever 3a is operated in a large stroke at high speeds, the control coefficient Ki becomes too small as the pump delivery rate approaches the demanded flow rate, whereby the tilting speed of the swash plate is decreased excessively. Thus, the operator is forced to feel that the actuator is too slow in action at the time the swash plate position control is converged.

On the other hand, in the first embodiment of determining the control coefficient Ki from the swash plate position, since the control coefficient Ki becomes larger with an increase in the swash plate position (see FIG. 10), the control coefficient Ki is increased as the pump delivery rate approaches the demanded flow rate. Upon the pump delivery rate coinciding with the demanded flow rate, the control coefficient Ki reaches maximum. Accordingly, when the operation amount of the operating lever 3a is large, i.e., when the opening of the flow control valve 3 is large, the sufficient tilting speed of the swash plate 1a is obtained at the time the swash plate position control is converged. This enables the control to be performed not slowly.

To summarize, in this embodiment where the control coefficient Ki is determined using the modifying coefficient Kr resulted by multiplying the first modifying coefficient Kr1 determined from the differential pressure deviation and the second modifying coefficient Kr2 determined from the swash plate position, the control coefficient Ki is determined mainly by the first modifying coefficient Kr1 in a rising period just after the operation of the operating lever, and is determined mainly by the second modifying coefficient Kr2 at the time the control is converged. As a result, when the operating lever 3a is quickly operated in a large stroke at high speeds, it is possible not only to provide the sufficient tilting speed of the swash plate with a good response in the rising period, but also to perform the control not slow in its speed even at the time it is converged. Consequently, a response is further improved over an entire period of the control.

MODIFICATION OF SEVENTH EMBODIMENT

Figure 39:
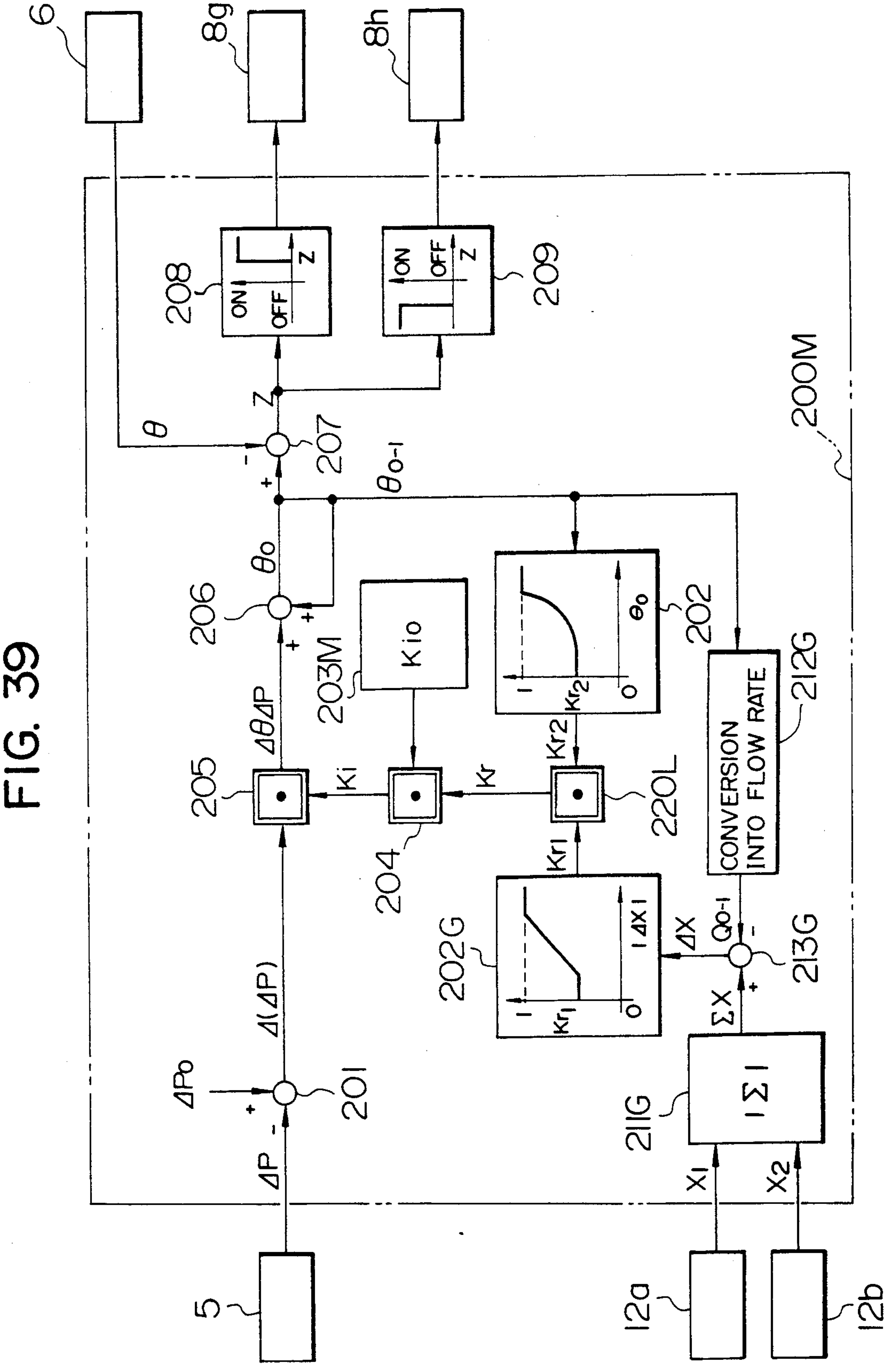
FIG. 39 is a block diagram showing a control system for the hydraulic pump according to a modification of the seventh embodiment.

In the above seventh embodiment, the first embodiment and the fourth embodiment are combined with each other. But, since a response is also improved in a rising period just after the operation of the flow control valve in the fifth embodiment of determining the control coefficient Ki from the flow rate deviation ΔX, as explained above, like the fourth embodiment, the similar advantageous effect can be obtained from the combination of the first embodiment with the fifth embodiment. This modification is shown in FIG. 39. In the drawing, those blocks having the same functions as those shown in FIG. 9 relating to the first embodiment, FIG. 26 relating to the fifth embodiment and FIG. 38 relating to the seventh embodiment are denoted by the same reference numerals.

Referring to FIG. 39, an entire control block is denoted by 200M in which a block 202G determines a first modifying coefficient Kr1 from the absolute value of the flow rate deviation ΔX, and a block 202 determines a second modifying coefficient Kr2 from the swash plate target position θo-1. These two modifying coefficients Kr1, Kr2 are multiplied by each other in a block 220L to determine a third modifying coefficient Kr. The third modifying coefficient Kr is multiplied in a block 204 by a basic value Kio of the control coefficient preset in a block 203M, for determining the control coefficient Ki. Data tables for the modifying coefficients Kr1, Kr2 are set to provide the modifying coefficient Kr which, in turn, gives the control coefficient Ki for enabling stable control when the swash plate position θo is small and the absolute value of the flow rate deviation ΔX is small. The basic value Kio is set to a value which is optimum when the swash plate position θo is large and the absolute value of the flow rate deviation ΔX is large. The remaining arrangement is the same as that of the first or fifth embodiment.

EIGHTH EMBODIMENT

An eighth embodiment of the present invention will be described with reference to FIG. 40. This embodiment combines the first embodiment with the sixth embodiment to determine the control coefficient Ki from both the swash plate position and the engine revolution speed (pump revolution speed). In FIG. 38, those blocks having the same functions as those in FIG. 9 relating to the first embodiment and FIG. 35 relating to the sixth embodiment are denoted by the same reference numerals. Also, since hardware arrangement is the same as that of the sixth embodiment, FIG. 31 is incorporated here for reference.

Figure 40:
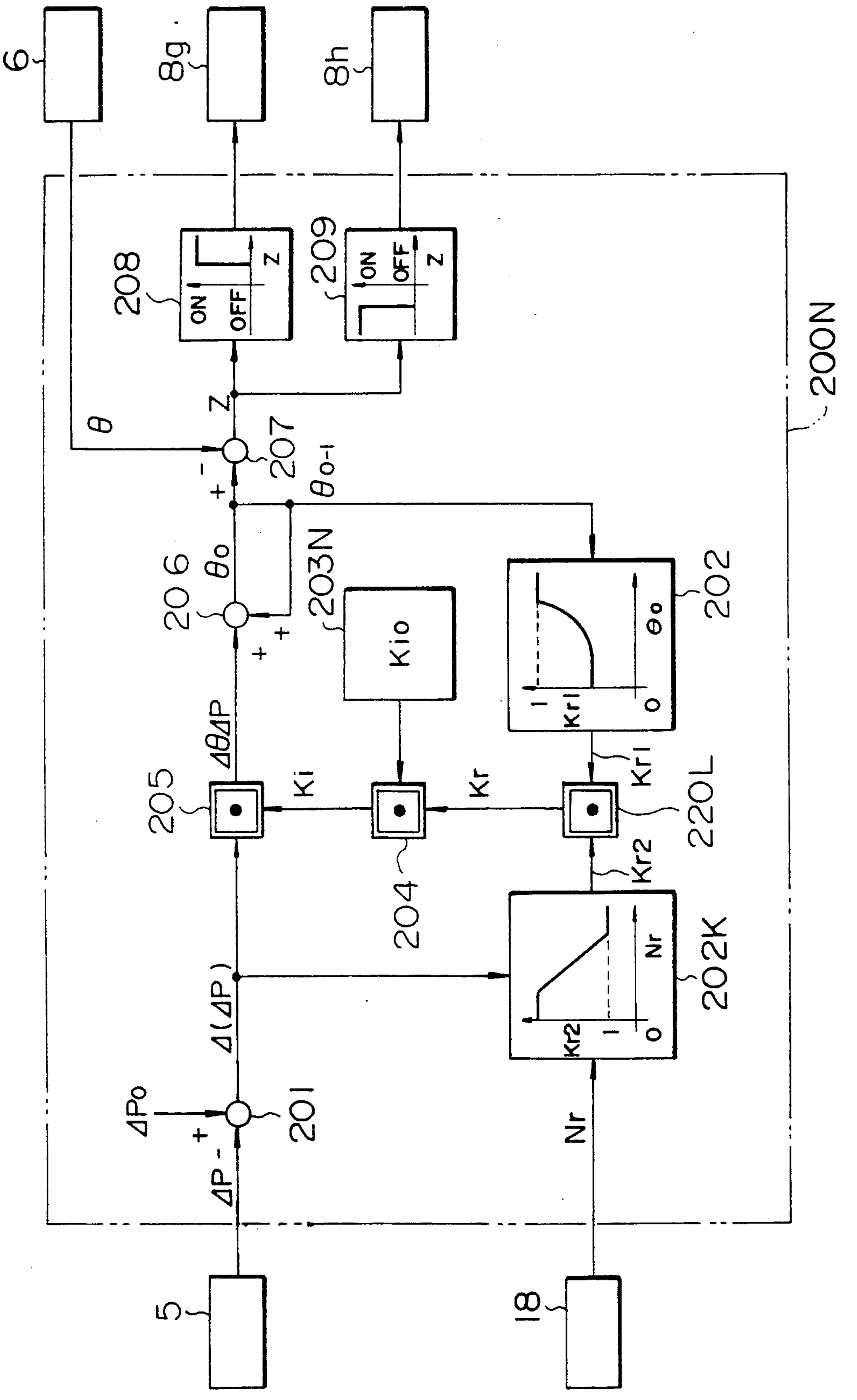
FIG. 40 is a block diagram of a control system for a hydraulic pump according to an eighth embodiment of the present invention.

In FIG. 40, an entire control block is denoted by 200N in which a block 202 determines a first modifying coefficient Kr1 from the swash plate target position θo-1, and a block 202K determines a second modifying coefficient Kr2 from the target revolution speed Nr of the engine 15. These two modifying coefficients Kr1, Kr2 are multiplied by each other in block 220L to determine a third modifying coefficient Kr. The third modifying coefficient Kr is multiplied in a block 204 by a basic value Kio of the control coefficient preset in a block 203N, for determining the control coefficient Ki. Data tables for the modifying coefficients Kr1, Kr2 are set to provide the modifying coefficient Kr which, in turn, gives the control coefficient Ki for enabling stable control when the swash plate position θo is small and the target revolution speed Nr is large. The basic value Kio is set to a value which is optimum when the swash plate position θo is large and the target revolution speed Nr is large. The remaining arrangement is the same as that of the first or sixth embodiment.

With this embodiment, since the control coefficient Ki is determined using the modifying coefficient Kr resulted by multiplying the first modifying coefficient Kr1 determined from the swash plate position and the second modifying coefficient Kr2 determined from the target revolution speed, there can be obtained both the advantageous effect of the first embodiment and the advantageous effect of the sixth embodiment.

More specifically, since Kr2=1 holds when the target revolution speed Nr is high, the first modifying coefficient Kr1 determined from the swash plate position gives the third modifying coefficient Kr, whereby the advantageous effect of the first embodiment is obtained. Therefore, the optimum control coefficient Ki is always obtained irrespective of the operation amount (degree) X of the flow control valve 3, making it possible to perform the control with a good response free from hunting. When the target revolution speed Nr is lowered, Kr2>1 holds so that the first modifying coefficient Kr1 determined from the swash plate position is multiplied by Kr2 to provide the advantageous effect of the sixth embodiment. Accordingly, when the revolution speed of the hydraulic pump is reduced, the control coefficient Ki takes a large value, making it possible to provide a prompt response by avoiding slow change in the delivery pressure of the hydraulic pump 1. As a result, the advantageous effect of the first embodiment can be obtained over an entire range of the pump revolution speed.

MODIFICATIONS OF EIGHTH EMBODIMENT

Figure 41:
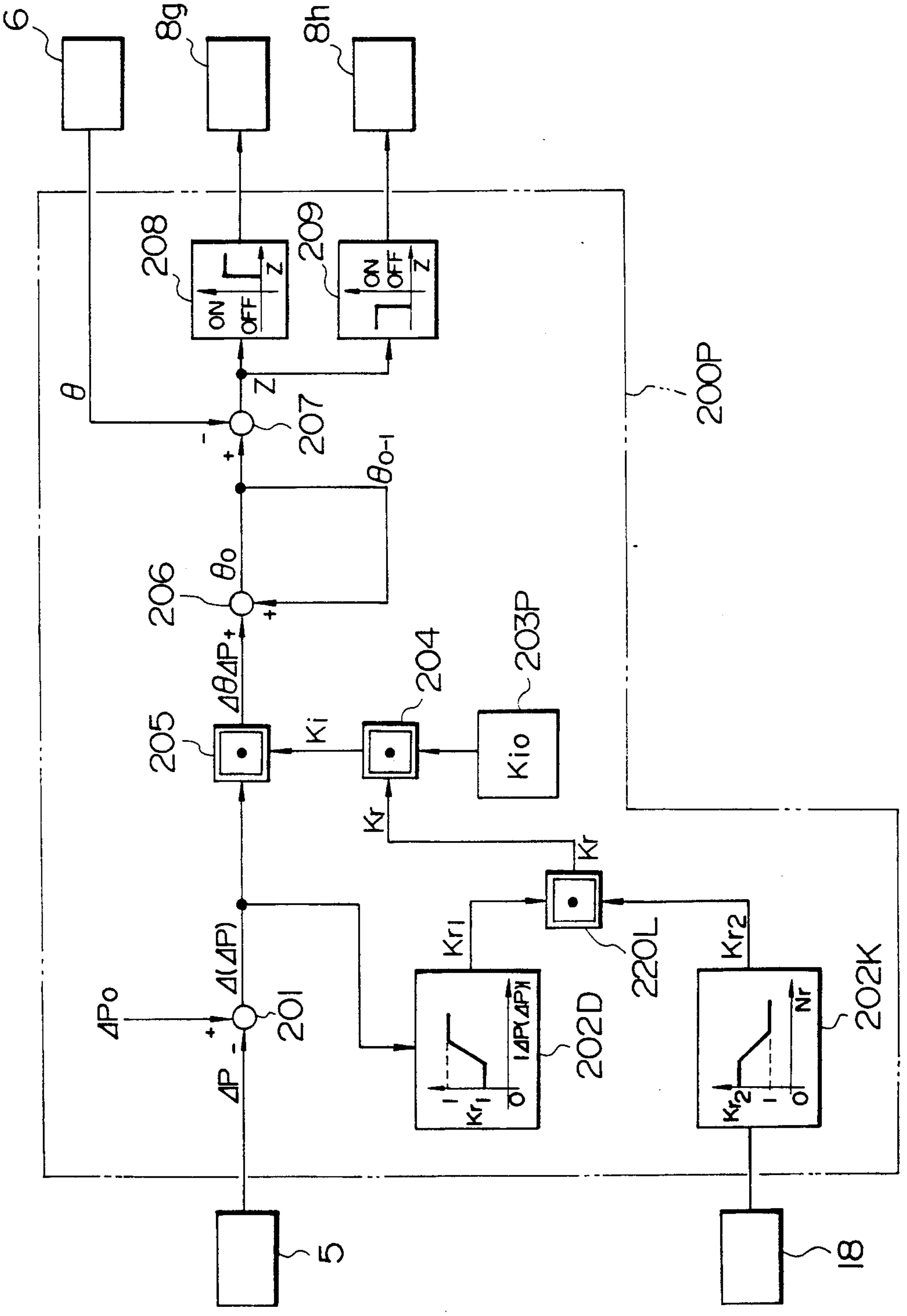
FIGS. 41 and 42 are each a block diagram showing a control system for the hydraulic pump according to a modification of the eighth embodiment.
Figure 42:
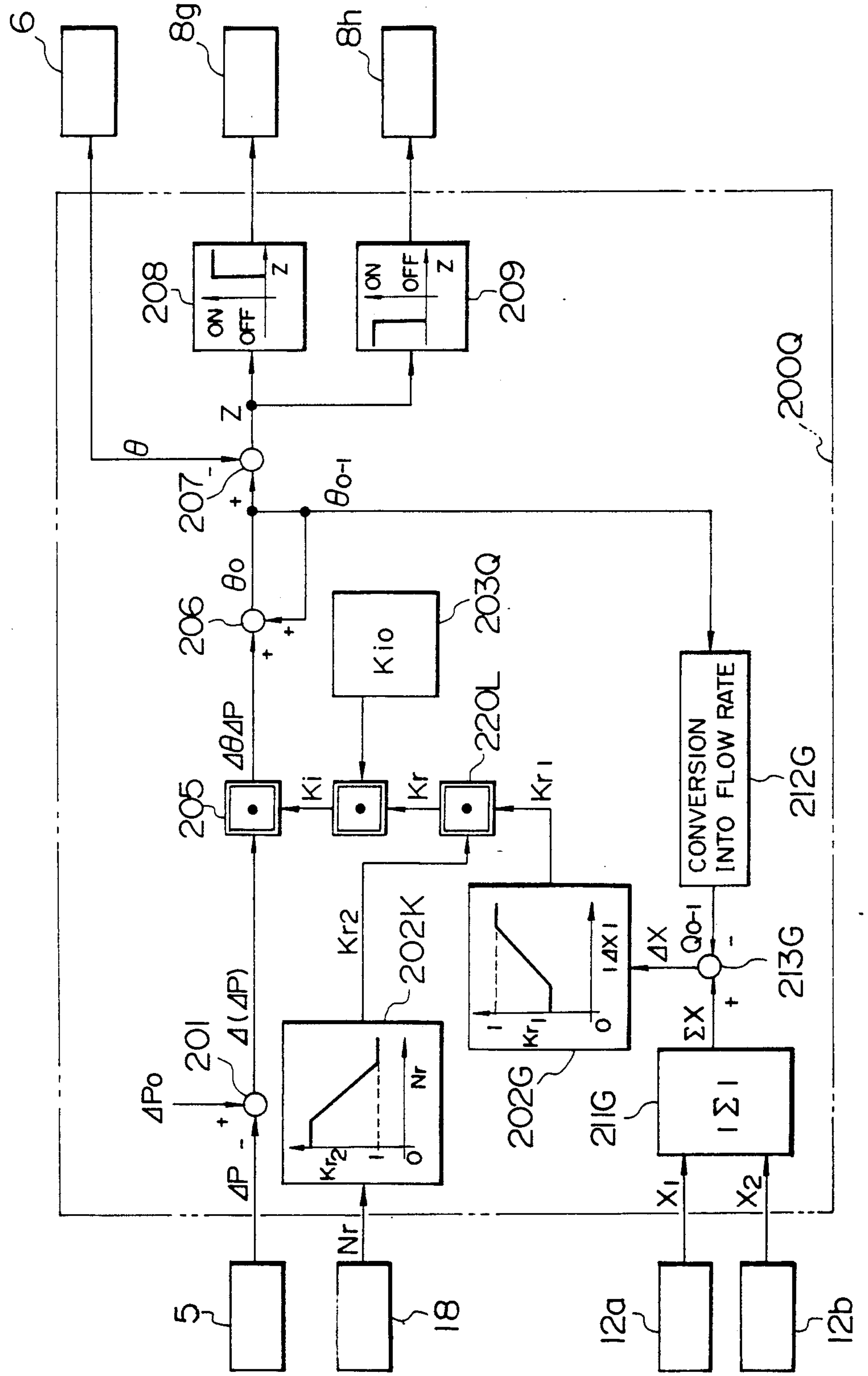

In the above eighth embodiment, the first embodiment and the sixth embodiment are combined with each other. As alternatives, the control coefficient Ki may be determined from both the differential pressure deviation and the engine revolution speed (pump revolution speed), or may be determined from both the flow rate deviation and the engine revolution speed (pump revolution speed). These modifications are shown in FIGS. 41 and 42. In FIG. 41, those blocks having the same functions as those shown in FIG. 18 relating to the fourth embodiment and FIG. 35 relating to the sixth embodiment are denoted by the same reference numerals. Also, in FIG. 42, those blocks having the same functions as those shown in FIG. 26 relating to the fifth embodiment and FIG. 35 relating to the sixth embodiment are denoted by the same reference numerals.

Referring to FIG. 41, an entire control block is denoted by 200P in which a block 202D determines a first modifying coefficient Kr1 from the absolute value of the differential pressure deviation Δ (ΔP), and a block 202K determines a second modifying coefficient Kr2 from the target revolution speed Nr of the engine 15. These two modifying coefficients Kr1, Kr2 are multiplied by each other in a block 220L to determine a third modifying coefficient Kr. The third modifying coefficient Kr is multiplied in a block 204 by a basic value Kio of the control coefficient preset in a block 203P, thereby determining the control coefficient Ki. Data tables for the modifying coefficients Kr1, Kr2 are set to provide the modifying coefficient Kr which, in turn, gives the control coefficient Ki for enabling stable control when the differential pressure deviation Δ (ΔP) is small and the target revolution speed Nr is large. The basic value Kio is set to a value which is optimum when the differential pressure deviation Δ (ΔP) is large and the target revolution speed Nr is large. The remaining arrangement is the same as that of the fourth or sixth embodiment.

As with the eighth embodiment, this modification can also attain the advantageous effect of the fourth embodiment, i.e., the advantageous effect of providing the optimum control coefficient Ki and ensuring the control with a good response even when the opening of the flow control valve 3 is quickly increased, over an entire range of the pump revolution speed.

Further, referring to FIG. 42, an entire control block is denoted by 200Q in which a block 202G determines a first modifying coefficient Kr1 from the absolute value of the flow rate deviation ΔX, and a block 202K determines a second modifying coefficient Kr2 from the target revolution speed Nr of the engine 15. These two modifying coefficients Kr1, Kr2 are multiplied by each other in a block 220L to determine a third modifying coefficient Kr. The third modifying coefficient Kr is multiplied in a block 204 by a basic value Kio of the control coefficient preset in a block 203Q, thereby determining the control coefficient Ki. Data tables for the modifying coefficients Kr1, Kr2 are set to provide the modifying coefficient Kr which, in turn, gives the control coefficient Ki for enabling stable control when the flow rate deviation ΔX is small and the target revolution speed Nr is large. The basic value Kio is set to a value which is optimum when the flow rate deviation ΔX is large and the target revolution speed Nr is large. The remaining arrangement is the same as that of the fifth or sixth embodiment.

As with the eighth embodiment, this modification can also attain the advantageous effect of the fifth embodiment, i.e., the advantageous effect of providing the optimum control coefficient Ki and ensuring the control with a good response even when the opening of the flow control valve 3 is quickly increased, over an entire range of the pump revolution speed.

THE OTHERS

Although a few of preferred embodiments of the present invention have been described above, the present invention can be varied and modified in various ways within the spirit thereof. For instance, a variety of combinations of the foregoing embodiments and modifications can be contemplated, e.g., by adopting the concept of the second or third embodiment into the seventh and eighth embodiments as well as their modifications. Further, the characteristic lines, shown in FIG. 6, FIG. 16 and others, representing the functional relationships to determine the modifying coefficients from the swash plate position, the differential pressure deviation, etc. may be smooth curves.

INDUSTRIAL APPLICABILITY

According to the present invention, a value of at least one parameter is entered which affects a change rate of the delivery pressure of a hydraulic pump with respect to change in the displacement volume of the hydraulic pump, and a control gain for a change rate of the displacement volume is determined from the entered value to control the change rate of the displacement volume. Therefore, the change rate of the delivery rate with respect to change in the displacement volume of the hydraulic pump can be controlled properly to provide a prompt response without making the pump delivery pressure so abruptly changed as to cause hunting, while preventing the pump delivery pressure from changing too slowly.

What is claimed is:

1. A control system for a hydraulic pump in a hydraulic drive circuit comprising at least one hydraulic pump provided with displacement volume varying means, at least one hydraulic actuator driven by a hydraulic fluid delivered from said hydraulic pump, and a flow control valve connected between said hydraulic pump and said actuator for controlling a flow rate of the hydraulic fluid supplied to said actuator, wherein a target value of a differential pressure between a delivery pressure of said hydraulic pump and a load pressure of said actuator is preset, and said displacement volume varying means of said hydraulic pump is driven dependent on a deviation between said differential pressure and said target value thereof for controlling a pump delivery rate so that said differential pressure is held at said target value, said control system for a hydraulic pump further comprising:

first means for receiving at least one value; which influences a change rate of the delivery pressure of said hydraulic pump with respect to change in the displacement volume of said hydraulic pump, and determining a control gain for a change rate of the displacement volume based on the received value; and second means for controlling said displacement volume varying means of said hydraulic pump in accordance with the control gain determined by said first means and said differential pressure deviation.

2. A control system for a hydraulic pump according to claim 1, wherein said first means determines said control gain based on said received value such that as the change rate of the delivery pressure of said hydraulic pump with respect to change in the displacement volume of said hydraulic pump becomes larger, the change rate of said displacement volume is decreased, and as the change rate of the delivery pressure of said hydraulic pump with respect to change in the displacement volume as said hydraulic pump becomes smaller, the change rate of said displacement volume is increased.

3. A control system for a hydraulic pump according to claim 1, wherein the received value of said first means is a value relating to an operated state of said flow control valve.

4. A control system for a hydraulic pump according to claim 3, wherein the value relating to an operated state of said flow control valve is the displacement volume of said hydraulic pump.

5. A control system for a hydraulic pump according to claim 3, wherein the value relating to an operated state of said flow control valve is said differential pressure deviation.

6. A control system for a hydraulic pump according to claim 3, wherein the value relating to an operated state of said flow control valve is a deviation between the demanded flow rate of said flow control valve and the delivery rate of said hydraulic pump.

7. A control system for a hydraulic pump according to claim 3, wherein the value relating to an operated state of said flow control valve includes the displacement volume of said hydraulic pump and said differential pressure deviation.

8. A control system for a hydraulic pump according to claim 3, wherein the value relating to an operated state of said flow control valve includes the displacement volume of said hydraulic pump and a deviation between the demanded flow rate of said flow control valve and the delivery rate of said hydraulic pump.

9. A control system for a hydraulic pump according to claim 1, wherein the received value of said first means is a revolution speed of said hydraulic pump.

10. A control system for a hydraulic pump according to claim 1, wherein the received value of said first means includes a value relating to an operated state of said flow control valve and a revolution speed of said hydraulic pump.

11. A control system for a hydraulic pump according to claim 4, wherein said control gain is set in a relationship that said control gain becomes larger as the displacement volume of said hydraulic pump is increased, and becomes smaller as the displacement volume is decreased.

12. A control system for a hydraulic pump according to claim 5, wherein said control gain is set in a relationship that said control gain becomes larger as said differential pressure deviation is increased, and becomes smaller as said differential pressure deviation is decreased.

13. A control system for a hydraulic pump according to claim 6, wherein said control gain is set in a relationship that said control gain becomes larger as the deviation between the demanded flow rate of said flow control valve and the delivery rate of said hydraulic pump is increased, and becomes smaller as the deviation is decreased.

14. A control system for a hydraulic pump according to claim 9, wherein said control gain is set in a relationship that said control gain becomes smaller as the revolution speed of said hydraulic pump is increased, and becomes larger as the revolution speed is decreased.

15. A control system for a hydraulic pump according to claim 1, wherein said first means includes third means for determining at least one control coefficient for arithmetic operation based on said received value, and said second means includes fourth means for determining a target displacement volume from said differential pressure deviation and said control coefficient, and controlling said displacement volume varying means of said hydraulic pump in accordance with said target displacement volume.

16. A control system for a hydraulic pump according to claim 15, wherein the received value of said third means is the displacement volume of said hydraulic pump. and said third means calculates said control coefficient based on said displacement volume.

17. A control system for a hydraulic pump according to claim 15, wherein the received value of said third means is said differential pressure deviation, and said third means calculates said control coefficient based on said differential pressure deviation.

18. A control system for a hydraulic pump according to claim 15, wherein the received value of said third means is a deviation between the demanded flow rate of said flow control valve and the delivery rate of said hydraulic pump, and said third means calculates said control coefficient based on said flow rate deviation.

19. A control system for a hydraulic pump according to claim 15, wherein the received value of said third means is a revolution speed of said hydraulic pump, and said third means calculates said control coefficient based on said revolution speed.

20. A control system for a hydraulic pump according to claim 15, wherein the received value of said third means includes the displacement volume of said hydraulic pump and a revolution speed of said hydraulic pump, and said third means calculates said control coefficient based on these values.

21. A control system for a hydraulic pump according to claim 15, wherein the received value of said third means includes said differential pressure deviation and a revolution speed of said hydraulic pump, and said third means calculates said control coefficient based on these values.

22. A control system for a hydraulic pump according to claim 15, wherein the received value of said third means includes a deviation between the demanded flow rate of said flow control valve and the delivery rate of said hydraulic pump and a revolution speed of said hydraulic pump, and said third means calculates said control coefficient based on these values.

23. A control system for a hydraulic pump according to claim 15, wherein the received value of said third means includes the displacement volume of said hydraulic pump and said differential pressure deviation, and said third means calculates said control coefficient based on these values.

24. A control system for a hydraulic pump according to claim 15, wherein the received value of said third means includes the displacement volume of said hydraulic pump and a deviation between the demanded flow rate of said flow control valve and the delivery rate of said hydraulic pump, and said third means calculates said control coefficient based on these values.

25. A control system for a hydraulic pump according to claim 20, wherein said third means calculates plural primary control coefficients dependent on said plural values, respectively, and calculates said control coefficient from said plural primary coefficients.

26. A control system for a hydraulic pump according to claim 16, wherein said control coefficient is set in a relationship that said control coefficient becomes larger as said displacement volume is increased, and becomes smaller as said displacement volume is decreased.

27. A control system for a hydraulic pump according to claim 17, wherein said control coefficient is set in a relationship that said control coefficient becomes larger as said differential pressure deviation is increased, and becomes smaller as said differential pressure deviation is decreased.

28. A control system for a hydraulic pump according to claim 18, wherein said control coefficient is set in a relationship that said control coefficient becomes larger as said flow rate deviation is increased, and becomes smaller as said flow rate deviation is decreased.

29. A control system for a hydraulic pump according to claim 19, wherein said control coefficient is set in a relationship that said control coefficient becomes smaller as said revolution speed is increased, and becomes larger as said revolution speed is decreased.

30. A control system for a hydraulic pump according to claim 16, wherein the displacement volume as said received value is a target displacement volume determined by said fourth means.

31. A control system for a hydraulic pump according to claim 16, wherein said control system further comprises means for detecting an actual displacement volume of said hydraulic pump, and the displacement volume as said received value is the detected displacement volume.

32. A control system for a hydraulic pump according to claim 17, wherein said control system further comprises means for detecting a differential pressure between the delivery pressure of said hydraulic pump and the load pressure of said actuator, and means for calculating the deviation between the detected differential pressure and preset target value of the differential pressure, and wherein the differential pressure deviation as said received value is the calculated differential pressure deviation.

33. A control system for a hydraulic pump according to claim 18, wherein said control system further comprises means for calculating a delivery rate of said hydraulic pump from the target displacement volume determined by said fourth means, and means for calculating a deviation between a demanded flow rate of said flow control valve and the detected delivery rate, and wherein the flow rate deviation as said received value is the calculated flow rate deviation.

34. A control system for a hydraulic pump according to claim 18, wherein said control system further comprises means for detecting an actual displacement volume of said hydraulic pump, means for calculating a delivery rate of said hydraulic pump from the detected displacement volume, and means for calculating a deviation between a demanded flow rate of said flow control valve and the detected delivery rate, and wherein the flow rate deviation as said received value is the calculated flow rate deviation.

35. A control system for a hydraulic pump according to claim 18, wherein said control system further comprises means for detecting an operation amount of said flow control valve, means for calculating a demanded flow rate of said flow control valve from the detected operation amount, and means for calculating a deviation between the calculated demanded flow rate and a delivery rate of said hydraulic pump, and wherein the flow rate deviation as said received value is the calculated flow rate deviation.

36. A control system for a hydraulic pump according to claim 18, wherein said hydraulic actuator and said flow control valve are each provided in plural, wherein said control system further comprises means for detecting operation amounts of said plural flow control valves, respectively, means for totaling those detected operation amounts to calculate a total demanded flow rate of said plural flow control valves, and means for calculating a deviation between the calculated demanded flow rate and a delivery rate of said hydraulic pump, and wherein the flow rate deviation as said received value is the calculated flow rate deviation.

37. A control system for a hydraulic pump according to claim 19, wherein said control system further comprises means for detecting a target revolution speed of a prime mover for driving said hydraulic pump, and the revolution speed for said hydraulic pump as said received value is the detected target revolution speed.

38. A control system for a hydraulic pump according to claim 19, wherein said control system further comprises means for detecting an actual revolution speed of a prime mover for driving said hydraulic pump, and the revolution speed of said hydraulic pump as said received value is the detected revolution speed.

39. A control system for a hydraulic pump according to claim 19, wherein said control system further comprises means for detecting an actual revolution speed of said hydraulic pump, and the revolution speed of said hydraulic pump as said received value is the detected revolution speed.

40. A control system for a hydraulic pump according to claim 15, wherein said third means includes means for presetting a basic value of said control coefficient, means for calculating a modifying coefficient of said basic value dependent on said received value, and means for multiplying said basic value by said modifying coefficient to calculate said control coefficient.

41. A control system for a hydraulic pump according to claim 15, wherein said fourth means includes means for multiplying said differential pressure deviation by said control coefficient to calculate a target change rate of said displacement volume, and means for adding said target change rate to a target displacement volume determined by calculation in the last cycle to determine said target displacement volume.

42. A control system for a hydraulic pump according to claim 15, wherein said fourth means includes means for multiplying said differential pressure deviation by said control coefficient to calculate said target displacement volume.

43. A control system for a hydraulic pump according to claim 15, wherein said third means includes means for calculating, as said control coefficient, a first control coefficient for integral control, and means for calculating a second control coefficient for proportional compensation, and said fourth means includes means for calculating a target displacement volume for integral control from said differential pressure deviation and said first control coefficient, means for calculating a modification value for proportional compensation from said differential pressure deviation and said second control coefficient, and means for calculating said target displacement volume from said target displacement volume for the integral control and said modification value for the proportional compensation.

* * * * *